United States Patent
Inoue et al.

(10) Patent No.: US 7,274,116 B2
(45) Date of Patent: Sep. 25, 2007

(54) DIRECT-CURRENT POWER SUPPLY AND BATTERY-POWERED ELECTRONIC APPARATUS EQUIPPED WITH THE POWER SUPPLY

(75) Inventors: Manabu Inoue, Uji (JP); Takuya Ishii, Suita (JP); Keiji Akamatsu, Osaka (JP); Masaaki Kuranuki, Kyoto (JP); Hiroki Akashi, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 55 days.

(21) Appl. No.: 10/528,174

(22) PCT Filed: Aug. 2, 2004

(86) PCT No.: PCT/JP2004/011396

§ 371 (c)(1),
(2), (4) Date: Mar. 17, 2005

(87) PCT Pub. No.: WO2005/013455

PCT Pub. Date: Feb. 10, 2005

(65) Prior Publication Data

US 2006/0006850 A1    Jan. 12, 2006

(30) Foreign Application Priority Data

Aug. 5, 2003   (JP) .............................. 2003-287021

(51) Int. Cl.
*H02H 3/027* (2006.01)
*H02M 3/335* (2006.01)

(52) U.S. Cl. ......................................... 307/100; 397/52

(58) Field of Classification Search ................ 307/100; 363/16, 124
See application file for complete search history.

(56) References Cited

U.S. PATENT DOCUMENTS

| | | | |
|---|---|---|---|
| 5,161,097 A * | 11/1992 | Ikeda | 363/124 |
| 5,179,508 A | 1/1993 | Lange et al. | |
| 5,297,203 A * | 3/1994 | Rose et al. | 380/270 |
| 6,069,804 A * | 5/2000 | Ingman et al. | 363/21.14 |
| 6,118,676 A * | 9/2000 | Divan et al. | 363/34 |
| 6,975,098 B2 * | 12/2005 | Vinciarelli | 323/266 |
| 7,129,599 B2 * | 10/2006 | Divan et al. | 307/65 |
| 2004/0164617 A1 * | 8/2004 | Bobb et al. | 307/64 |

FOREIGN PATENT DOCUMENTS

| | | |
|---|---|---|
| EP | 0 546 652 A1 | 6/1993 |
| EP | 0 919 439 A1 | 6/1999 |
| JP | 05137267 A | 6/1993 |
| WO | WO 02/099947 A1 | 12/2002 |

* cited by examiner

*Primary Examiner*—Michael Sherry
*Assistant Examiner*—Adi Amrany
(74) *Attorney, Agent, or Firm*—Akin Gump Strauss Hauer & Feld LLP

(57) ABSTRACT

A bypass control section (6) maintains a bypass switch (5) in the ON state during the period when a battery voltage (Vi) is higher than the output voltage (Vo) to an external load (L). Upon falling of the output voltage (Vo) at a desired voltage (ET), a converter control section (4) starts switching control at once, and a step-up chopper (3) promptly starts boost operation. The bypass control section (6) maintains the bypass switch (5) in the ON state from the start of the boost operation of the step-up chopper (3) until the match between the battery voltage (Vi) and the output voltage (Vo).

17 Claims, 21 Drawing Sheets

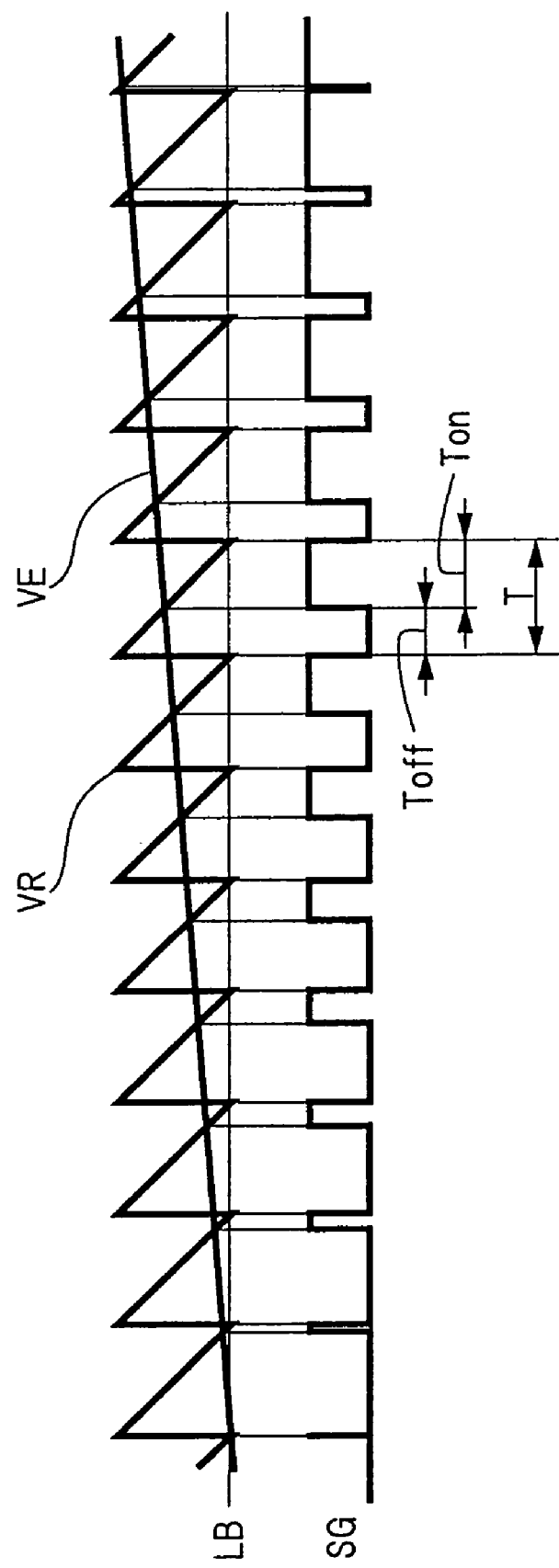

DISCHARGE TIME

DIRECT-CURRENT POWER SUPPLY AND BATTERY-POWERED ELECTRONIC APPARATUS EQUIPPED WITH THE POWER SUPPLY

CROSS-REFERENCE TO RELATED APPLICATIONS

This application is a section 371 of International Application No. PCT/JP2004/011396, filed Aug. 2, 2004, which was published in the English language on Feb. 10, 2005, under International Publication No. WO 2005/013455 A1, and the disclosure of which is incorporated herein by reference.

TECHNICAL FIELD

The present invention relates to a direct-current power supply installed in, for example, a battery-powered electronic apparatus, and in particular, the direct-current power supply that comprises a bypass switch connected in parallel with the DC-DC converter.

BACKGROUND ART

A direct-current power supply is equipped with a DC-DC converter, and thereby converts a battery voltage or a substantial direct voltage applied from a commercial AC power supply through a rectifier into a predetermined direct voltage, and then provides it to external loads that include another power converter or power system. The direct-current power supplies are installed, in particular, into apparatuses equipped with electronic circuits consisting of semiconductor devices, that is, electronic apparatuses, and provide the electronic apparatuses with constant direct voltages with stability.

For a battery-powered electronic apparatus, in particular, a mobile information apparatus such as a cellular phone, a notebook PC, a PDA, and a portable audio player, it is desirable to draw as much power as possible from the built-in batteries, that is, to improve the use efficiency of battery capacity since it leads the extension of the operable time of the electronic apparatus. In a direct-current power supply installed in a battery-powered electronic apparatus, for example, the DC-DC converter includes a step-up chopper and improves the use efficiency of battery capacity by its boost operation as follows. Here, the boost operation refers to an operation for maintaining a voltage conversion ratio (a ratio of the output voltage to the input voltage) higher than one, that is, raising the output voltage to the external load higher than the input voltage. The voltage conversion ratio higher than one is hereafter referred to as a boost ratio.

The battery voltage falls at a comparatively slow pace from the initial voltage over the period of the early-to-middle stages of the battery discharge. During the period, the battery voltage is maintained higher than the allowable lower limit of operating voltage in the battery-powered electronic apparatus with a proper setting of the type and cell number of built-in battery. The direct-current power supply maintains the step-up chopper in non-operation during the period, and provides the DC power supplied from the battery to the external load (that is, other devices in the electronic apparatus), for example, without being substantially converted. Thus, the operating voltage of the electronic apparatus is maintained higher than its allowable lower limit.

The battery voltage drops at a comparatively rapid pace in the last stages of the battery discharge. The direct-current power supply sets its desired voltage at, for example, a level higher than the allowable lower limit for the operating voltages of the electronic apparatus by a certain margin. The direct-current power supply starts the step-up chopper when the battery voltage falls substantially below the desired voltage. Thereby, the direct-current power supply raises the output voltage from the battery voltage to the desired voltage, and supplies it to the electronic apparatus. Thus, the direct-current power supply can maintain the output voltage applied to the electronic apparatus at the desired voltage, until the instant when the battery reaches the neighborhood of its complete discharge state. As a result, the electronic apparatus can use most of the battery capacity as its power.

The following is an example conventionally known as the above-described direct-current power supply installed in a battery-powered electronic apparatus. See, for example, Published Japanese patent application H05-137267 gazette. FIG. 19 is the circuit diagram of the conventional direct-current power supply 100. Input terminals 101A and 101B of the direct-current power supply 100 are connected to the positive and negative terminals of the battery B, respectively. Output terminals 102A and 102B of the direct-current power supply 100 are connected to the high and low side terminals of an external load L (that is, other devices in the electronic apparatus), respectively. Thereby, the direct-current power supply 100 converts the input voltage (or the battery voltage) Vi from the battery B into the output voltage Vo to the external load L.

The direct-current power supply 100 comprises a step-up chopper 103, a converter control section 104, a bypass switch 105, a bypass control section 106, and an input voltage detecting section 107. The step-up chopper 103 performs a boost operation by switching of the chopper switch 103S. The converter control section 104 detects the voltage Vo between the output terminals 102A and 102B, and compares it with the desired voltage to be supplied to the external load L. Here, the desired voltage ET is set, for example, to be higher than an allowable lower limit for the operating voltage of the external load L by a predetermined margin. The converter control section 104 further controls switching of the chopper switch 103S under a pulse-width modulation (PWM) scheme, based on the difference between the output voltage Vo and the desired voltage ET.

The bypass switch 105 is connected between the high side input terminal 101A and the high side output terminal 102A of the direct-current power supply 100, in parallel with the step-up chopper 103. When the bypass switch 105 stays in the ON state, the path from the high side input terminal 101A through the bypass switch 105 to the high side output terminal 102A acts as a bypass for the path inside the step-up chopper 103 that includes a series connection of an inductor 103L and a diode 103D. The bypass control section 106 controls switching of the bypass switch 105, and, in particular, maintains the bypass switch 105 in the ON and OFF state during the non-operating and operating periods of the step-up chopper 103, respectively, as described below.

The input voltage detecting section 107 detects the voltage between the input terminals 101A and 101B, that is, the battery voltage Vi, and compares the detected value with a predetermined threshold Ei, which is hereafter referred to as a start input voltage. Here, a voltage drop, which is hereafter referred to as a non-operating voltage drop, occurs between the high side input terminal 101A and the high side output terminal 102A during the ON period of the bypass switch 105, that is, the non-operating period of the step-up chopper 103. The start input voltage Ei is set, for example, to be higher than the desired voltage ET of the converter control section 104 by the upper limit of the non-operating voltage drop: Ei>ET.

The input voltage (or the battery voltage) Vi and the output voltage Vo of the direct-current power supply 100 change during the discharge period of the battery B, as shown in FIGS. 20A and 20B. Here, broken and solid lines show the change in time of the battery voltage Vi, that is, the discharge curve of the battery B and the change in time of the output voltage Vo, respectively. FIG. 20B is the enlarged view of the neighborhood of the point Ss (an agreement point between the battery voltage Vi and the start input voltage Ei) shown in FIG. 20A.

The discharge curve of the battery B is comparatively flat in the early-to-middle discharge stages of the battery B. Over this plateau, the battery voltage Vi is higher than the start input voltage Ei. The input voltage detecting section 107 informs the converter control section 104 and the bypass control section 106 of the battery voltage Vi higher than the start input voltage Ei. The converter control section 104 then maintains its non-operating state and maintains the chopper switch 103S in the OFF state. On the other hand, the bypass control section 106 maintains the bypass switch 105 in the ON state. Thus, during the period when the battery voltage Vi is maintained higher than the start input voltage Ei, that is, in the region I shown in FIGS. 20A and 20B, the step-up chopper 103 stops and the output voltage Vo is maintained lower than the battery voltage Vi by the non-operating voltage drop Von. Thereby, the output voltage Vo is maintained higher than the desired voltage ET.

At the non-operating period of the step-up chopper 103, that is, the region I shown in FIGS. 20A and 20B, the conduction losses are reduced with decrease of the non-operating voltage drop Von. The bypass switch 105 stays ON during the non-operating period of the step-up chopper 103 in the above-described direct-current power supply 100. Then, the current is divided into two branches between the high side input terminal 101A and the high side output terminal 102A: one of the branches flows through the series connection of the inductor 103L and the diode 103D inside the step-up chopper 103, and the other flows the bypass switch 105. Accordingly, the turning on of the bypass switch 105 reduces the resistance between the high side input terminal 101A and the high side output terminal 102A. Thus, the direct-current power supply 100 suppresses the non-operating voltage drop Von. As a result, the conduction losses of the direct-current power supply 100 during the non-operating period of the step-up chopper 103 are reduced below the conduction losses of direct-current power supplies with no bypasses. Therefore, the use efficiency of the battery capacity is maintained high.

The battery voltage Vi abruptly drops at the last stages of the discharge of the battery B. The input voltage detecting section 107 detects the drop of the battery voltage Vi to the start input voltage Ei. See the point Ss shown in FIGS. 20A and 20B. Then, the section informs the converter control section 104 and the bypass control section 106 of the detection. At that time, the converter control section 104 starts a PWM control. At the same time, the bypass control section 106 turns the bypass switch 105 off. Thereby, after the time Ts when the battery voltage Vi meets the start input voltage Ei, the step-up chopper 103 operates, raises the output voltage Vo higher than the battery voltage Vi, and maintains it substantially equal to the desired voltage ET during the period when the battery voltage Vi falls below the start input voltage Ei, that is, in the region II shown in FIGS. 20A and 20B. Thus, the direct-current power supply 100 can maintain the output voltage Vo at the desired voltage ET, until the instant when the battery B reaches its complete discharge state. As a result, most of the capacity of the battery B can be provided for the external load L as its power.

Lithium ion rechargeable batteries are extensively used for battery-powered electronic apparatuses, in particular, mobile information apparatuses. The lithium ion rechargeable batteries have advantages over other rechargeable batteries, in particular, in the high energy density. Recently, new-model lithium ion rechargeable batteries are developed. See, for example, Published Japanese patent application 2003-47238 gazette or EP1381135. New electrode materials are adopted in the new-model lithium ion rechargeable batteries. Thereby, the energy density is further higher.

In FIG. 21, a solid line shows the discharge curve of the new-model lithium ion rechargeable battery, which is hereafter referred to as a new-model battery, and a broken line shows the discharge curve of the current lithium ion rechargeable battery, which is hereafter referred to as a current battery. The discharge duration of the new-model battery is longer than the discharge duration of the current battery. In other words, the discharge capacity of the new-model battery is larger than the discharge capacity of the current battery. On the other hand, the new-model batteries have lower discharge end voltages and discharge curves with larger slopes, in comparison with the current battery. See the discharge end points E and E0 and the discharge curves PL and PL0 shown in FIG. 21.

The adoption of the new-model batteries as batteries for the mobile information apparatuses is desirable in view of the improvement in energy density. However, the adoption of the new-model batteries requires the changes of the circuit designs suitable for the low battery voltages. In particular, for circuits using as their operating voltages the battery voltages as they are, their circuit design must be changed so that their operations may be possible at lower voltages. Such design changes are not easy, in general. When the mobile information apparatuses have a communication function by radio waves, such as cellular phones, the mobile information apparatuses comprise wireless transmitter sections. Power amplifier sections included in the wireless transmitter sections usually use as their operating voltages battery voltages as they are, and amplify signals to be transmitted. Since the power amplifier section should provide a fixed power, its input current increases when the whole range of the change in battery voltage falls by the adoption of the new-model batteries. Accordingly, the efficiency of the amplification of signals decreases. Such decreased efficiency is undesirable since it obstructs the extension of the battery time. Therefore, the adoption of the new-model batteries requires high increase in efficiency under lower operating voltage conditions to the power amplifier section. It is tough to change in circuit design of the power amplifier section so as to satisfy such a requirement.

When the operating voltage of the battery-powered electronic apparatus is maintained on a conventional order, a battery voltage Vi of the current battery does not fall below the above-described desired voltage (for example, a value higher than an allowable lower limit of the operating voltage by a predetermined margin ET) until the last stages of the discharge. See a crossing point Ss0 between the broken line PL0 and the desired voltage ET shown in FIG. 21. On the other hand, a battery voltage Vi of the new-model battery may fall below the desired voltage ET earlier than the last stage of the discharge, that is, at the middle stage of the discharge. See a crossing point Ss between the solid line PL and the desired voltage ET shown in FIG. 21. Accordingly, the above-described direct-current power supply 100 is effective, in particular, in adopting the new-model batteries.

The conventional direct-current power supply synchronizes the start of the converter control section to the turning on of the bypass switch as described above. However, the converter control section can usually start its switching control after the expiration of a duration substantially longer than zero (which is hereafter referred to as a starting time) from the instant of the start. The starting time of the converter control section includes, for example, the initialization time of the converter control section, that is, the activating time of internal power sources for providing reference voltages, and the initialization time of latch circuits. Accordingly, the start of the switching control by the converter control section, that is, the actual start of the boost operation by the step-up chopper lags behind the turning off of the bypass switch by the above-described starting time, in the above-described conventional direct-current power supply.

The lag of the actual start of the boost operation by the step-up chopper from the turning off of the bypass switch brings the following problem in the conventional direct-current power supply 100, for example, shown in FIG. 19. In the region I shown in FIG. 20B, that is, before the time Ts when the battery voltage Vi meets the start input voltage Ei, the battery voltage Vi (shown by the broken line) is higher than the output voltage Vo (shown by the solid line) by the non-operating voltage drop Von. The bypass switch 105 is turned off and the converter control section 104 starts at the time Ts when the battery voltage Vi meets the start input voltage Ei. See the point Ss shown in FIG. 20B. However, the time Tf when the output voltage Vo begins to stay at a level equal to the desired voltage ET, lags behind the time Ts by the delay time $\Delta T$. See the point Sf shown in FIG. 20B. Here, the delay time $\Delta T$ is a sum of the starting time of the converter control section 104 and the time (which is hereafter referred to as a recovery time) required for the output voltage Vo abruptly dropped in the starting time to return to the desired voltage ET by the boost operation of the step-up chopper 103. In the period from the time Ts to the time Tf=Ts+$\Delta T$, the output voltage Vo drops abruptly and temporarily from the desired voltage ET, and produces an undershoot Us. The excessive undershoot Us of the output voltage Vo tends to suddenly abort the electronic device, that is, the external load L.

Accordingly, further improvement in reliability of the conventional direct-current power supply 100 requires the suppression of the occurrence of the excessive undershoot Us. The undershoot Us can be sufficiently reduced if, for example, the capacitance of the smoothing capacitor 103C is sufficiently increased. However, the increase in capacitance of the smoothing capacitor 103C scales up the whole of the direct-current power supply 100. The upsizing of the power supply section is undesirable since it obstructs the improvement in downsizing of electronic devices, in particular, such as mobile information apparatuses.

The battery voltage Vi is higher than the output voltage Vo during the non-operating period of the step-up chopper 103, that is, the ON period of the bypass switch 105. Conversely, the battery voltage Vi is lower than the output voltage Vo in general during the operating period of the step-up chopper 103, that is, the OFF period of the bypass switch 105. Accordingly, the bypass may include a diode instead of the bypass switch 105. At that time, the whole circuit can be scaled down since the bypass control section 106 is unnecessary. However, the forward voltage drop across a diode is, in general, larger than the ON-state voltage across a switching element. In other words, the conduction loss in a diode is higher than that in a switching element. Accordingly, the replacement of the bypass switch 105 with a diode has a disadvantage in the conversion efficiency.

BRIEF SUMMARY OF THE INVENTION

The present invention provides a direct-current power supply that suppresses the occurrence of excessive undershoot at the turning off of the bypass switch with its small circuit size and low conduction loss both maintained, thereby achieving high reliability.

One embodiment of a direct-current power supply according to the present invention includes a DC-DC converter, a converter control section, a bypass switch and a bypass control section. The DC-DC converter, by its switching operation, converts an input voltage applied from an external direct-current power supply into an output voltage equal to or higher than the input voltage, and applies the output voltage to an external load. The converter control section compares the output voltage with a desired voltage, and, based on their difference, controls the switching operation of the DC-DC converter. The bypass switch shorts between the input and output of the DC-DC converter. The bypass control section maintains the bypass switch in the ON state during non-operation of said DC-DC converter, and at start of the switching operation of the DC-DC converter, further maintains the bypass switch in the ON state for a predetermined time after the start of the switching operation.

Another embodiment of a direct-current power supply according to the present invention further includes a battery that supplies a predetermined battery voltage to the direct-current power supply.

I. Overview of the Invention

An object of the present invention is to provide a direct-current power supply that suppresses the occurrence of excessive undershoot at the turning off of the bypass switch with its small circuit size and low conduction loss both maintained, thereby achieving high reliability.

A direct-current power supply according to the present invention comprises:

a DC-DC converter, by its switching operation, converting an input voltage applied from an external direct-current power supply into an output voltage equal to or higher than the input voltage, and applying the output voltage to an external load;

a converter control section comparing the output voltage of the DC-DC converter with a desired voltage, and, based on their difference, controlling the switching operation of the DC-DC converter;

a bypass switch shorting between the input and output of the DC-DC converter; and a bypass control section maintaining the bypass switch in the ON state during non-operation of the DC-DC converter, and at a start of the switching operation of the DC-DC converter, further maintaining the bypass switch in the ON state for a predetermined time from the start.

The above-described direct-current power supply according to the present invention is preferably installed in a battery-powered electronic apparatus. In other words, the above-described external direct-current power supply is preferably a battery, or alternatively, may be a virtual DC power to which an AC power entering from an AC power supply is rectified. On the other hand, the above-described external loads are preferably other modules in the battery-powered electronic apparatus equipped with the direct-current power supply. Alternatively, the loads may be other power systems, inverters, or converters.

The desired voltage is set, for example, to be equal to either a non-operating output lower limit (an allowable lower limit of the output voltage of the DC-DC converter during its non-operating period) or an operating output lower limit (an allowable lower limit of the output voltage of the DC-DC converter during its operating period), whichever is higher. The non-operating output lower limit is set, for example. higher than the allowable lower limit of the operating voltage of the external load by a predetermined margin (hereafter, a non-operating output margin). The non-operating output margin depends on the sum of the amount of fall of the input voltage during the starting-time of the converter control section and a margin against the drop of the output voltage caused by a predictable sharp rise of current in the external load, for example, a sharp rise due to the launching of an application on a notebook PC. The starting-time of the converter control section refers to the time required for the converter control section to change from the state at startup to the state ready for the switching control operation. The starting-time of the converter control section is mainly the time required for the converter control section to perform initialization. The initialization includes, for example, the activation of internal power sources for reference voltages and the initialization of latch circuits. The operating output lower limit is set, for example, higher than an allowable lower limit of the operating voltage of the external load by a predetermined margin (hereafter, an operating output margin). The operating output margin depends on the sum of a ripple voltage included in the output voltage during the operating period of the DC-DC converter and a margin against the drop of the output voltage caused by a predictable sharp rise of current in the external load.

The above-described direct-current power supply according to the present invention comprises the DC-DC converter and the bypass switch. When the input voltage is sufficiently higher than the desired voltage, the converter control section maintains the DC-DC converter under non-operating conditions. The bypass control section then maintains the bypass switch in the ON state. Thereby, the output voltage is maintained lower than the input voltage by the voltage drop across the parallel connection of the DC-DC converter and the bypass switch. Conversely, when the input voltage is lower than the desired voltage, the converter control section starts the DC-DC converter. The bypass control section then maintains the bypass switch in the OFF state. The output voltage rises beyond the input voltage due to the boost operation of the DC-DC converter, and is maintained substantially equal to the desired voltage. Thus, the above-described direct-current power supply can maintain the output voltage, at the lowest, substantially equal to the desired voltage when the input voltage greatly varies; for example, when the battery voltage falls at the last stage of its discharge or when the direct voltage sent from the rectifier pulsates. Especially when the external power supply is batteries, the above-described direct-current power supply can maintain the output voltage substantially equal to the desired voltage until the instant when the batteries reach the substantially complete discharge state. As a result, the use efficiency of the battery capacity improves.

A battery voltage preferably falls below the above-described desired voltage in the middle stages of the discharge of the battery, in a battery-powered electronic apparatus equipped with the above-described direct-current power supply according to the present invention. In particular, new-model lithium ion rechargeable batteries with energy density higher than that of current lithium ion rechargeable batteries have comparatively low discharge end voltages and discharge curves with comparatively steep gradients. Then, the above-described direct-current power supply according to the present invention reliably maintains the output voltage, at the lowest, to be equal to the desired voltage. Accordingly, the above-described direct-current power supply according to the present invention has advantages in the use efficiency of the battery capacity, in particular, in the use of the new-model lithium ion rechargeable batteries.

The battery-powered electronic apparatuses equipped with the above-described direct-current power supplies according to the present invention preferably comprise a wireless transmitter section sending a signal by radio waves. In other words, the battery-powered electronic apparatuses, such as cellular phones, have wireless communications capabilities. The wireless transmitter section more preferably comprises a power amplifier section amplifying a signal to be sent under the application of the output voltage of the DC-DC converter. Generally in the power amplifier section, the stepping down of the operating voltage is difficult, and accordingly, its desired voltage is comparatively high. Therefore, the battery voltage falls below the desired voltage in the middle stages of the discharge of the battery. Then, the above-described direct-current power supply according to the present invention reliably maintains the output voltage, at the lowest, to be equal to the desired voltage. Accordingly, the above-described direct-current power supply according to the present invention has advantages in the use efficiency of the battery capacity, in particular, for the battery-powered electronic apparatuses having wireless communications capabilities.

In the above-described direct-current power supply according to the present invention, the bypass control section maintains the bypass switch in the ON state during the non-operating period of the DC-DC converter. Then, the current is split into two branches between the input and output of the above-described direct-current power supply. The one branch flows through the DC-DC converter and the other branch flows through the bypass switch. Accordingly, the turning-on of the bypass switch reduces the resistance between the input and output of the above-described direct-current power supply. Thus, the above-described direct-current power supply reduces the voltage drop (non-operating voltage drop) between its input and output during the non-operating period of the DC-DC converter. As a result, the conduction loss during the non-operating period of the DC-DC converter is suppressed. When the external direct-current power-supply is a battery, in particular, the use efficiency of the batten capacity is improved.

The bypass control section further maintains the bypass switch in the ON state for a predetermined time from the start of the switching operation of the DC-DC converter, and then turns the bypass switch off, in the above-described direct-current power supply according to the present invention, in sharp contrast to the conventional direct-current power supplies. The predetermined time is set, at the shortest, to be equal to the starting-time of the converter control section. Preferably, the output voltage rises due to the boost operation of the DC-DC converter, and until the instant when the output voltage meets the input voltage, the bypass control section maintains the bypass switch in the ON state. Accordingly, when the DC-DC converter starts the switching operation, the difference between the input and output voltages is suppressed to a level equal to or lower than the non-operating voltage drop. In particular, no excessive undershoots occur on the output voltage. Thus, the above-described direct-current power supply according to the present invention has high reliability for the stability of the output voltage. When the external load is an electronic device, in particular, the electronic device avoids a sudden abort due to an abrupt drop of the operating voltage. More preferably, the bypass control section turns the bypass switch off under the conditions where the current passing through the bypass switch (hereafter, the bypass current) is substantially equal to zero. Thereby, no switching losses occur. Accordingly, the above-described direct-current power supply according to the present invention suppresses its power consumption. As a result, when the external direct-current power supply is, in particular, a battery, the use efficiency of the battery capacity is improved.

The following two modes are in particular preferable as concrete means of further maintaining the bypass switch in the ON state for a predetermined time from the start of the switching operation of the DC-DC converter. In a first mode, the bypass control section determines the turning-on/off of the bypass switch based on the changes in state between the input and output of the DC-DC converter due to its boost operation. In a second mode, the bypass control section delays the starting signal for the converter control section by a predetermined delay time, and sends it as an off signal for the bypass switch.

In the first mode, the bypass control section:
compares voltages between the input and output of the DC-DC converter,
turns the bypass switch on when the input voltage is higher than the output voltage, and
turns the bypass switch off when the input voltage is lower than the output voltage.

Preferably, the bypass control section includes a comparator. The comparator produces a logical level in response to the relative levels between the input and output voltages of the DC-DC converter. Furthermore, its H and L levels are sent to the bypass switch as on and off signals, respectively, or vice versa. In the first mode, the bypass switch maintains the ON state from the start of the switching operation of the DC-DC converter until the instant when the input voltage substantially meets the output voltage. Thereby, the difference between the input and output voltages is suppressed to be equal to or lower than the non-operating voltage drop during the period. In particular, no excessive undershoots occur on the output voltage. Furthermore, no switching loss occurs since the bypass switch is turned off under the conditions where the bypass current is substantially equal to zero.

The above-described bypass control section compares the voltages between the input and output of the DC-DC converter, and determines the turning-on and off of the bypass switch. The bypass control section may in addition, detect the bypass current and, based on its amount or direction, determine the turning-on and off of the bypass switch. After the DC-DC converter starts its switching operation, preferably, the bypass control section turns the bypass switch off at the instant when the bypass current substantially falls to zero. The bypass control section may turn the bypass switch off at the instant when the direction of the bypass current is reversed. The bypass control section may further detect the output current of the DC-DC converter and the output current to the external load (hereafter, a load current), and based on those detected values, determine the turning-on and off of the bypass switch. For example, the bypass control section may turn the bypass switch off at the instant when the load current nearly meets the output current of the DC-DC converter.

In the second mode.
the above-described direct-current power supply comprises a start control section sending a predetermined start signal to the converter control section based on one or both of the input and output voltages;
the converter control section during non-operation starts upon receipt of the start signal; and
the bypass control section includes:
(a) a signal delay section holding the start signal for a predetermined delay time from the instant of the receipt, and
(b) a switch driving section maintaining the bypass switch in the ON state until the receipt of the start signal from the signal delay section, and turning off the bypass switch at the receipt of the start signal.

Here, the delay time is set, at the shortest, to be substantially equal to the starting-time of the converter control section, and preferably, substantially equal to the constant value estimated as the duration from the start of the converter control section until the instant of the agreement between the input and output voltages.

In the second mode, the signal delay section delays the sending of the start signal to the switch driving section by the above-described delay time from the occurrence of the start signal. Thereby, the bypass switch further maintains the ON state for, at the shortest, the starting-time of the converter control section after the start of the converter control section. Accordingly, the difference between the input and output voltages is maintained to be equal to or lower than the non-operating voltage drop during, at the shortest, the starting-time of the converter control section. In particular, no excessive undershoots occur on the output voltage. Furthermore, the instant of the turning-off of the bypass switch is sufficiently immediate after the instant of the agreement between the input and output voltages at the above-described desirable setting of the delay time. Accordingly, the switching loss is suppressed since the bypass switch is turned off under the conditions where the bypass current is small enough. Here, the bypass control section may monitor the bypass current after the receipt of the start signal and, based on the amount of the current, adjust the delay time. According to the adjustment, the bypass switch is turned off, when the bypass current substantially falls to zero. Thereby, the switching losses of the bypass switch at the turning-off are reduced.

In the second mode, furthermore,
the start control section may send a predetermined stop signal to the converter control section, based on the input voltage of the DC-DC converter;
the converter control section during operation may stop upon the receipt of the stop signal; and
in the bypass control section,
(a) the signal delay section may hold the stop signal for a predetermined delay time from the instant of the receipt, and
(b) the switch driving section may maintain the bypass switch in the OFF state until the receipt of the stop signal sent from the signal delay section, and turn on the bypass switch at the receipt of the stop signal. Here, the delay time may be substantially equal to the delay time for the start signal. When the external power supply is a battery, for example, the repetition of its charge and discharge causes the input voltage to repeat fall and rise alternately. When the input voltage rises in the boost operation of the DC-DC converter and, for example, the ratio of the desired voltage to the input voltage reaches a predetermined level, the start control section sends the stop signal and then, the converter control section and the DC-DC converter stop. On the other hand, the bypass control section further maintains the bypass switch in the OFF state by the above-described delay time even after the stop of the DC-DC converter, owing to the delay of the stop signal. Thereby, the bypass switch is turned on when the difference between the input and output voltages is fully reduced and the bypass current fully falls. As a result, the switching losses are reduced for the turning-on of the bypass switch.

The above-described direct-current power supply according to the present invention may comprise an input voltage detecting section comparing the input voltage with a start input voltage;

the converter control section may, based on the output of the input voltage detecting section,
(a) maintain the DC-DC converter in non-operation during the period when the input voltage is higher than the start input voltage, and
(b) cause the DC-DC converter to start the switching operation at the detection of the fall of the input voltage to the start input voltage. Here, the start input voltage is set as the input voltage at the start of the converter control section. According this configuration, the converter control section may maintain its stop conditions during the period when the input voltage is higher than the start input voltage. Thereby, the power consumption for the converter control section is reduced in the period.

For example, the start input voltage is set, at the lowest, to be equal to the sum of the desired voltage and a voltage drop upper limit (or an allowable upper limit of the non-operating voltage drop). Here, the voltage drop upper limit depends on the product of the resistance across the direct-current power supply during the ON period of the bypass switch and the allowable upper limit of the load current. The desired voltage is equal to or beyond the non-operating output lower limit. Accordingly, the starting input voltage is equal to or beyond the sum of the non-operating output lower limit and the voltage drop upper limit. Therefore, when the input voltage falls to the start input voltage, the output voltage is equal to or beyond the non-operating output lower limit. Thus, the output voltage is maintained higher enough than the allowable lower limit of the operating voltage of the external load during the starting-time of the converter control section.

The start input voltage may be additionally set, at the lowest, to be equal to the sum of the non-operating output lower limit and the voltage drop upper limit. At that time, the start input voltage may be lower than the desired voltage. The DC-DC converters, in general, include a DC-DC converter having a lower limit of its step-up ratio higher than one. Hereafter, a lowest step-up ratio refers to the lower limit of the step-up ratio. In the above-described direct-current power supply according to the present invention, the desired voltage is set, at the lowest, to be equal to either the lowest step-up ratio times as high as the start input voltage or the operating output lower limit, whichever is higher, when the DC-DC converter has the lowest step-up ratio higher than one. In that case, the ratio of the desired voltage to the input voltage is higher than the lowest step-up ratio at the start of the converter control section. Therefore, the converter control section can control the DC-DC converter with stability so that the output voltage does not greatly exceed the desired voltage. As a result, the DC-DC converter operates with stability.

The above-described direct-current power supply according to the present invention may further comprise:
an input voltage detecting section comparing the input voltage with a stop input voltage;
an output voltage detecting section comparing the output voltage with a start output voltage; and
a start control section,
based on the output of the output voltage detecting section,
(a) maintaining the converter control section in non-operation during the period when the output voltage is higher than the start output voltage, and
(b) causing the converter control section to start at the detection of the fall of the output voltage to the start output voltage, and
based on the output of the input voltage detecting section,
(c) maintaining the converter control section in operation during the period when the input voltage is lower than the stop input voltage, and
(d) causing the converter control section to stop at the detection of the rise of the input voltage to the stop input voltage.

Here, the start output voltage is set as the output voltage at the start of the converter control section. The stop input voltage is set as the input voltage at the stop of the converter control section under operating conditions.

For example, the start output voltage is set, at the lowest, to be equal to the non-operating output lower limit. At that time, the start output voltage may be lower than the desired voltage. Especially when the DC-DC converter has the lowest step-up ratio higher than one, the desired voltage is set, at the lowest, to be equal to either the lowest step-up ratio of the DC-DC converter multiplied by the sum of the start output voltage and the voltage drop upper limit, or the operating output lower limit, whichever is higher. At the start of the converter control section, the output voltage is substantially equal to the start output voltage, and the input voltage is equal to or below the sum of the output voltage and the voltage drop upper limit. Accordingly, the ratio of the desired voltage to the input voltage is equal to or beyond the lowest step-up ratio. Therefore, the converter control section can control the DC-DC converter with stability so that the output voltage does not substantially exceed the desired voltage. As a result, the DC-DC converter operates with stability.

The stop input voltage is, for example, set to be at the lowest equal to the sum of the start output voltage and the voltage drop upper limit. Furthermore, when the DC-DC converter has a lowest step-up ratio higher than one, the stop input voltage is set to be equal to or lower than the desired voltage divided by the lowest step-up ratio. In other words, the ratio of the desired voltage to the stop input voltage is equal to or beyond the lowest step-up ratio. When the external power supply is a battery, for example, the input voltage repeats falls and rises alternately due to the repetition of the charge and discharge. The ratio of the output voltage to the input voltage falls when the input voltage rises during the boost operation of the DC-DC converter, since the output voltage is maintained substantially equal to be the desired voltage. When the input voltage meets the stop input voltage, the converter control section stops, and then the DC-DC converter stops. At that time, the ratio of the output voltage to the input voltage is equal to or beyond the lowest step-up ratio. Thus, the DC-DC converter stops with stability at the rise of the input voltage.

After the stop of the DC-DC converter, the output voltage falls from the desired voltage, and meets the input voltage. At that time, the bypass control section turns the bypass switch on. Thereby, the output voltage is maintained at the level lower than the input voltage by the non-operating voltage drop. Here, the output voltage is maintained to be equal to or beyond the start output voltage since the input voltage is equal to or beyond the stop input voltage. Thus, when the input voltage repeats falls and rises alternately, the output voltage is maintained sufficiently higher than the allowable lower limit of the operating voltage of the external load.

In the above-described direct-current power supply according to the present invention, based on the outputs of the input and output voltage detecting sections, the start control section may (a) maintain the converter control section in non-operation during the period when the input voltage is higher than the stop input voltage and the output voltage is higher than the start output voltage, and (b) cause the converter control section to start when the input voltage falls below the stop input voltage and the fall of the output voltage to the start output voltage is detected.

When power is provided for the above-described direct-current power supply by the connection with the batten in a fully charged condition, for example, the input voltage is higher than the stop input voltage, and the output voltage is lower than the start output voltage. The above-described start control section accurately judges the start of the converter control section based on not only the output voltage but also the input voltage. In particular, when the input voltage is lower than the stop input voltage and the output voltage is lower than the start output voltage, the converter control section starts. Accordingly, the mis-operation of the DC-DC converter is avoided at power-on, and accordingly, the occurrence of excessive output voltage is prevented.

In the above-described direct-current power supply according to the present invention, the DC-DC converter may have the ability of buck operation converting the input voltage into the output voltage equal to or lower than the input voltage, in addition to the ability of boost operation converting the input voltage into the output voltage equal to or higher than the input voltage;

the converter control section, based on the difference between the output voltage and the desired voltage, may cause the DC-DC converter to perform one of the buck and boost operations, and maintain the DC-DC converter in non-operation; and at the start of the boost operation of the DC-DC converter, the bypass control section may further maintain the bypass switch in the ON state for a predetermined time from the instant of the start.

In the configuration, the desired voltage is set, for example, to be at the lowest equal to either the output lower limit at the buck operation or the output lower limit at the boost operation of the DC-DC converter, whichever is higher. The operating output lower limit is set, for example, higher than the allowable lower limit of the operating voltage of the external load by an operating output margin for each of the buck and boost operations. The operating output margin depends on the sum of a ripple voltage included in the output voltage during the operating period and a margin against drops of the output voltage caused by predictable, rapid increases in the current in the external load.

When the input voltage is higher than the desired voltage, the converter control section causes the DC-DC converter to perform the buck operation. The bypass control section then maintains the bypass switch in the OFF state. The output voltage falls due to the buck operation of the DC-DC converter, and is maintained substantially equal to the desired voltage. Conversely, when the input voltage is lower than the desired voltage, the converter control section causes the DC-DC converter to perform the boost operation. The bypass control section then maintains the bypass switch in the OFF state. The output voltage rises due to the boost operation of the DC-DC converter, and is maintained substantially equal to the desired voltage. Thus, when the input voltage greatly varies, the above-described direct-current power supply according to the present invention can maintain the output voltage substantially equal to the desired voltage throughout the variation period of the input voltage. Especially when the external power supply is a battery, the output voltage is maintained substantially equal to the desired voltage throughout the discharge period of the battery. As a result, the use efficiency of the battery capacity further improves.

When the input voltage fluctuates in the vicinity of the desired voltage, the converter control section maintains the DC-DC converter in non-operation. The bypass control section then maintains the bypass switch in the ON state. Thereby, the output voltage is maintained lower than the input voltage by the non-operating voltage drop. In addition, during the non-operating period of the DC-DC converter, the current is split into two branches between the input and output of the direct-current power supply, and the one branch passes through the DC-DC converter and the other branch passes through the bypass switch. Accordingly, the resistance between the input and output of the direct-current power supply is reduced due to the turning-on of the bypass switch. Thus, the above-described direct-current power supply according to the present invention suppresses the non-operating voltage drop. As a result, the conduction loss of the DC-DC converter is suppressed during the non-operating period. Especially when the external power supply is a battery, the use efficiency of the battery capacity improves.

The bypass switch is maintained in the ON state, especially at the start of the boost operation of the DC-DC converter. Thereby, the difference between the input and output voltages is maintained equal to or less than the non-operating voltage dron during the non-operating period of the DC-DC converter. In particular, no excessive undershoots occur on the output voltage. Furthermore, no switching loss is produced since the bypass switch is turned off under the conditions where the bypass current is substantially equal to zero. Thus, the above-described direct-current power supply according to the present invention has high reliability for the stability of the output voltage.

Any of the direct-current power supplies according to the present invention preferably comprises a synchronous rectifier section performing rectification during operation of the DC-DC converter in synchronization with its switching operation, and maintaining the ON state during non-operation of the DC-DC converter. Especially when the DC-DC converter can perform the buck operation in addition to the boost operation, the synchronous rectifier section performs rectification during the boost operation of the DC-DC converter in synchronization with its switching operation, and maintains the ON state during the non-operation of the DC-DC converter. Generally, the synchronous rectifier section produces conduction losses lower than those produced by a diode. Accordingly, the DC-DC converter produces low conduction losses in this direct-current power supply.

The above-described direct-current power supply according to the present invention preferably comprises a step-up chopper, or the boost converter with an inductor, as the DC-DC converter. Furthermore, the direct-current power supply may comprise a buck/boost converter with an inductor as the DC-DC converter having the ability of the buck operation. Alternatively, the DC-DC converter may be. for example, a buck/boost converter such as a Cuk, Zeta, or Sepic converter. The DC-DC converter may further adopt a charge pump with a capacitor and a switch.

The above-described direct-current power supply according to the present invention, further preferably, comprises a stop switch. The stop switch, under the on-off control of the external load, interrupts either an input current from the external direct-current power supply or an output current to the external load. Especially when the DC-DC converter includes an output smoothing capacitor connected in parallel with the external load and a node near the external load between the DC-DC converter and the bypass switch is placed closer the external direct-current power supply than the output smoothing capacitor, the stop switch is preferably connected between the node and the output smoothing capacitor. Alternatively, the stop switch may be connected at a point nearer the external direct-current power supply than the node near the external direct-current power supply between the DC-DC converter and the bypass switch. When the external load shifts to its suspend state, for example, the external load turns the stop switch off. Thereby, the output current of the DC-DC converter and the bypass current are both interrupted, and in other words, the load current is cut off. Thus, the external load cuts the power from the direct-current power supply. As a result, no power is provided to the external load and therefore, power consumption by the external load is suppressed. Especially when the external power supply is a battery, its use efficiency improves.

When the above-described direct-current power supply according to the present invention includes the above-described stop switch, the bypass control section may further detect the output current of the DC-DC converter and the ON voltage of the stop switch, and based on those detected values, determine the on/off states of the bypass switch. For example, the bypass control section may detect the load current from the ON voltage of the stop switch, and may turn the bypass switch off at the instant when the load current nearly meet the output current of the DC-DC converter.

As described above, the bypass control section further maintains the bypass switch in the ON state for a predetermined time from the instant of the start of the switching operation by the DC-DC converter in the direct-current power supply according to the present invention, in contrast to conventional direct-current power supplies. The predetermined time is in particular equivalent to the sum of the starting-time of the converter control section and the recovery time to the desired voltage of the output voltage. Accordingly, at the start of the switching operation by the DC-DC converter, the difference between the input and output voltages is suppressed to be equal to or below the non-operating voltage drop. In particular, no excessive undershoots occur on the output voltage. Thus, the direct-current power supply according to the present invention has high reliability for the stability of the output voltage. Especially when the external load is an electronic device, a sudden abort of the electronic device due to an abrupt drop of the operating voltage is avoided.

While the novel features of the invention are set forth particularly in the appended claims, the invention, both as to organization and content, will be better understood and appreciated, along with other objects and features thereof, from the following detailed description taken in conjunction with the drawings.

II. Detailed Disclosure

BRIEF DESCRIPTION OF DRAWINGS

FIG. 2 is a waveform chart of a reference signal VR, an error signal VE, and a switching signal SG in the direct-current power supply 10 according to Embodiment 1 of the present invention;

Figure 1:
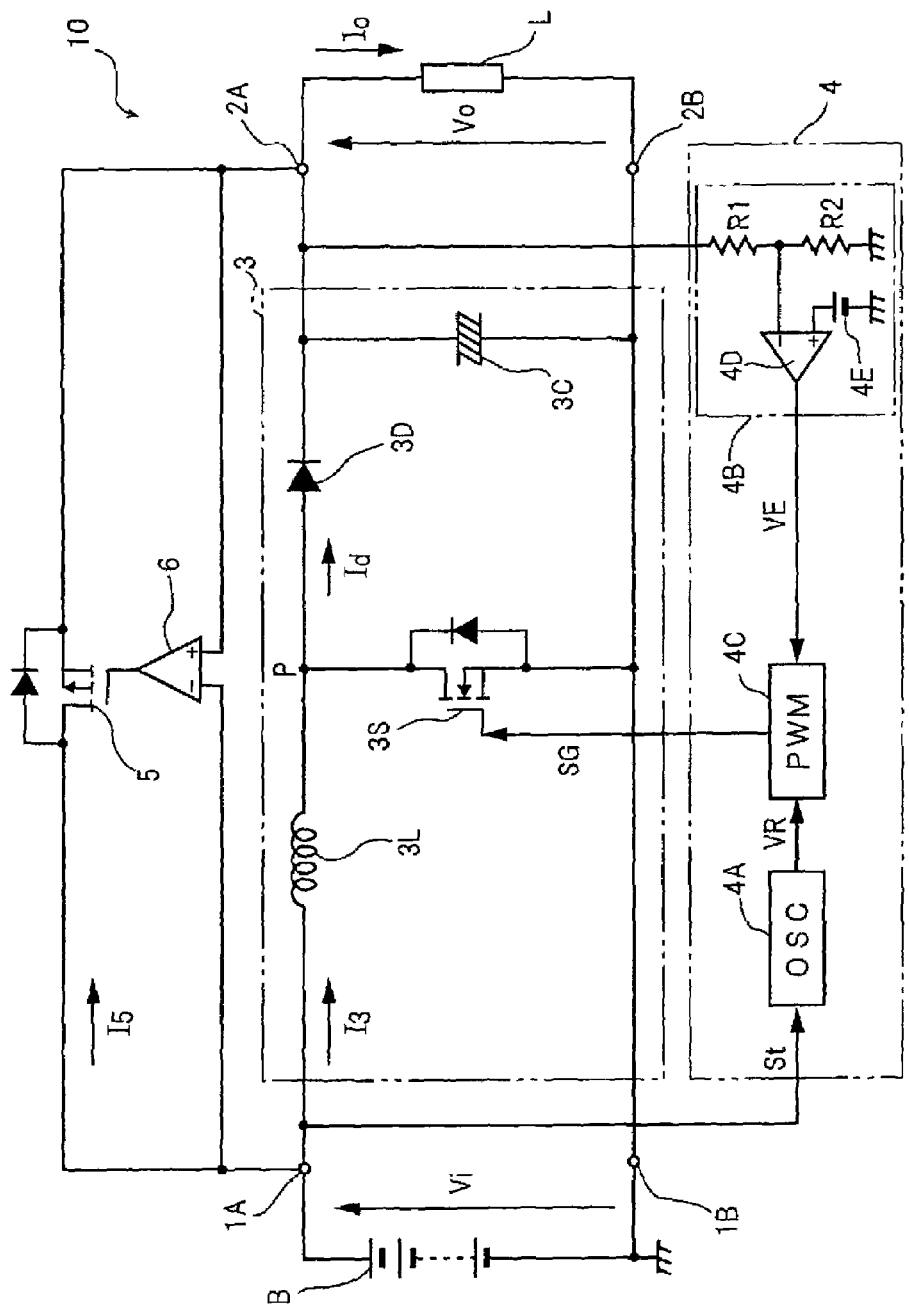
FIG. 1 is a circuit diagram of a direct-current power supply 10 according to Embodiment 1 of the present invention.

It will be recognized that some or all of the figures are schematic representations for purposes of illustration and do not necessarily depict the actual relative sizes or locations of the elements shown.

DETAILED DESCRIPTION OF THE INVENTION

The following describes the best embodiments of the present invention, referring to the drawings. Any of direct-current power supplies according to the embodiments of the present invention described below is installed into a battery-powered electronic appliance. Here, the battery-powered electronic appliance is preferably a mobile information apparatus such as a cellular phone, a notebook PC, a PDA, or a portable audio player. The mobile information apparatus further preferably has wireless communications capabilities, and its wireless transmitter section comprises a power amplifier section.

Embodiment 1

FIG. 1 is the circuit diagram of the direct-current power supply 10 according to Embodiment 1 of the present invention. Input terminals 1A and 1B of the direct-current power supply 10 are connected to the high- and low-side terminals of a battery B, respectively. Here, the battery B is preferably a rechargeable battery, and further preferably, a lithium ion rechargeable battery. A high side output terminal 2A and a low side output terminal 2B of the direct-current power supply 10 are connected to the high- and low-side terminals of an external load L, respectively. Here, the external load L is another circuit inside the battery-powered electronic appliance, and preferably, includes a power amplifier section in a wireless transmitter section.

The direct-current power supply 10 converts an input voltage applied from the battery B, that is, a battery voltage Vi into an output voltage Vo applied to the external load L, and maintains the output voltage Vo at the level equal to or beyond a desired voltage ET. Here, the desired voltage ET is set to be higher enough than the allowable lower limit of the operating voltage of the external load L as described later. In particular, as for the above-described power amplifier section, the desired voltage ET is located intermediate between an initial voltage and the discharge end voltage of the battery B. The initial voltage is the battery voltage under the fully charged conditions and equal to the charge end voltage in the case of a rechargeable battery. On the other hand, the battery voltage Vi drops in the last stages of the discharge of the battery B, and then the output voltage Vo falls below the desired voltage ET. Especially when the battery B is a high energy density lithium ion rechargeable battery, its discharge end voltage is low and its discharge curve is inclined at a large angle. Accordingly, the output voltage Vo may fall below the desired voltage ET in the middle stages of the discharge. The direct-current power supply 10 then changes the output voltage Vo to be higher than the battery voltage Vi by the boost operation as described later, thereby maintaining the output voltage Vo substantially equal to the desired voltage ET.

The direct-current power supply 10 comprises a step-up chopper 3, a converter control section 4, a bypass switch 5, and a bypass control section 6. The step-up chopper 3 includes an inductor 3L, a diode 3D, an output smoothing capacitor 3C, and a chopper switch 3S. The ends of the inductor 3L are connected to a high side input terminal 1A and the anode of the diode 3D, respectively. The cathode of the diode 3D is connected to a high side output terminal 2A. The output smoothing capacitor 3C is connected between the high side output terminal 2A and a low side output terminal 2B.

The chopper switch 3S is preferably a N-channel MOSFET, whose drain is connected to the node P between the inductor 3L and the diode 3D, whose source is connected to both of a low side input terminal 1B and the low side output terminal 2B, and whose gate is connected to the converter control section 4. The chopper switch 3S is in the ON and OFF states when the logical level of the gate is the H and L levels, respectively.

The step-up chopper 3 performs the following boost operation by switching of the chopper switch 3S. Here, the following is based on the premise that: the output voltage Vo applied to the external load L is high enough since an abundance of electric charge has already been stored in the output smoothing capacitor 3C. Furthermore, the bypass switch 5 is maintained in the OFF state.

When the chopper switch 3S is in the ON state, a reverse-biased voltage ($\approx -V_o$) is applied across the diode 3D, and then, a forward current Id flowing in the diode 3D falls to zero. On the other hand, a current I3 flowing through the inductor 3L rises and accordingly magnetic energy stored in the inductor 3L is increased, since the battery voltage Vi excites the inductor 3L.

When the chopper switch 3S is turned off, the potential of the node P between the inductor 3L and the diode 3D is suddenly raised due to the effect of the inductor 3L, and then a forward voltage is applied across the diode 3D. Thereby, the diode 3D conducts and increases its forward current Id. As a result, the magnetic energy stored in the inductor 3L during the ON time of the chopper switch 3S is provided to the output smoothing capacitor 3C and the external load L during the OFF time of the chopper switch 3S.

Based on a reset condition of the inductor 3L, or a condition for the balance between the magnetic energy stored in the inductor 3L during the ON time of the chopper switch 3S and the magnetic energy radiated from the inductor 3L during the OFF time of the chopper switch 3S, the battery voltage Vi and the output voltage Vo satisfy the following equation: Vi×Ton=(Vo−Vi)×(T−Ton), when the fluctuations in the battery voltage Vi and the output voltage Vo within the switching period of the chopper switch 3S are ignored. Here, let T be the switching period, and let Ton be the ON time per period. Accordingly, the voltage conversion ratio Vo/Vi of the step-up chopper 3 depends on the duty ratio r=Ton/T of the chopper switch 3S: Vo/Vi=1/(1−r). The voltage conversion ratio Vo/Vi is higher than 1 since the duty ratio r is lower than 1: Vo/Vi>1. Thus, the step-up chopper 3 maintains the voltage conversion ratio higher than 1 by switching of the chopper switch 3S.

The converter control section 4 includes an oscillator circuit (OSC) 4A, a feedback circuit 4B, and a PWM circuit 4C. The OSC 4A is connected to the high side input terminal 1A, and starts by the battery voltage Vi applied at the connection with the direct-current power supply 10 and the battery B. At the start, the OSC 4A generates a reference signal VR. The reference signal VR is preferably triangular waves, and has a fixed period, which is substantially equal to the above-described switching period T, and a fixed amplitude.

The feedback circuit 4B includes a voltage divider, or a series connection of two resistors R1 and R2, a reference voltage source 4E, and an error amplifier 4D. The potential divider causes the output voltage Vo of the direct-current power supply 10 to fall by a dividing ratio F0=R2/(R1+R2). The voltage of the reference voltage source 4E is equal to the dividing ratio F0 times as high as the desired voltage ET, F0×ET. Here, the desired voltage ET is set to be at the lowest equal to either a non-operating output lower limit Ec or an operating output lower limit Eo, that is, an allowable lower limit of the output voltage Vo during the non-operating or operating period of the step-up chopper 3, respectively, whichever is higher: ET≧max(Ec, Eo). The error amplifier 4D inverts and amplifies a deviation F0×(Vo−ET) of the output voltage F0×Vo of the voltage divider from the voltage F0×ET of the reference voltage source 4E, and sends it as an error signal VE. In other words, the farther the output voltage Vo falls below the desired voltage ET, the higher the level of the error signal VE rises.

The non-operating output lower limit Ec is set, for example, to be higher than the allowable lower limit El of the operating voltage of the external load L by a non-operating output margin α: Ec=El+α. The non-operating output margin α depends on the sum of a fall amount γ of the battery voltage Vi during the starting-time of the converter control section 4 and a margin δ against drops of the output voltage Vo caused by predictable rapid increases of the current in the external load L, for example, rapid increases due to the launching of applications on a notebook PC: α=γ+δ.

The operating output lower limit Eo is set, for example, to be higher than the allowable lower limit El of the operating voltage of the external load L by an operating output margin β: Eo=El+β. The operating output margin β depends on the sum of the ripple voltage ρ included in the output voltage during the operating period of the step-up chopper 3 and the margin δ against the drops of the output voltage Vo caused by the predictable rapid increases of the current in the external load L: β=ρ+δ.

The PWM circuit 4C sends a switching signal SG to the gate of the chopper switch 3S of the step-up chopper 3. The switching signal SG is a rectangle voltage pulse having a fixed amplitude. The chopper switch 3S is turned off and on at the rising and falling edges of the switching signal SG, respectively. The pulse width of the switching signal SG, in particular, determines the ON time of the chopper switch 3S.

The PWM circuit 4C compares levels between the reference signal VR and the error signal VE, and at every meeting of the levels, changes the level of the switching signal SG. Thereby, the switching signal SG is maintained at the L level, for example, and the chopper switch 3S is maintained in the OFF state during the period when the level of the reference signal VR exceeds the level of the error signal VE. Conversely, the switching signal SG is maintained at the H level and the chopper switch 3S is maintained in the ON state during the period when the level of the reference signal VR falls below the level of the error signal VE.

As shown in FIG. 2, the longer the period when the level of the error signal VE exceeds the level of the reference signal VR, the larger the pulse width of the switching signal SG, and accordingly, the longer the ON time Ton of the chopper switch 3S. On the other hand, the period of the reference signal VR is constant, and thus, the switching period T, that is, the sum of the ON time Ton and the OFF time Toff: T=Ton+Toff, of the chopper switch 3S is constant. Therefore, the longer the period when the level of the error signal VE exceeds the level of the reference signal VR, the higher the duty ratio r=Ton/T of the chopper switch 3S, and in other words, the higher the step-up ratio Vo/Vi=1/(1−r) of the step-up chopper 3.

When the output voltage Vo is substantially equal to the desired voltage ET (Vo≈ET), the level of the error signal VE falls within the variation range of the reference signal VR, and in particular, is higher than the bottom level LB of the reference signal VR (cf. the straight line LB shown in FIG. 2): VE>LB. When the output voltage Vo slightly falls from the desired voltage ET (Vo<ET), the level of the error signal VE rises. At that time, the PWM circuit 4C increases the pulse widths of the switching signal SG. Thereby, the output voltage Vo rises, and returns to the desired voltage ET. Conversely, when the output voltage Vo slightly rises from the desired voltage ET (Vo>ET), the level of the error signal VE falls. At that time, the PWM circuit 4C reduces the pulse widths of the switching signal SG. Thereby, the output voltage Vo falls, and returns to the desired voltage ET. Thus, the PWM circuit 4C suppresses fluctuations of the output voltage Vo of the step-up chopper 3 by adjusting the pulse widths of the switching signal SG based on the reference signal VR and the error signal VE, and thereby maintains the output voltage Vo substantially equal to the desired voltage ET.

The bypass switch 5 is connected in parallel with the step-up chopper 3, between the high side input terminal 1A and the high side output terminal 2A of the direct-current power supply 10. The bypass switch 5 is preferably a P-channel MOSFET, whose drain is connected to the high side input terminal 1A, whose source is connected to the high side output terminal 2A, and whose gate is connected to the bypass control section 6. The bypass switch 5 is turned off and on, when the logical level of the gate is the H and L level, respectively. The path from the high side input terminal 1A to the high side output terminal 2A through the bypass switch 5 acts as a bypass of the path inside the step-up chopper 3 that includes the series connection of the inductor 3L and the diode 3D. The ON resistance of the bypass switch 5 is preferably smaller than the resistance of the series connection of the inductor 3L and the diode 3D.

The bypass control section 6 includes a comparator. The comparator detects a potential difference between its inverting and non-inverting input terminals. When the inverting input terminal is at a potential high than that of the non-inverting input terminal, the comparator maintains the potential of its output terminal at the L level. Conversely, when the inverting input terminal is at a potential lower than that of the non-inverting input terminal, the comparator maintains the potential of the output terminal at the H level. The inverting and non-inverting input terminals of the bypass control section 6 are connected to the high side input terminal 1A and the high side output terminal 2A, respectively, and the output terminal is connected to the gate of the bypass switch 5. Thereby, the potentials of the inverting and non-inverting input terminals are equal to the battery voltage Vi and the output voltage Vo, respectively.

The bypass control section 6 performs the on-off control over the bypass switch 5, based on the difference from the battery voltage Vi and the output voltage Vo, as follows. When the battery voltage Vi is higher than the output voltage Vo (Vi>Vo), the bypass control section 6 maintains its output at the L level, thereby maintaining the bypass switch 5 in the ON state. When the battery voltage Vi is lower than the output voltage Vo (Vi<Vo), the bypass control section 6 maintains its output at the H level, thereby maintaining the bypass switch 5 in the OFF state.

When the bypass switch 5 is maintained in the ON state in the non-operating period of the step-up chopper 3, that is, the period when the chopper switch 3S is maintained in the OFF state, an current Io flowing from the battery B to the external load L (hereafter, a load current) is split into two branches between the high side input terminal 1A and the high side output terminal 2A. One branch I3 flows through the series connection of the inductor 3L and the diode 3D, and then, causes a voltage drop by the resistance of the series connection. The other branch (bypass current) I5 flows through the bypass switch 5, and then, causes a voltage drop by the ON resistance of the bypass switch 5 between the drain and source (hereafter, ON voltage). The voltage drop due to the series connection of the inductor 3L and the diode 3D is equal to the ON voltage of the bypass switch 5. The voltage drop is hereafter referred to as a non-operating voltage drop Von. Let R be the resistance between the high side input terminal 1A and the high side output terminal 2A during the ON period of the bypass switch 5. The non-operating voltage drop Von is equal to the product of the resistant R and the load current Io: Von=R×Io. Thus, the output voltage Vo is maintained at a level lower than the battery voltage Vi by the non-operating voltage drop Von, when the bypass switch 5 is maintained in the ON state in the non-operating period of the step-up chopper 3.

Figure 3A:
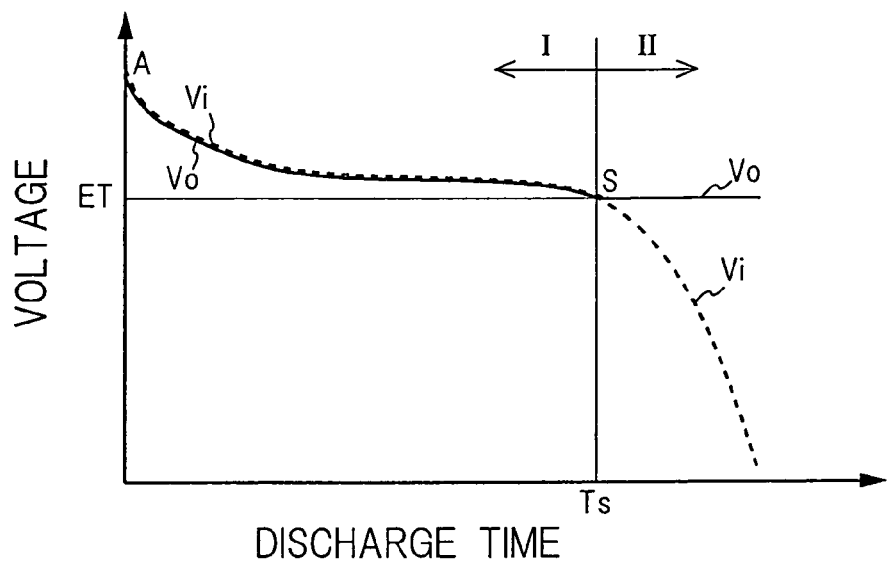
FIG. 3A is a graph showing temporal variations in a battery voltage Vi and an output voltage Vo throughout a discharge period of a battery B in the direct-current power supply 10 according to Embodiment 1 of the present invention.
Figure 3B:
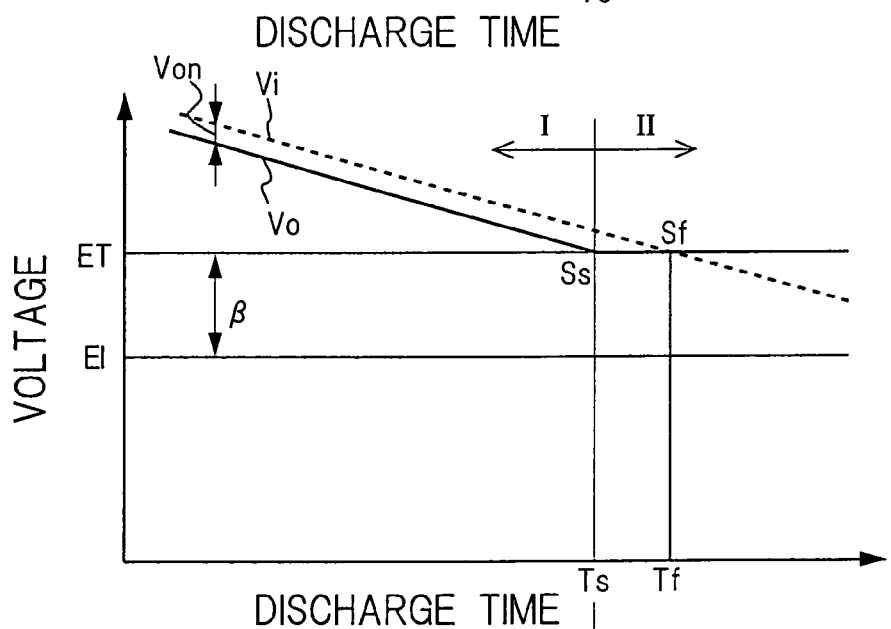
FIG. 3B is an enlarged view of the vicinity of the point Ss shown in FIG. 3A, at which the output voltage Vo meets a desired voltage ET.

At power-on by the connection to the battery B under the fully charged conditions, for example, the direct-current power supply 10 transmits power from the battery B to the external load L using the above-described components as follows. During the discharge period of the battery B, the battery voltage Vi and the output voltage Vo of the direct-current power supply 10 exhibit the temporal variations as shown in FIGS. 3A and 3B. Here, the broken and solid lines show the temporal variations of the battery voltage Vi and the output voltage Vo, respectively.

Immediately after the battery B under the fully charged conditions is connected to the direct-current power supply 10, the bypass control section 6 turns the bypass switch 5 on since the battery voltage Vi is higher than the output voltage Vo. The bypass current I5 flows due to the turning on of the bypass switch 5. At that time, the output voltage Vo of the direct-current power supply 10 (solid line) is maintained lower than the battery voltage Vi (broken line) by the non-operating voltage drop Von, as shown in FIG. 3B.

Immediately after the connection of the direct-current power supply 10 and the fully charged battery B, the battery voltage Vi is at the level under the fully charged conditions, or an initial voltage. See the point A shown in FIG. 3A. At that time, the converter control section 4 starts, and thereby, the OSC 4A begins to send the reference signal VR. The converter control section 4 further performs an initialization process in parallel with the start of the OSC 4A. The initialization process includes, for example, the startup of internal voltage sources for providing reference voltages, the initialization of latch circuits, and so on. The converter control section 4 changes its state at the start into the state ready for the switching control through the initialization process. Here, the starting time of the converter control section 4 refers to the time required for the transition in state. The usual starting time of the converter control section 4 is substantially longer than zero, however, very shorter than the duration within the plateau of the discharge curve in the early and middle stages of the discharge of the battery B, that is, when the battery voltage Vi falls in a relatively slow pace (the region I shown in FIG. 3A). Accordingly, the converter control section 4 changes into the state ready for the switching control as soon as the discharge of the battery B starts.

Figure 3C:
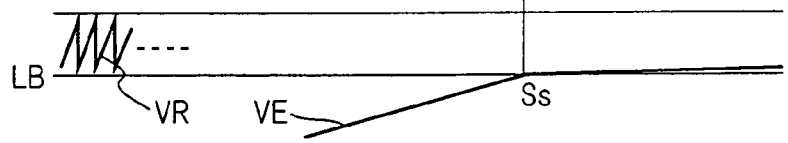
FIG. 3C is a waveform chart of the reference signal VR and the error signal VE in the discharge period shown in FIG. 3B.

The battery voltage Vi steeply drops upon the start of the discharge, and then falls in a relatively slow pace. See the region I shown in FIG. 3A. The type and cell number of the battery B are selected so that the output voltage Vo is maintained higher enough than the desired voltage ET in the region I. Accordingly, the level of the error signal VE is lower than the bottom level LB of the reference signal VR in the region I. See FIG. 3C. Therefore, the PWM circuit 4C maintains the pulse width and level of the switching signal SG at zero and the L level, respectively. Thereby, the chopper switch 3S is maintained in the OFF state. Thus, the converter control section 4 stays in the state ready for the switching control in the region I, and the step-up chopper 3 maintains its non-operating state.

In the region I, the output voltage Vo is lower than the battery voltage Vi by the non-operating voltage drop Von. Accordingly, the bypass control section 6 maintains the bypass switch 5 in the ON state. During the ON period of the bypass switch 5, the load current Io is split into the current I3 that passes the series connection of the inductor 3L and the diode 3D and the bypass current I5, between the high side input terminal 1A and the high side output terminal 2A. Thus, the non-operating voltage drop Von is low since the resistance between the high side input terminal 1A and the high side output terminal 2A is reduced due to the turning on of the bypass switch 5. As a result, the conduction loss of the direct-current power supply 10 is low in the region I, and therefore, the use efficiency of the battery capacity is maintained high.

The battery voltage Vi sharply drops in the last stages of the discharge of the battery B. The sharp drop causes the output voltage Vo to abruptly drop, and to fall to the desired voltage ET at the time Ts. See the point Ss shown in FIGS. 3A and 3B. When the battery B is, in particular, a high energy density lithium ion rechargeable battery, the output voltage Vo falls to the desired voltage ET in the middle stages of the discharge. At that time, the level of the error signal VE reaches the bottom level LB of the reference signal VR. See the point Ss shown in FIG. 3C. Accordingly, the PWM circuit 4C starts at once the switching in level of the switching signal SG. Thereby, the chopper switch 3S starts the switching operation inside the step-up chopper 3. Thus, the step-up chopper 3 promptly starts its boost operation.

At the time Ts, the output voltage Vo is lower than the battery voltage Vi by the non-operating voltage drop Von. Even after the time Ts, the bypass control section 6 maintains the bypass switch 5 in the ON state as well, until the time Tf when the output voltage Vo meets the battery voltage Vi. See the point Sf shown in FIG. 3B. Thereby, the output voltage Vo is maintained equal to or beyond the level lower than the battery voltage Vi by the non-operating voltage drop Von.

As a result of the prompt start of the boost operation by the step-up chopper 3 at the time Ts and the ON state held by the bypass switch 5 from the time Ts through the time Tf, the output voltage Vo is maintained substantially equal to the desired voltage ET on and after the time Ts regardless of the further fall of the battery voltage Vi. From the time Ts through the time Tf, in particular, no excessive undershoots occur on the output voltage Vo. Thus, the direct-current power supply 10 can maintain the output voltage Vo substantially equal to the desired voltage ET after the time Ts until the instant when the battery B nearly reaches the complete discharge state. See the region II shown in FIG. 3. As a result, almost all the capacity of the battery B can be provided for the external load L as its power. Especially when the battery-powered electronic appliance with wireless communications capabilities adopts high energy density lithium ion rechargeable batteries, the output voltage Vo falls below the desired voltage ET in the middle stages of the discharge, caused by the fall of the battery voltage Vi. In such a case, in particular, the direct-current power supply 10 has advantages in improvement of the use efficiency of the battery capacity.

In the direct-current power supply 10 according to Embodiment 1 of the present invention, the converter control section 4 starts by the connection to the battery B and stays in the state ready for the switching control as described above. When the output voltage Vo falls to the desired voltage ET, the converter control section 4 starts the switching control at once. Thereby, the step-up chopper 3 promptly starts its boost operation. On the other hand, until the instant when the output voltage Vo meets the battery voltage Vi, the bypass control section 6 maintains the bypass switch 5 in the ON state. Accordingly, no excessive undershoots occur on the output voltage Vo immediately after the turning off of the bypass switch 5. Furthermore, no switching losses arise since the bypass switch 5 is turned off under the conditions where the bypass current I5 is substantially equal to zero. Thus, sudden aborts of electronic devices due to sudden drops of its operating voltages below the allowable lower limit are prevented.

In the direct-current power supply 10 according to Embodiment 1 of the present invention, the bypass control section 6 determines the on/off states of the bypass switch 5, based on the difference Vi−Vo between the potential Vi of its inverting input terminal and the potential Vo of its non-inverting input terminal. Alternatively, the bypass control section 6 may detect the bypass current I5 and based on its size or direction detected, determine the on/off states of the bypass switch 5. Preferably, after the start of the boost operation by the step-up chopper 3, the bypass switch 5 is turned off at the instant when the bypass current I5 falls substantially to be zero. The bypass switch 5 may be turned off at the instant when the direction of the bypass current I5 is reversed. The bypass control section 6 may further detect the output current of the step-up chopper 3 and the load current Io, and based on the values detected, determine the on/off states of the bypass switch 5. For example, the bypass switch 5 may be turned off at the instant when the load current Io substantially meets the output current of the step-up chopper 3.

Embodiment 2

Figure 4:
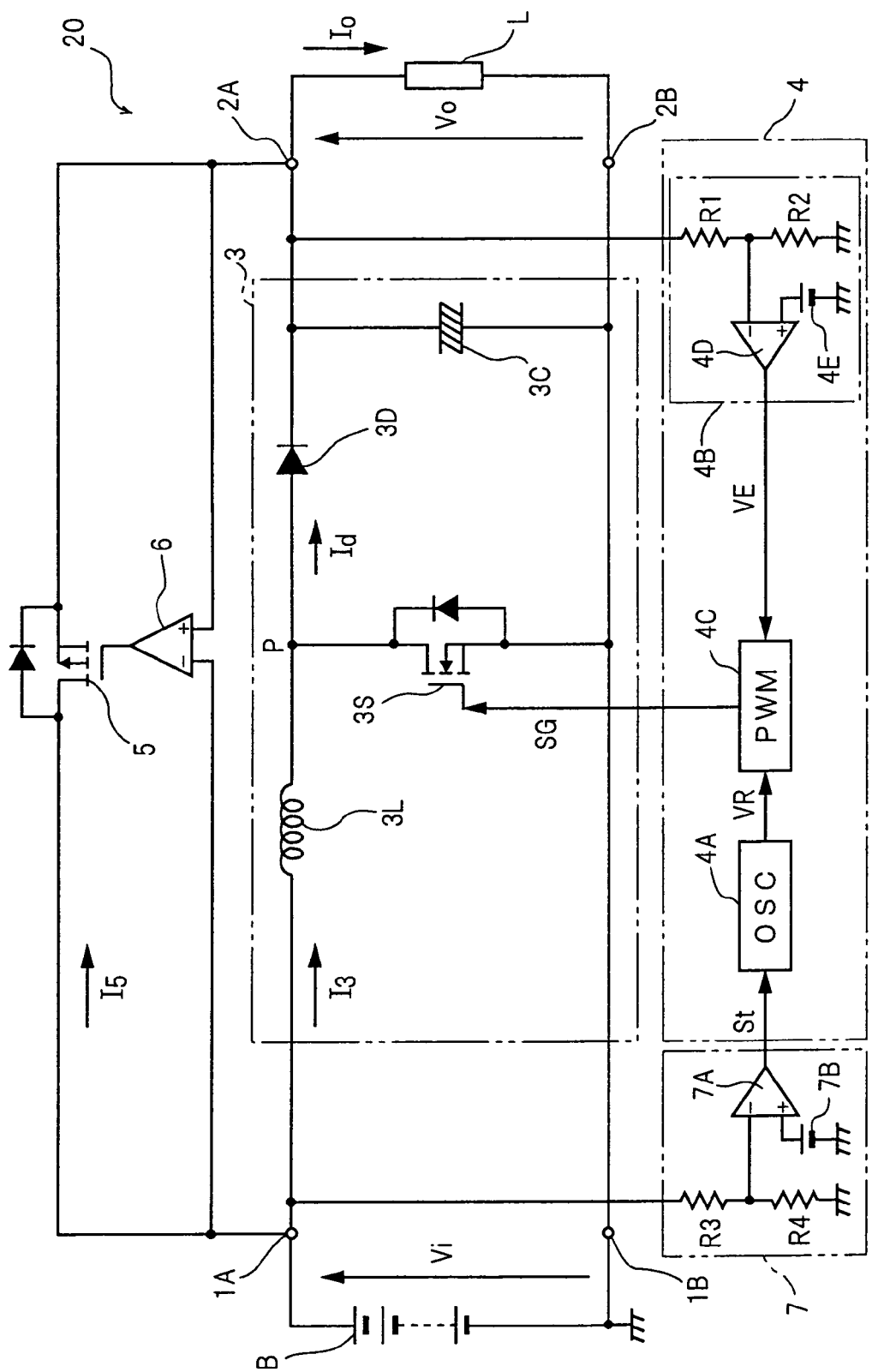
FIG. 4 is a circuit diagram of a direct-current power supply 20 according to Embodiment 2 of the present invention.

FIG. 4 is the circuit diagram of a direct-current power supply 20 according to Embodiment 2 of the present invention. The direct-current power supply 20 includes components similar to components of the direct-current power supply 10 according to Embodiment 1 shown in FIG. 1. Accordingly, in FIG. 4, the similar components are marked with the same reference symbols as the reference symbols shown in FIG. 1. Furthermore, for the details of the similar components, the description about Embodiment 1 is cited.

The direct-current power supply 20 according to Embodiment 2 of the present invention comprises an input voltage detecting section 7 in contrast to the direct-current power supply 10 according to Embodiment 1. The input voltage detecting section 7 monitors the battery voltage Vi. When the battery voltage Vi falls, for example, from the initial voltage (cf. the point A shown in FIG. 3A) to a predetermined level, (hereafter, a start input voltage Ei,) the input voltage detecting section 7 detects the fall, and furthermore, sends the start signal St to the converter control section 4 at the same time of the detection. Thereby, the converter control section 4 starts, and the OSC 4A starts the sending of the reference signal VR.

The input voltage detecting section 7 includes a second potential divider, (a series connection of two resistors R3 and R4,) a second reference voltage source 7B, and a second comparator 7A. The second voltage divider causes the battery voltage Vi to fall by a second dividing ratio F1=R4/(R3+R4). The voltage of the second reference voltage source 7B is equal to the level of F1×Ei, the second dividing ratio F1 times as high as the start input voltage Ei. The start input voltage Ei is set to be at the lowest equal to the sum of the desired voltage ET and a maximum voltage drop Vonmax: Ei≧ET+Vonmax. Here, the maximum voltage drop Vonmax depends on the upper limit of the non-operating voltage drop Von, that is, the resistance R between the high side input terminal 1A and the high side output terminal 2A during the ON period of the bypass switch 5 multiplied by the allowable upper limit Iomax of the load current Io: Vonmax=R×Iomax.

The second comparator 7A compares the output voltage F1×Vi of the second voltage divider with the voltage F1×Ei of the second reference voltage source 7B, and based on the levels compared, sends a logical level as the level of the start signal St. More specifically, the second comparator 7A maintains its output at the L level when the output voltage F1×Vi of the second voltage divider is higher than the voltage F1×Ei of the second reference voltage source 7B. Conversely, the second comparator 7A maintains its output at the H level when the output voltage F1×Vi of the second voltage divider is lower than the voltage F1×Ei of the second reference voltage source 7B. The converter control section 4 stops and operates when the start signal St is at the L and H levels, respectively. As a result, the converter control section 4 stops when the battery voltage Vi is higher than the start input voltage Ei, and starts when the battery voltage Vi falls to the start input voltage Ei.

At the connection to the battery B, for example, the direct-current power supply 20 transmits power from the battery B to the external load L as follows. The battery voltage Vi is higher than the output voltage Vo at the connection of the battery B and the direct-current power supply 20. Accordingly, the bypass control section 6 turns the bypass switch 5 on, and thereby, the bypass current I5 flows. At that time, the output voltage Vo is maintained lower than the battery voltage Vi by the non-operating voltage drop Von. Furthermore, the battery voltage Vi is in general higher enough than the start input voltage Ei. Accordingly, the input voltage detecting section 7 maintains the start signal St at the L level. Thereby, the converter control section 4 maintains its non-operating state.

The battery voltage Vi gradually falls with passage of the discharge time. When the battery voltage Vi falls to the start input voltage Ei, the input voltage detecting section 7 activates the start signal St, or changes the start signal St into the H level. Thereby, the converter control section 4 starts. In other words, the OSC 4A starts the sending of the reference signal VR, and then, the initialization process is performed. Thus, the converter control section 4 changes into the state ready for the switching control after the starting-time of the converter control section 4 has elapsed from the instant when the fall of the battery voltage Vi to the start input voltage Ei.

At the fall of the battery voltage Vi to the start input voltage Ei, the output voltage Vo is lower than the battery voltage Vi by the non-operating voltage drop Von. Accordingly, the bypass control section 6 maintains the bypass switch 5 in the ON state. Thereby, the output voltage Vo is maintained lower than the battery voltage Vi by the non-operating voltage drop Von during, at the shortest, the starting-time of the converter control section 4. Here, the start input voltage Ei is equal to or higher than the sum of the desired voltage ET and the maximum voltage drop Vonmax, and the desired voltage ET is equal to or higher than the non-operating output lower limit Ec: $Ei \geq ET+Vonmax$ and $ET \geq Ec$. Accordingly, the start input voltage Ei is equal to or higher than the sum of the non-operating output lower limit Ec and the maximum voltage drop Vonmax: $Ei \geq Ec+Vonmax$. Therefore, the output voltage Vo is equal to or higher than the non-operating output lower limit Ec at the fall of the battery voltage Vi to the start input voltage Ei: $Vo \geq Ei-Vonmax \geq Ec=El+\alpha$. Thus, the output voltage Vo is maintained higher enough than the allowable lower limit El of the operating voltage of the external load L during the starting-time of the converter control section 4.

Furthermore, during the ON period of the bypass switch 5, the load current Io is split into the current I3 that passes through the series connection of the inductor 3L and the diode 3D, and the bypass current I5. Thus, the non-operating voltage drop Von is low since the resistance between the high side input terminal 1A and the high side output terminal 2A is reduced due to the turning on of the bypass switch 5. As a result, the conduction loss of the direct-current power supply 10 is low, and therefore, the use efficiency of the battery capacity is maintained high.

When the output voltage Vo falls to the desired voltage ET, the level of the error signal VE reaches the bottom level LB of the reference signal VR. See the point Ss shown in FIGS. 3B and 3C. Accordingly, the PWM circuit 4C starts at once the switching in level of the switching signal SG. Thereby, the chopper switch 3S starts the switching inside the step-up chopper 3. Thus, the step-up chopper 3 promptly starts its boost operation. On the other hand, the output voltage Vo is lower than the battery voltage Vi by the non-operating voltage drop Von. See the point Ss shown in FIG. 3B. The bypass control section 6 maintains the bypass switch 5 in the ON state from the instant when the output voltage Vo falls to the desired voltage ET until the instant when the battery voltage Vi meets the output voltage Vo. See the point Sf shown in FIG. 3B. Thereby, the output voltage Vo is maintained equal to or beyond the level lower than the battery voltage Vi by the non-operating voltage drop Von. As a result, the output voltage Vo is maintained substantially equal to the desired voltage ET after the fall to the desired voltage ET. See FIG. 3B. In particular, no undershoots occur on the output voltage Vo. Furthermore, no switching losses arise since the bypass switch 5 is turned off under the conditions where the bypass current I5 is substantially equal to zero. Thus, the direct-current power supply 20 according to Embodiment 2 of the present invention has the stability of the output voltage with high reliability.

In addition, the direct-current power supply 20 according to Embodiment 2 of the present invention can maintain the output voltage Vo substantially equal to the desired voltage ET until the instant when the battery B nearly reaches the complete discharge state. As a result, almost all the capacity of the battery B can be provided for the external load L as its power. Especially when the battery-powered electronic appliance with wireless communications capabilities adopts high energy density lithium ion rechargeable batteries, the output voltage Vo falls below the desired voltage ET in the middle stages of the discharge due to the fall of the battery voltage Vi. In such a case, in particular, the direct-current power supply 20 has advantages in improvement in use efficiency of battery capacity.

The lower the start input voltage Ei is set within the range where the above-described setting condition is satisfied, the later the converter control section 4 starts. Thereby, a power consumption of the converter control section 4 can be reduced during the non-operating period of the step-up chopper 3 (the region I shown in FIG. 3A)

Embodiment 3

A direct-current power supply according to Embodiment 3 of the present invention comprises circuitry in common with the direct-current power supply 20 according to Embodiment 2 shown in FIG. 4. Accordingly, FIG. 4 is referred to for the circuitry, and the description about Embodiment 2 is cited for the details of the common part.

The direct-current power supply according to Embodiment 3 of the present invention is different from the direct-current power supply 20 according to Embodiment 2 in the following ways. First, the input voltage detecting section 7 sets the start input voltage Ei at the lowest equal to the sum of the non-operating output lower limit Ec and the maximum voltage drop Vonmax: $Ei \geq Ec+Vonmax$. Next, the PWM circuit 4C sets a lower limit Tonmin to be reckoned with (hereafter, a minimum ON width), for the ON time Ton of the chopper switch 3S. Thereby, a lower limit $rmin=Tonmin/T$ is provided for the duty ratio $r=Ton/T$ (T: the switching period). Accordingly, a lower limit higher than 1, $1/(1-rmin)>1$ (hereafter, a lowest step-up ratio) is provided for the step-up ratio $Vo/Vi=1/(1-r)$ of the step-up chopper 3. The feedback circuit 4B then sets the desired voltage ET to be at the lowest equal to either the product of the start input voltage Ei and the lowest step-up ratio $1/(1-rmin)$, or the operating output lower limit Eo, whichever is higher: $ET \geq \max(Ei/(1-rmin), Eo)$.

Figure 5:
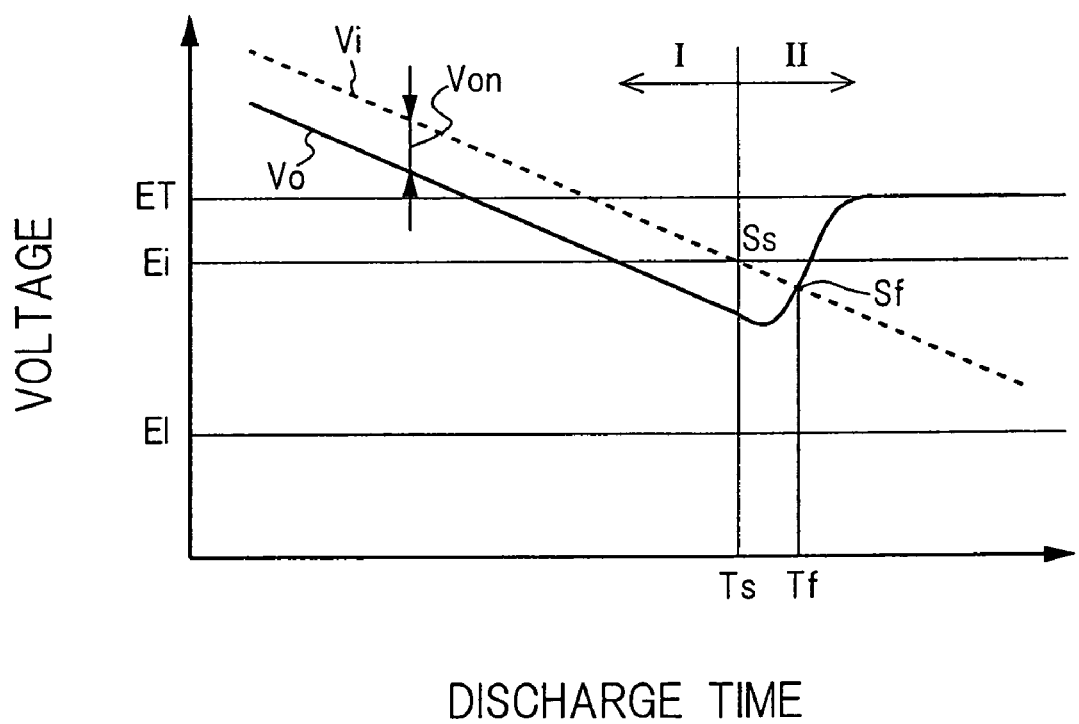
FIG. 5 is a graph showing temporal variations in the battery voltage Vi and the output voltage Vo in a discharge period of a battery B in the direct-current power supply 20 according to Embodiment 2 of the present invention, and in particular, an enlarged view of the vicinity of the meeting point Ss of the battery voltage Vi and a start input voltage Ei.

The battery voltage Vi and the output voltage Vo of the direct-current power supply exhibit temporal variations shown in FIG. 5 during the discharge period of the battery B. Here, broken and solid lines show the temporal variations of the battery voltage Vi and the output voltage Vo, respectively.

During the period when the battery voltage Vi is higher than the start input voltage Ei (the region I shown in FIG. 5), the input voltage detecting section 7 maintains the start signal St at the L level, and accordingly, the converter control section 4 maintains its non-operating state. Accordingly, the converter control section 4 maintains the switching signal SG at the L level, and then, the chopper switch 3S is maintained in the OFF state. In other words, the step-up chopper 3 maintains its non-operating state. On the other hand, in the region I, the bypass control section 6 maintains the bypass switch 5 in the ON state, since the battery voltage Vi is higher than the output voltage Vo. During the ON period of the bypass switch 5, the load current Io is split into the two branches between the high side input terminal 1A and the high side output terminal 2A, and therefore, the conduction losses of the direct-current power supply 10 are reduced during the non-operating period of the step-up chopper 3, in a manner similar to that of Embodiment 1.

When the battery voltage Vi falls below the desired voltage ET and further falls to the start input voltage Ei (cf. the point Ss shown in FIG. 5), the input voltage detecting section 7 activate the start signal St. Thereby, the converter control section 4 starts. After the time Ts, the OSC 4A sends the reference signal VR and the initialization process is performed. At the time Ts, the output voltage Vo is lower than the desired voltage ET: Vo<ET. Accordingly, when the starting-time of the converter control section 4 has elapsed from the time Ts, the PWM circuit 4C starts at once the switching in level of the switching signal SG. Thereby, the chopper switch 3S starts its switching operation inside the step-up chopper 3. In other words, the step-up chopper 3 starts its boost operation. On the other hand, the output voltage Vo is lower than the battery voltage Vi by the non-operating voltage drop Von. Accordingly, the bypass control section 6 maintains the bypass switch 5 in the ON state. Thereby, after the time Ts, at the earliest, until the starting-time of the converter control section 4 elapses, the output voltage Vo is maintained equal to or beyond the level lower than the battery voltage Vi by the non-operating voltage drop Von. See the point Ss shown in FIG. 5. Here, the start input voltage Ei is equal to or higher than the sum of the non-operating output lower limit Ec and the maximum voltage drop Vonmax: $Ei \geq Ec + Vonmax$. Therefore, at the time Ts, the output voltage Vo is equal to or beyond the non-operating output lower limit Ec: $Vo \geq Ei - Vonmax \geq Ec = El + \alpha$. Thus, the output voltage Vo is maintained higher enough than the allowable lower limit El of the operating voltage of the external load L from the time Ts until the starting-time of the converter control section 4 has elapsed.

At the start of the boost operation by the step-up chopper 3, the battery voltage Vi is lower than the start input voltage Ei: Vi<Ei (cf. FIG. 5), since the start input voltage Ei further continues the fall after the time Ts. Here, the desired voltage ET is equal to or beyond the lowest step-up ratio $Ei/(1-rmin)$ times as high as the start input voltage Ei: $ET \geq Ei/(1-rmin)$. Accordingly, the ratio ET/Vi of the desired voltage ET to the battery voltage Vi is higher than the lowest step-up ratio $1/(1-rmin)$: $ET/Vi > ET/Ei \geq 1/(1-rmin)$. Therefore, the converter control section 4 can control the step-up chopper 3 with stability so that the output voltage Vo does not substantially exceed the desired voltage ET. Thus, the step-up chopper 3 operates with stability.

The stable boost operation by the step-up chopper 3 maintains with stability the output voltage Vo substantially equal to the desired voltage ET. Here, the desired voltage ET is equal to or beyond the operating output lower limit Eo: $ET \geq Eo$. Accordingly, the output voltage Vo is maintained higher enough than the allowable lower limit El of the operating voltage of the external load L during the period from the time Ts through the time Tf. Thus, the direct-current power supply 20 has high reliability for the stability of the output voltage Vo.

Furthermore, after the time Ts until the battery B nearly reaches the complete discharge state, the direct-current power supply 20 can maintain the output voltage Vo substantially equal to the desired voltage ET. As a result, almost all the capacity of the battery B can be provided for the external load L as its power. In particular, when the battery-powered electronic appliance with wireless communications capabilities adopts the high energy density lithium ion rechargeable batteries, the output voltage Vo falls below the desired voltage ET in the middle stages of the discharge due to the fall of the battery voltage Vi. In such a case, in particular, the direct-current power supply 20 has advantages in the improvement in use efficiency of battery capacity.

After the starting-time of the converter control section 4 has elapsed from the time Ts, the output voltage Vo promptly rises due to the boost operation of the step-up chopper 3, and meets the battery voltage Vi at the time Tf. See the point Sf shown in FIG. 5. At that time, the bypass control section 6 turns the bypass switch 5 off. Thus, the switching loss due to the turning off of the bypass switch 5 is suppressed.

Embodiment 4

Figure 6:
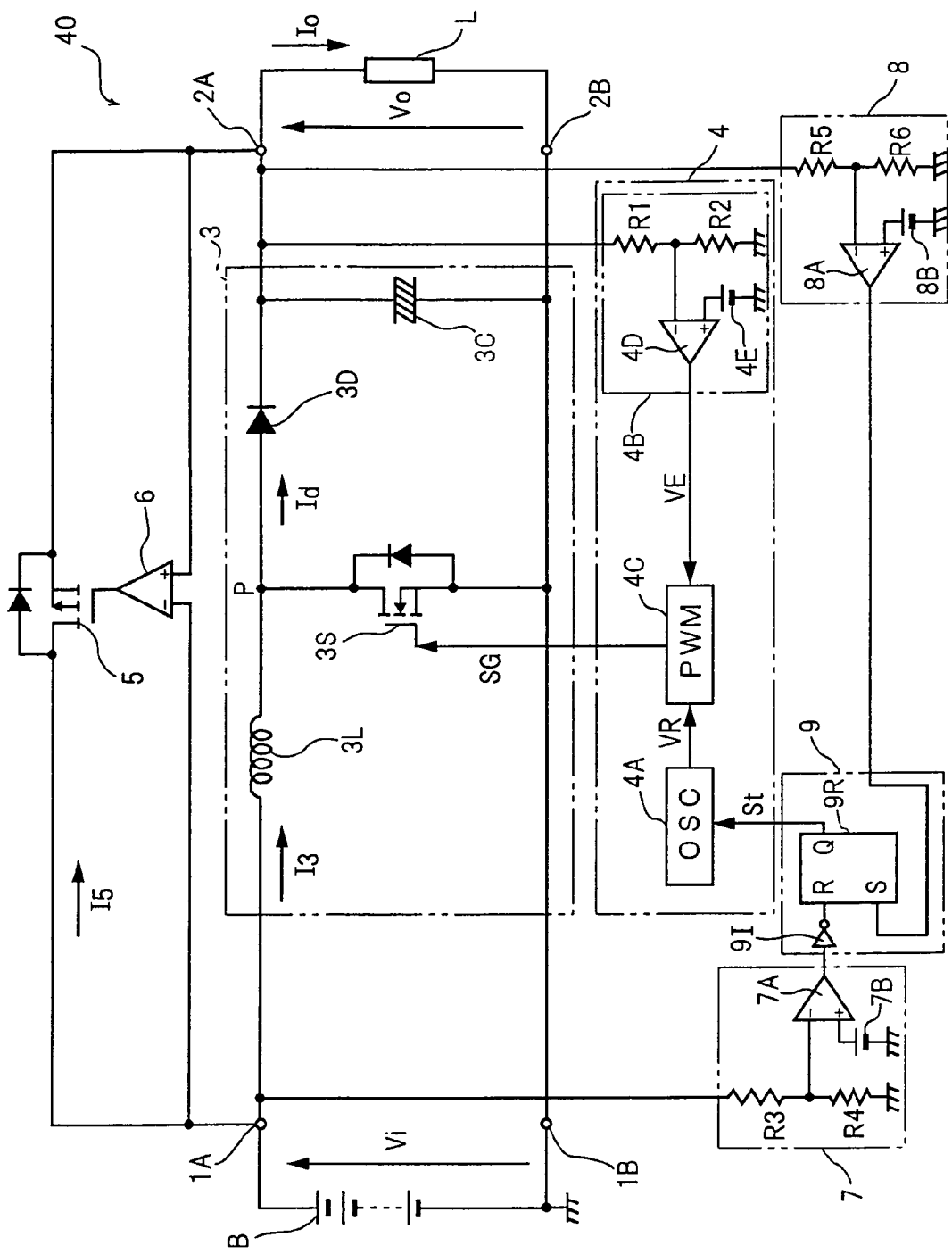
FIG. 6 is a circuit diagram of a direct-current power supply 40 according to Embodiment 4 of the present invention.

FIG. 6 is the circuit diagram of the direct-current power supply 40 according to Embodiment 4 of the present invention. The direct-current power supply 40 according to Embodiment 4 has circuitry similar to that of the direct-current power supply 20 according to Embodiment 2. Accordingly, in FIG. 6, those similar components are marked with the same reference symbols as the reference symbols shown in FIG. 4. Furthermore, for the details of those similar components, the description about Embodiment 2 is cited.

The direct-current power supply 40 according to Embodiment 4 of the present invention comprises an output voltage detecting section 8 and a starting control section 9 in addition to the components of the direct-current power supply 20 according to Embodiment 2, and is different from the direct-current power supply 20 according to Embodiment 2 in the following ways. First, the output voltage detecting section 8 monitors the output voltage Vo and, when detecting a fall of the output voltage Vo to the start output voltage Eu, informs the starting control section 9 of the detection. The starting control section 9 then sends the start signal St to the converter control section 4. Thereby, the converter control section 4 starts. Here, the start output voltage Eu is set at the lowest equal to the non-operating output lower limit Ec: $Eu \geq Ec$.

Next, the PWM circuit 4C sets a minimum ON width Tonmin of the chopper switch 3S. Then, the step-up ratio of the step-up chopper 3, $Vo/Vi = 1/(1-Ton/T) = 1/(1-r)$ (T: the switching period, r: the duty ratio of the chopper switch 3S=Ton/T), is provided with a lowest step-up ratio, 1/(1−Tonmin/T)=1/(1−rmin)>1 (rmin: the lower limit of the duty ratio=Tonmin/T), in a manner similar to that of Embodiment 2. The feedback circuit 4B sets the desired voltage ET to be at the lowest equal to either the product of the lowest step-up ratio of the step-up chopper 3 1/(1−rmin) and the sum of the start output voltage Eu and the maximum voltage drop Vonmax, (Eu+Vonmax)/(1−rmin), or the operating output lower limits Eo, whichever is higher: ET≧max((Eu+Vonmax)/(1−rmin), Eo). The desired voltage ET is, in particular, higher than the start output voltage Eu: ET>Eu.

Furthermore, the input voltage detecting section 7 monitors the battery voltage Vi and, when detecting the rise of the battery voltage Vi from a level lower than a stop input voltage Es to the stop input voltage Es, informs the starting control section 9 of the detection. The starting control section 9 then sends a stop signal Su to the converter control section 4. Thereby, the converter control section 4 stops. Here, the stop input voltage Es is set within the range from a lower limit substantially equal to the sum of the start output voltage Eu and the maximum voltage drop Vonmax to an upper limit substantially equal to the desired voltage ET divided by the lowest step-up ratio 1/(1−rmin): Eu+Vonmax≦Es≦ET×(1−rmin).

The input voltage detecting section 7 sets the voltage of the second reference voltage source 7B to be equal to a second dividing ratio F1 times as high as the stop input voltage Es, F1×Es. Thereby, the second comparator 7A maintains its output at the L level when the battery voltage Vi is higher than the stop input voltage Es. Conversely, the second comparator 7A maintains its output at the H level when the battery voltage Vi is lower than the stop input voltage Es.

The output voltage detecting section 8 includes a third voltage divider (a series connection of two resistors R5 and R6), a third reference voltage source 8B, and a third comparator 8A. The third voltage divider causes the output voltage Vo of the direct-current power supply 40 to fall by a third dividing ratio F2=R6/(R5+R6). The voltage of the third reference voltage source 8B is equal to the third dividing ratio F2 times as high as the start output voltage Eu, F2×Eu. The third comparator 8A compares the output voltage F2×Vo of the third voltage divider with the voltage F2×Eu of the third reference voltage source 8B, and based on their relative levels, sends the logical level. More specifically, the third comparator 8A maintains its output at the L level when the output voltage F2×Vo of the third voltage divider is higher than the voltage F2×Eu of the third reference voltage source 8B, in other words, when the output voltage Vo is higher than the start output voltage Eu. Conversely, the third comparator 8A maintains its output at the H level when the output voltage F2×Vo of the third voltage divider is lower than the voltage F2×Eu of the third reference voltage source 8B, in other words, when the output voltage Vo is lower than the start output voltage Eu.

The starting control section 9 includes an inverter 9I and a latch circuit 9R. The inverter 9I inverts the logical level of the input voltage detecting section 7, and sends it to the reset R of the latch circuit 9R. The latch circuit 9R receives the outputs of the inverter 9I and the output voltage detecting section 8 from the reset R and the set S, respectively. During the period when the battery voltage Vi is lower than the stop input voltage Es, the inverter 9I maintains the reset R at the L level since the input voltage detecting section 7 maintains its output at the H level. In the period, the output voltage detecting section 8 changes its output into the H level, when the output voltage Vo falls below the start output voltage Eu.

Then, the set S is changed into the H level. Accordingly, the output Q of the latch circuit 9R is changed into the H level. After the level changes, the latch circuit 9R fixes the output Q at the H level regardless of the level of the set S, during the period when the reset R is maintained at the L level. When the battery voltage Vi exceeds the stop input voltage Es, the input voltage detecting section 7 changes its output into the L level. Then, the inverter 9I changes the reset R into the H level. Accordingly, the output Q of the latch circuit 9R is changed into the L level.

For the output Q of the latch circuit 9R, the converter control section 4 interprets a transition from the L level to the H level as the start signal St, and interprets a transition from the H level to the L level as the stop signal Su. In other words, the converter control section 4 starts and stops due to the rising and falling edges of the output Q, respectively. As a result, the converter control section 4 stops in the period when the battery voltage Vi is higher than the stop input voltage Es. On the other hand, in the period when the battery voltage Vi is lower than the stop input voltage Es, the converter control section 4 starts when the output voltage Vo falls to the start output voltage Eu.

At the start of the discharge of the battery B, the bypass control section 6 turns the bypass switch 5 on since the battery voltage Vi is higher than the output voltage Vo. Thereby, in the period when the battery voltage Vi is maintained higher than the stop input voltage Es, the output voltage Vo is maintained at the level lower than the battery voltage Vi by the non-operating voltage drop Von. Accordingly, during the period, the bypass control section 6 maintains the bypass switch 5 in the ON state with stability.

The stop input voltage Es is equal to or higher than the sum of the start output voltage Eu and the maximum voltage drop Vonmax: Es≦Eu+Vonmax. Accordingly, during the period when the battery voltage Vi is maintained higher than the stop input voltage Es (Vi>Es), the output voltage Vo is higher than the start output voltage Eu: Vo≦Vi−Vonmax>Es−Vonmax≧Eu. Therefore, the starting control section 9 maintains its output Q at the L level with stability. As a result, the converter control section 4 maintains the non-operating state with stability. Thereby, the chopper switch 3S is maintained in the OFF state with stability, and in other words, the step-up chopper 3 maintains the non-operating state with stability.

Figure 7:
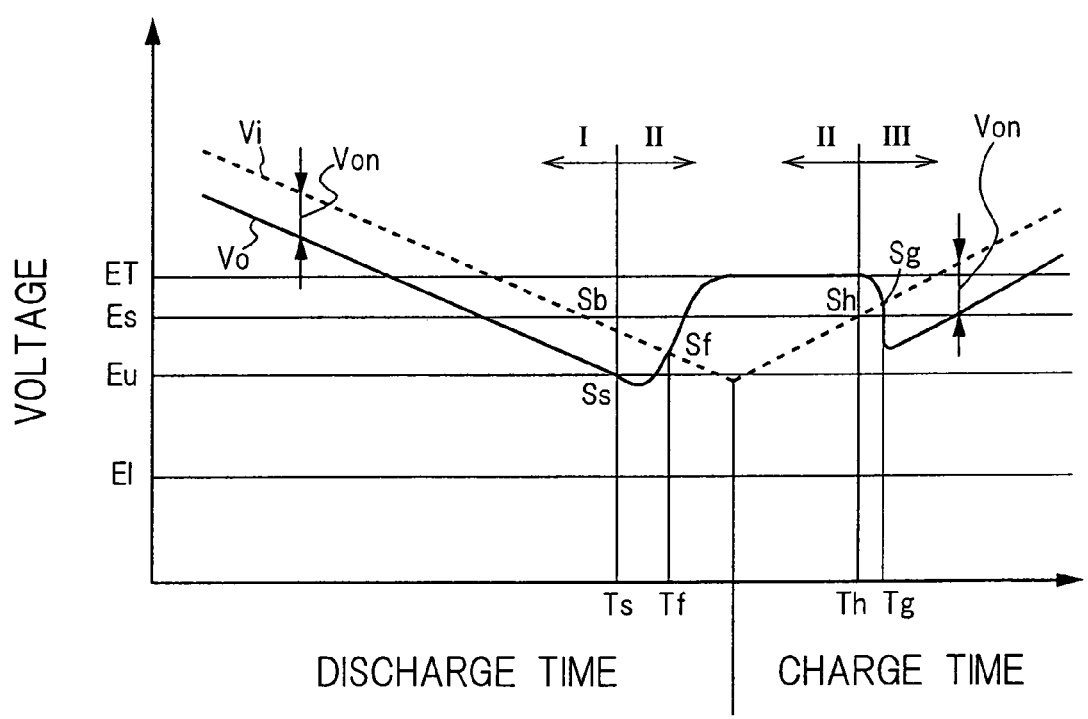
FIG. 7 is a graph showing temporal variations in the battery voltage Vi and the output voltage Vo in the last stages of the discharge and the early stages of the following charge of a battery B, in the direct-current power supply 40 according to Embodiment 4 of the present invention.

The battery voltage Vi and the output voltage Vo of the direct-current power supply 40 exhibit temporal variations shown in FIG. 7, in the middle to last stages of the discharge and the early stages of the following charge of the battery B. Here, broken and solid lines show the temporal variations of the battery voltage Vi and the output voltage Vo, respectively.

During the period when the output voltage Vo is higher than the start output voltage Eu (the region I shown in FIG. 7), the starting control section 9 maintains its output Q at the L level, and then, the step-up chopper 3 maintains the non-operating state. Here, the difference from the stop input voltage Es and the start output voltage Eu is equal to or beyond the maximum voltage drop Vonmax: Es−Eu≧Vonmax. Accordingly, the fall of the battery voltage Vi to the stop input voltage Es (cf. the point Sb shown in FIG. 7) is earlier than the fall of the output voltage Vo to the start output voltage Eu (cf. the point Ss shown in FIG. 7). Accordingly, at the end of the region I, the output Q of the starting control section 9 is maintained at the L level with stability, and therefore, the step-up chopper 3 maintains the non-operating state with stability.

The battery voltage Vi falls to the stop input voltage Es. See the point Sb shown in FIG. 7. At that time, the input voltage detecting section 7 changes its output into the H level, and thereby, the reset R of the latch circuit 9R is changed into the L level. Then, the output voltage Vo falls to the start output voltage Eu. See the point Ss shown in FIG. 7. At that time, the output voltage detecting section 8 changes the set S of the latch circuit 9R into the H level. Accordingly, the latch circuit 9R changes its output Q into the H level, and in other words, sends the start signal St. Thereby, the converter control section 4 starts. After the time Ts, the OSC 4A sends the reference signal VR and a initialization process is performed in a manner similar to that of Embodiment 2.

The start output voltage Eu is lower than the desired voltage ET: Eu<ET. Accordingly, at the time Ts, the output voltage Vo is lower than the desired voltage ET: Vo≈Eu<ET. Therefore, when the starting-time of the converter control section 4 has elapsed from the time Ts, the PWM circuit 4C starts at once the switching in level of the switching signal SG. Thereby, the chopper switch 3S promptly starts its switching operation inside the step-up chopper 3. In other words, the step-up chopper 3 promptly starts the boost operation.

At the time Ts, the bypass switch 5 is in the ON state, and then, the output voltage Vo is lower than the battery voltage Vi by the non-operating voltage drop Von. Accordingly, the bypass control section 6 maintains the bypass switch 5 in the ON state at the time Ts. Thereby, after the time Ts, at the earliest, until the starting-time of the converter control section 4 has elapsed, the output voltage Vo is maintained equal to or beyond the level lower than the battery voltage Vi by the non-operating voltage drop Von. See the point Ss shown in FIG. 7. On the other hand, the start output voltage Eu is equal to or beyond the non-operating output lower limit Ec: Eu≧Ec. Therefore, at the time Ts, the output voltage Vo is substantially equal to or beyond the non-operating output lower limit Ec: Vo≈Eu≧Ec=El+α. As a result, the output voltage Vo is maintained higher enough than the allowable lower limit El of the operating voltage of the external load L from the time Ts until the starting-time of the converter control section 4 has elapsed.

During the ON period of the bypass switch 5, the battery voltage Vi is equal to or lower than the sum of the output voltage Vo and the maximum voltage drop Vonmax: Vi=Vo+Von≦Vo+Vonmax. At the time Ts, in particular, the battery voltage Vi is equal to or lower than the stop input voltage Es, in other words, the desired voltage ET divided by the lowest step-up ratio 1/(1−rmin), ET×(1−rmin): Vi≦Es≦ET×(1−rmin). See the point Ss shown in FIG. 7. Accordingly, the ratio ET/Vi of the desired voltage ET to the battery voltage Vi is equal to or beyond the lowest step-up ratio 1/(1−rmin): ET/Vi≧1/(1−rmin). Therefore, the converter control section 4 can control the step-up chopper 3 with stability so that the output voltage Vo does not substantially exceed the desired voltage ET. Thus, the step-up chopper 3 operates with stability.

The output voltage Vo promptly rises due to the boost operation of the step-up chopper 3 after the starting-time of the converter control section 4 has elapsed from the time Ts, and meets the battery voltage Vi at the time Tf. See the point Sf shown in FIG. 7. At that time, the bypass control section 6 turns the bypass switch 5 off. Thus, the switching loss due to the turning off of the bypass switch 5 is suppressed.

The stable boost operation of the step-up chopper 3 maintains the output voltage Vo substantially equal to the desired voltage ET with stability, after the meeting of the output voltage Vo with the desired voltage ET. Here, the desired voltage ET is equal to or beyond the operating output lower limit Eo: ET≧Eo=El+β. Accordingly, the output voltage Vo is-maintained higher enough than the allowable lower limit El of the operating voltage of the external load L. Thus, for the stability of the output voltage Vo, the direct-current power supply 40 has high reliability.

The direct-current power supply 40 can further maintain the output voltage Vo substantially equal to the desired voltage ET, after the time Ts until the instant when the battery B nearly reaches the complete discharge state. See the region II shown in FIG. 7. As a result, almost all the capacity of the battery B can be provided for the external load L as its power. In particular, when the battery-powered electronic appliance with wireless communications capabilities adopts the high energy density lithium ion rechargeable batteries, the output voltage Vo falls below the desired voltage ET in the middle stages of the discharge due to the fall of the battery voltage Vi. In such a case, in particular, the direct-current power supply 40 has advantage in the improvement in use efficiency of battery capacity.

Assume that the battery-powered electronic appliance is connected to an external power supply after the time Tf, and continues operations using DC power provided through the direct-current power supply 40 in parallel with the charging of the battery B. In the direct-current power supply 40, then, the step-up chopper 3 continues the boost operation and maintains the output voltage Vo at the desired voltage ET. On the other hand, the battery voltage Vi rises due to the charging of the battery B. Thereby, the ratio ET/Vi of the desired voltage ET to the battery voltage Vi falls. When the battery voltage Vi rises to the stop input voltage Es (cf. the point Sh shown in FIG. 7), the input voltage detecting section 7 changes the reset R of the latch circuit 9R into the H level through the inverter 9I. At that time, the latch circuit 9R changes its output Q into the L level. Accordingly, the converter control section 4 stops, and then, the step-up chopper 3 stops. Here, the ratio ET/Es of the desired voltage ET to the stop input voltage Es is equal to or beyond the lowest step-up ratio 1/(1−rmin): ET/Es≧1/(1−rmin). Therefore, the step-up chopper 3 stops with stability at the time Th when the battery voltage Vi rises to the stop input voltage Es.

After the time Th, the output voltage Vo falls from the desired voltage ET, and meets the battery voltage Vi at the time Tg. See the point Sg shown in FIG. 7. At that time, the bypass control section 6 turns the bypass switch 5 on. Thereby, after the time Tg, the output voltage Vo is maintained at the level lower than the battery voltage Vi by the non-operating voltage drop Von: Vo=Vi−Von. Furthermore, the stop input voltage Es is equal to or higher than the sum of the start output voltage Eu and the maximum voltage drop Vonmax, and after the time Th, the battery voltage Vi is equal to or beyond the stop input voltage Es: Es≧Eu+Vonmax and Vi≧Es. Accordingly, after the time Th, the output voltage Vo is maintained equal to or beyond the start output voltage Eu: Vo≧Vi−Vonmax≧Es−Vonmax≧Eu≧Ec=El+α. Thus, the output voltage Vo is maintained higher enough than the allowable lower limit El for the operating voltage of the external load L after the time Th. The output voltage Vo, maintaining the difference from the battery voltage Vi substantially equal to the non-operating voltage drop Von, further rises with the rise of the battery voltage Vi due to the charging of the battery B. See the region III shown in FIG. 7.

As described above, the direct-current power supply 40 according to Embodiment 4 of the present invention maintains the output voltage Vo higher enough than the allowable lower limit El of the operating voltage of the external load L, when the charge and discharge of the battery B is repeated. Therefore, the direct-current power supply has high reliability for the stability of the output voltage Vo.

Embodiment 5

Figure 8:
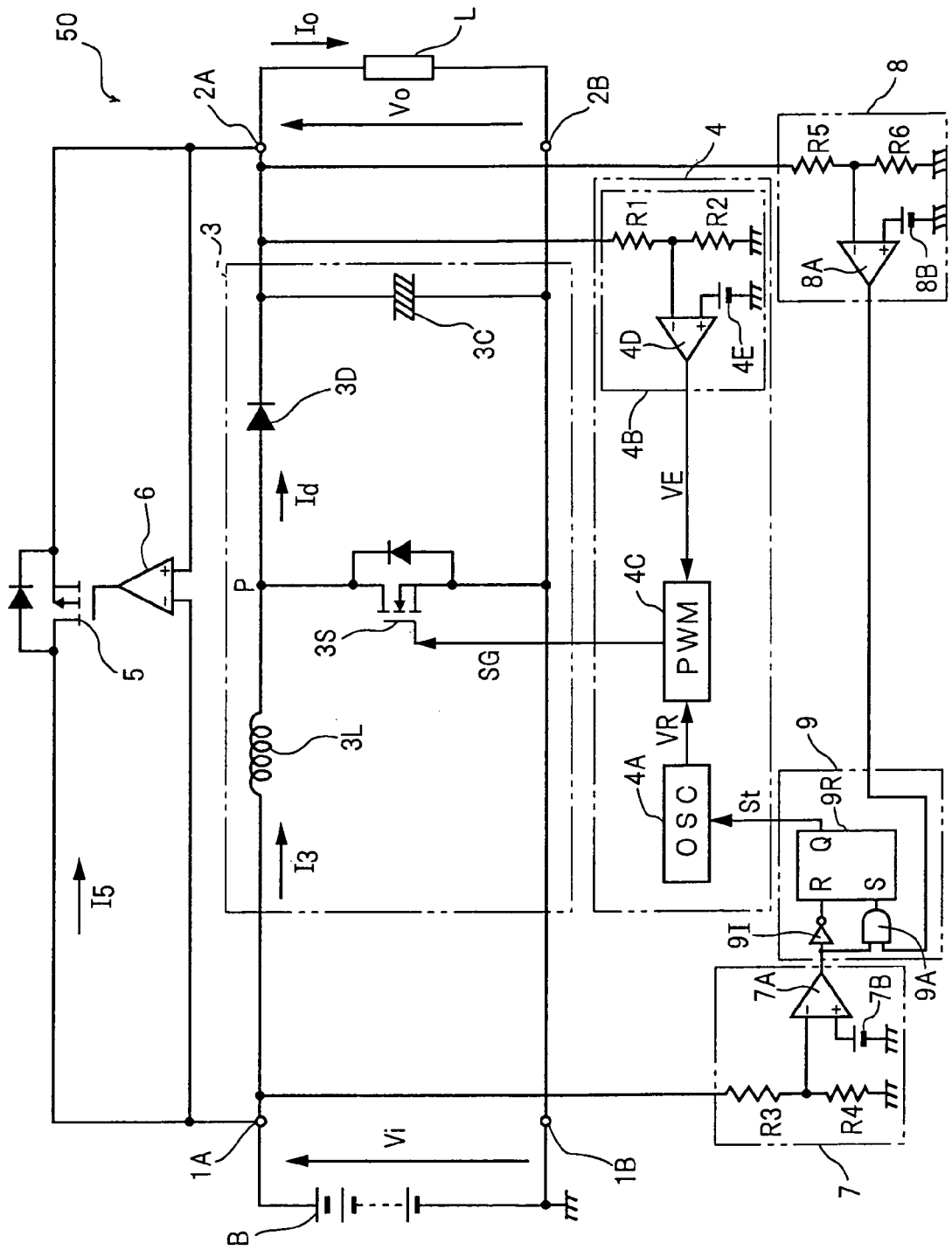
FIG. 8 is a circuit diagram of a direct-current power supply 50 according to Embodiment 5 of the present invention.

FIG. 8 is the circuit diagram of the direct-current power supply 50 according to Embodiment 5 of the present invention. The direct-current power supply 50 according to Embodiment 5 has circuitry similar to that of the direct-current power supply 40 according to Embodiment 4. Accordingly, in FIG. 8, those similar components are marked with the same reference symbols as the reference symbols shown in FIG. 6. Furthermore, for the details of those similar components, the description about Embodiment 4 is cited.

The direct-current power supply 50 according to Embodiment 5 of the present invention additionally comprises an AND circuit 9A inside the starting control section 9, in contrast to the direct-current power supply 40 according to Embodiment 4. The AND circuit 9A sends to the latch circuit 9R the AND of the outputs between the input voltage detecting section 7 and the output voltage detecting section 8. The latch circuit 9R receives the outputs of the inverter 9I and the AND circuit 9A from the reset R and the set S, respectively. The output of the input voltage detecting section 7 is maintained at the H level during the period when the battery voltage Vi is lower than the stop input voltage Es. Accordingly, the output of the AND circuit 9A, that is, the logical level of the set S of the latch circuit 9R is equal to the logical level of the output of the output voltage detecting section 8 in the period. Therefore, during the period when the battery voltage Vi is lower than the stop input voltage Es, the starting control section 9 operates in a manner similar to that of Embodiment 4.

During the period when the battery voltage Vi is higher than the stop input voltage Es, the inverter 9I maintains the reset R of the latch circuit 9R at the H level since the output of the input voltage detecting section 7 is maintained at the L level. Under the conditions, the output voltage detecting section 8 changes its output into the H level, and then, the AND circuit 9A maintains the set S of the latch circuit 9R at the L level. Thereby, the latch circuit 9R maintains its output Q at the L level with stability. Thus, the starting control section 9 sends the stop signal Su with stability to the converter control section 4 even when the battery voltage Vi is higher than the stop input voltage Es and the output voltage Vo falls below the start output voltage Eu.

Figure 9:
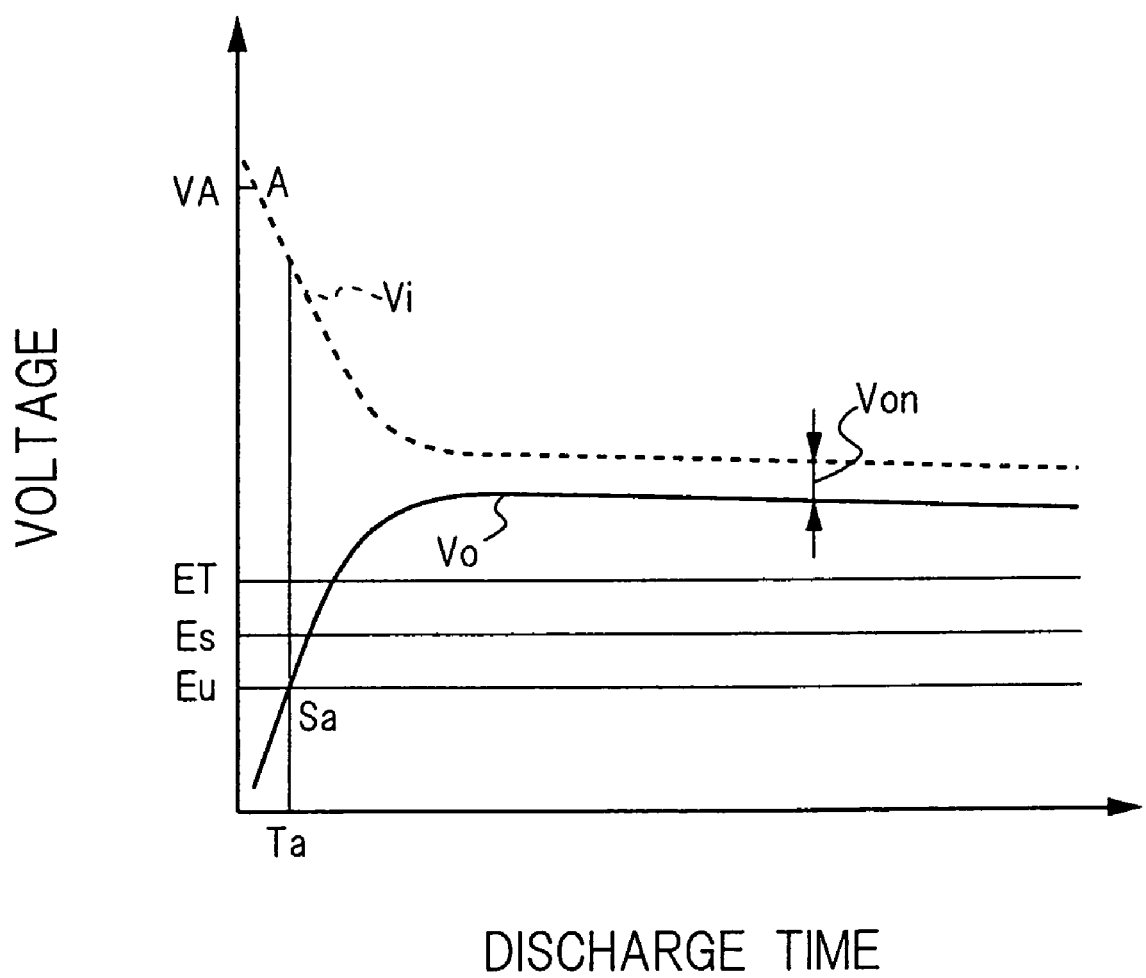
FIG. 9 is a graph showing temporal variations in the battery voltage Vi and the output voltage Vo immediately after the connection between a battery B in a fully charged condition and the direct-current power supply 50 according to Embodiment 5 of the present invention.

Immediately after the fully charged battery B is connected to the direct-current power supply 50, the battery voltage Vi and the output voltage Vo of the direct-current power supply 50 exhibit temporal variations shown in FIG. 9. Here, broken and solid lines show the temporal variations of the battery voltage Vi and the output voltage Vo, respectively. FIG. 9 is equivalent to the enlarged view of the vicinity of the point A shown in FIG. 3A.

The battery voltage Vi is substantially equal to the initial voltage VA, and in particular, higher than the stop input voltage Es. On the other hand, the output voltage Vo is in general equal to zero, and in particular, lower than the start output voltage Eu. At that time, the battery voltage Vi is higher than the output voltage Vo, and accordingly, the bypass control section 6 turns the bypass switch 5 on. On the other hand, the output of the input voltage detecting section 7 is at the L level and the output of the output voltage detecting section 8 is at the H level. Accordingly, the inverter 9I maintains its output at the H level, and the AND circuit 9A maintains its output at the L level. Therefore, the latch circuit 9R maintains its output Q at the L level. Thus, the converter control section 4 maintains the non-operating state, and then, the step-up chopper 3 maintains the non-operating state.

The output voltage Vo promptly raises upon the start of the discharge of the battery B (cf. the solid line shown in FIG. 9), and exceeds the start output voltage Eu at the time Ta (cf. the point Sa shown in FIG. 9.). At that time, the output voltage detecting section 8 changes its output into the L level. However, the latch circuit 9R maintains its output Q at the L level with stability since neither the inverter 9I nor the AND circuit 9A changes its output. The output voltage Vo (solid line) continues the rising after the time Ta, and is maintained with stability at the level lower than the battery voltage Vi (broken line) by the non-operating voltage drop Von. Thus, the starting control section 9 sends the stop signal Su with stability immediately after the connection of the direct-current power supply 50 and the battery B. Thereby, the misoperation of the step-up chopper 3 immediately after the start of the discharge of the battery B is securely prevented.

During the discharge period of the battery B after the period shown in FIG. 9, in particular, in the middle through last stages of the discharge and the following charge period, the direct-current power supply 50 according to Embodiment 5 exhibits the temporal variations of the battery voltage Vi and the output voltage Vo in common with the direct-current power supply 40 according to Embodiment 4. For the common temporal variations, FIG. 7 and the description about Embodiment 4 are cited.

Embodiment 6

Figure 10:
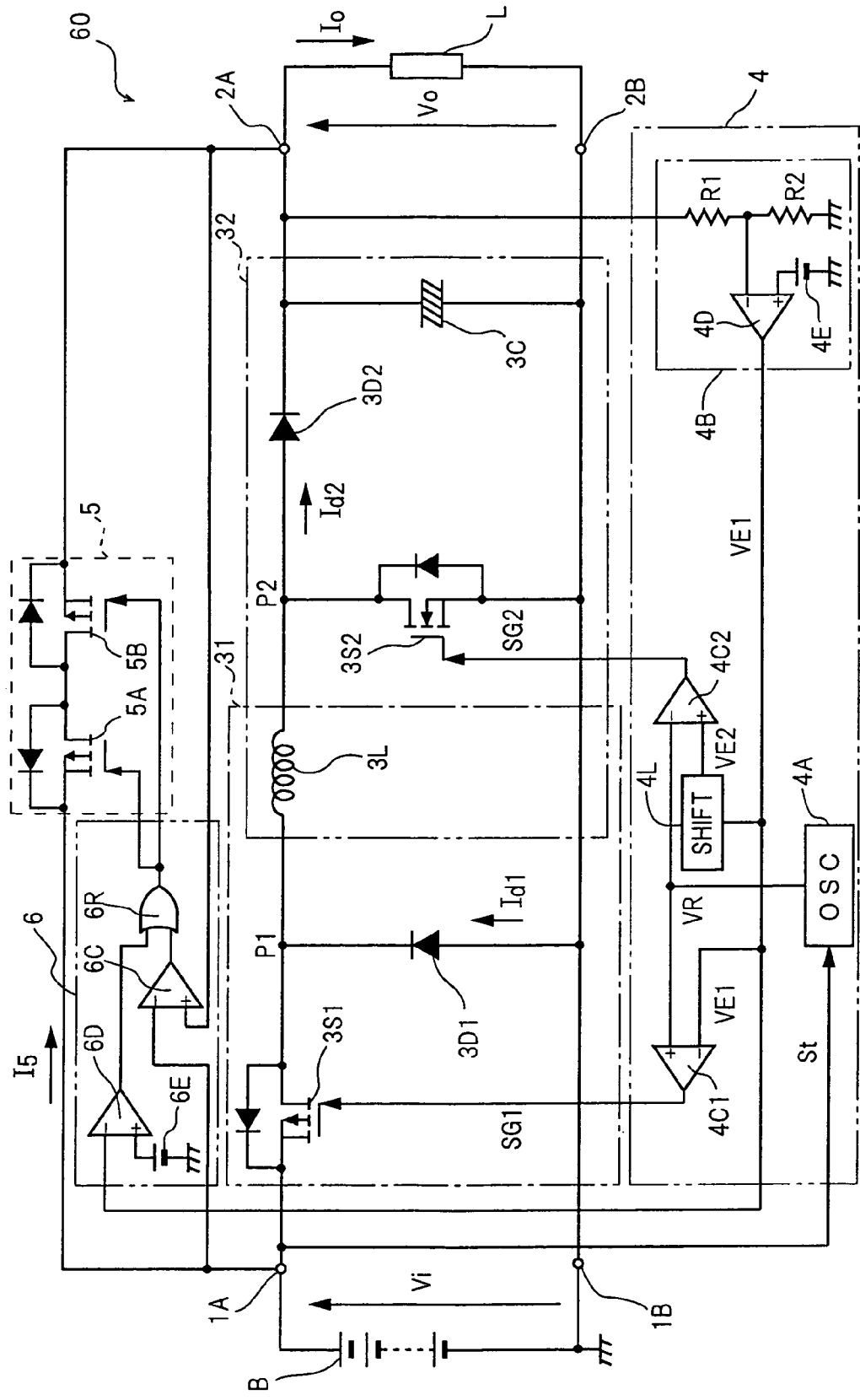
FIG. 10 is a circuit diagram of a direct-current power supply 60 according to Embodiment 6 of the present invention.

FIG. 10 is the circuit diagram of the direct-current power supply 60 according to Embodiment 6 of the present invention. The direct-current power supply 60 according to Embodiment 6 has circuitry similar to that of the direct-current power supply 10 according to Embodiment 1. Accordingly, in FIG. 10, those similar components are marked with the same reference symbols as the reference symbols shown in FIG. 1. Furthermore, for the details of those similar components, the description about Embodiment 1 is cited.

The direct-current power supply 60 converts the battery voltage Vi into the output voltage Vo applied to the external load L, and maintains the output voltage Vo substantially equal to the desired voltage ET throughout the discharge period of the battery B. At the early stages of the discharge of the battery B, the battery voltage Vi is higher than the desired voltage ET. The direct-current power supply 60 performs a buck operation as described later, and thereby, changes the output voltage Vo lower than the battery voltage Vi. The battery voltage Vi drops in the last stages of the discharge of the battery B. At that time, the direct-current power supply 60 performs the boost operation as described later, and thereby, changes the output voltage Vo higher than the battery voltage Vi.

The direct-current power supply 60 comprises a DC-DC converter, a converter control section 4, a bypass switch 5, and a bypass control section 6. The DC-DC converter is a buck/boost converter including a step-down chopper 31-and a step-up chopper 32. The step-down chopper 31 includes a step-down chopper switch 3S1, a first diode 3D1, and an inductor 3L. The step-up chopper 32 includes an inductor 3L, a second diode 3D, an output smoothing capacitor 3C, and a step-up chopper switch 3S2. Here, the inductor 3L is shared between the step-down chopper 31 and the step-up chopper 32.

The step-down chopper switch 3S1 is preferably a P-channel MOSFET, whose source is connected to the high side input terminal 1A, whose drain is connected to one end of the inductor 3L, and whose gate is connected to a first PWM circuit 4C1 inside the converter control section 4. The other end of the inductor 3L is connected to the anode of the second diode 3D2. The cathode of the second diode 3D is connected to the high side output terminal 2A. The cathode of the first diode 3D1 is connected to a node P1 between the step-down chopper switch 3S1 and the inductor 3L. The anode of the first diode 3D1 is connected to both of the low side input terminal 1B and the low side output terminal 2B.

The step-up chopper switch 3S2 is preferably an N-channel MOSFET, whose drain is connected to a node P2 between the inductor 3L and the second diode 3D2, whose source is connected to both of the low side input terminal 1B and the low side output terminal 2B, and whose gate is connected to a second PWM circuit 4C2 inside the converter control section 4. The output smoothing capacitor 3C is connected between the high side output terminal 2A and the low side output terminal 2B.

The step-down chopper switch 3S1 is in the OFF and ON states when the logical level of its gate is at the H and L levels, respectively. The step-up chopper switch 3S2 is in the ON and OFF states when the logical level of its gate is at the H and L levels, respectively. The converter control section 4 maintains the step-up chopper switch 3S2 in the OFF state when performing an on-off control over the step-down chopper switch 3S1, as described later. Conversely, the converter control section 4 maintains the step-down chopper switch 3S1 in the ON state when performing an ON/OFF control over the step-up chopper switch 3S2.

The step-down chopper 31 performs the following buck operation by the switching of the step-down chopper switch 3S1. Here, the following is based on the premise that: the output voltage Vo applied to the external load L is high enough since an abundance of electric charge has already been stored in the output smoothing capacitor 3C. However, the output voltage Vo is lower than the battery voltage Vi. Furthermore, the bypass switch 5 and the step-up chopper switch 3S2 are both maintained in the OFF state.

When the step-down chopper switch 3S1 is in the ON state, a reverse-biased voltage ($\approx$−Vi) is applied across the first diode 3D1, and then, a forward current Id1 in the first diode 3D1 falls to zero. On the other hand, a forward-biased voltage ($\approx$Vi−Vo) is applied across the second diode 3D2, and then, a forward current Id2 flows in the second diode 3D2. The inductors 3L is excited by the difference Vi−Vo between the battery voltage Vi and the output voltage Vo, and then, the magnetic energy stored in the inductor 3L is increased.

When the step-down chopper switch 3S is turned off, the potential of the node P1 between the inductor 3L and the first diode 3D1 sharply drops due to the effect of the inductor 3L, and a forward-biased voltage is applied across the first diode 3D1. Thereby, the first diode 3D1 conducts and then, its forward current Id1 is increased. As a result, the magnetic energy stored in the inductor 3L during the ON time of the step-down chopper switch 3S1 is supplied to the output smoothing capacitor 3C and the external load L during the OFF time of the step-down chopper switch 3S1.

Based on the reset condition for the inductor 3L, or the condition for the balance between the magnetic energy stored in the inductor 3L during the ON time of the step-down chopper switch 3S1 and the magnetic energy radiated from the inductor 3L during the OFF time of the step-down chopper switch 3S1, the battery voltage Vi and the output voltage Vo satisfy the following equation: (Vi−Vo)×Ton=Vo×(T−Ton), where the fluctuations in the battery voltage Vi and the output voltage Vo within the switching period of the step-down chopper switch 3S1 are ignored. Here, let T be the switching period, and let Ton be the ON time per period. Accordingly, the voltage conversion ratio Vo/Vi of the step-down chopper 31 is equal to the duty ratio r=Ton/T of the step-down chopper switch 3S1: Vo/Vi=r. The voltage conversion ratio Vo/Vi is lower than 1 since the duty ratio r is lower than 1: Vo/Vi<1. Thus, the step-down chopper 31 maintains its voltage conversion ratio lower than 1 by the switching of the step-down chopper switch 3S1.

The step-up chopper 32 maintains its voltage conversion ratio higher than 1 by the switching of the step-up chopper switch 3S2, in a manner similar to that of the step-up chopper 3 according to Embodiment 1. The description of the details cites the description about Embodiment 1.

The converter control section 4 include the OSC 4A, the feedback circuit 4B, the first PWM circuit 4C1, a level shift section 4L, and the second PWM circuit 4C2. Here, the OSC 4A and the feedback circuit 4B are similar to those according to Embodiment 1, and accordingly, the description of the details cites the description about Embodiment 1.

The feedback circuit 4B sets the desired voltage ET to be at the lowest equal to either an operating output lower limit Eo1 for the step-down chopper 31 (an allowable lower limit of the output voltage Vo during the operating period of the step-down chopper 31), or an operating output lower limit Eo2 for the step-up chopper 32 (an allowable lower limit of the output voltage Vo during the operating period of the step-up chopper 32), whichever is higher: ET$\geq$max(Eo1, Eo2). The operating output lower limits Eo1 and Eo2 for the respective choppers are set, for example, higher than the allowable lower limit El of the operating voltage of the external load L by the operating output margins $\beta$i and $\beta$2 for the respective choppers: Eo1=El+$\beta$1 and Eo2=El+$\beta$2. The operating output margin $\beta$1 or $\beta$2 depends on the sum of the ripple voltage $\rho$1 or $\rho$2 included in the output voltage Vo during the operating period of each chopper, and the margin $\delta$ against the drops of the output voltage Vo caused by predictable rapid increases in current in the external load L: $\beta$1=$\rho$1+$\delta$ and $\beta$2=$\rho$2+$\delta$.

A step-down error signal VE1 refers to the error signal sent by the error amplifier 4D included in the feedback circuit 4B. The lower the output voltage Vo relative to the desired voltage ET, the higher the level of the step-down error signal VE1.

The first PWM circuit 4C1 sends a first switching signal SG1 to the gate of the step-down chopper switch 3S1. The first switching signal SG1 is a rectangle voltage pulse with a fixed amplitude. The step-down chopper switch 3S1 is turned off and on at the rising and falling edges of the first switching signal SG1, respectively. In particular, the pulse width of the first switching signal SG1 determines the OFF time of the step-down chopper switch 3S1.

The first PWM circuit 4C1 compares the levels between the reference signal VR and the step-down error signal VE1, and at every meeting of the levels, changes the level of the first switching signal SG1. Thereby, the first switching signal SG1 is maintained, for example, at the H level and the step-down chopper switch 3S1 is maintained in the OFF state during the period when the level of the reference signal VR exceeds the level of the step-down error signal VE1. Conversely, the first switching signal SG1 is maintained at the L level and the step-down chopper switch 3S1 is maintained in the ON state during the period when the level of the reference signal VR falls below the level of the step-down error signal VE1.

The level shift section 4L lowers the level of the step-down error signal VE1 by a fixed shift LS (hereafter, a level shift): VE2=VE1−LS, and sends it as a step-up error signal VE2 to the second PWM circuit 4C2. The level shift LS is, at least, substantially equal to the amplitude of the reference signal VR, that is, the difference LT−LB between the top level LT and the bottom level LB of the reference signal VR: LS≧LT−LB.

The second PWM circuit 4C2 sends a second switching signal SG2 to the gate of the step-up chopper switch 3S2. The second switching signal SG2 is a rectangle voltage pulse with a fixed amplitude. The step-up chopper switch 3S2 is turned on and off at the rising and falling edges of the second switching signal SG2, respectively. In particular, the pulse width of the second switching signal SG2 determines the ON time of the step-up chopper switch 3S2.

The second PWM circuit 4C2 compares the levels between the reference signal VR and the step-up error signal VE2, and at every meeting of the levels, changes the level of the second switching signal SG2. Thereby, the second switching signal SG2 is maintained, for example, at the H level and the step-up chopper switch 3S2 is maintained in the ON state during the period when the level of the reference signal VR exceeds the level of the step-up error signal VE2. Conversely, the second switching signal SG2 is maintained at the L level and the step-up chopper switch 3S2 is maintained in the OFF state during the period when the level of the reference signal VR falls below the level of the step-up error signal VE2.

Figure 11:
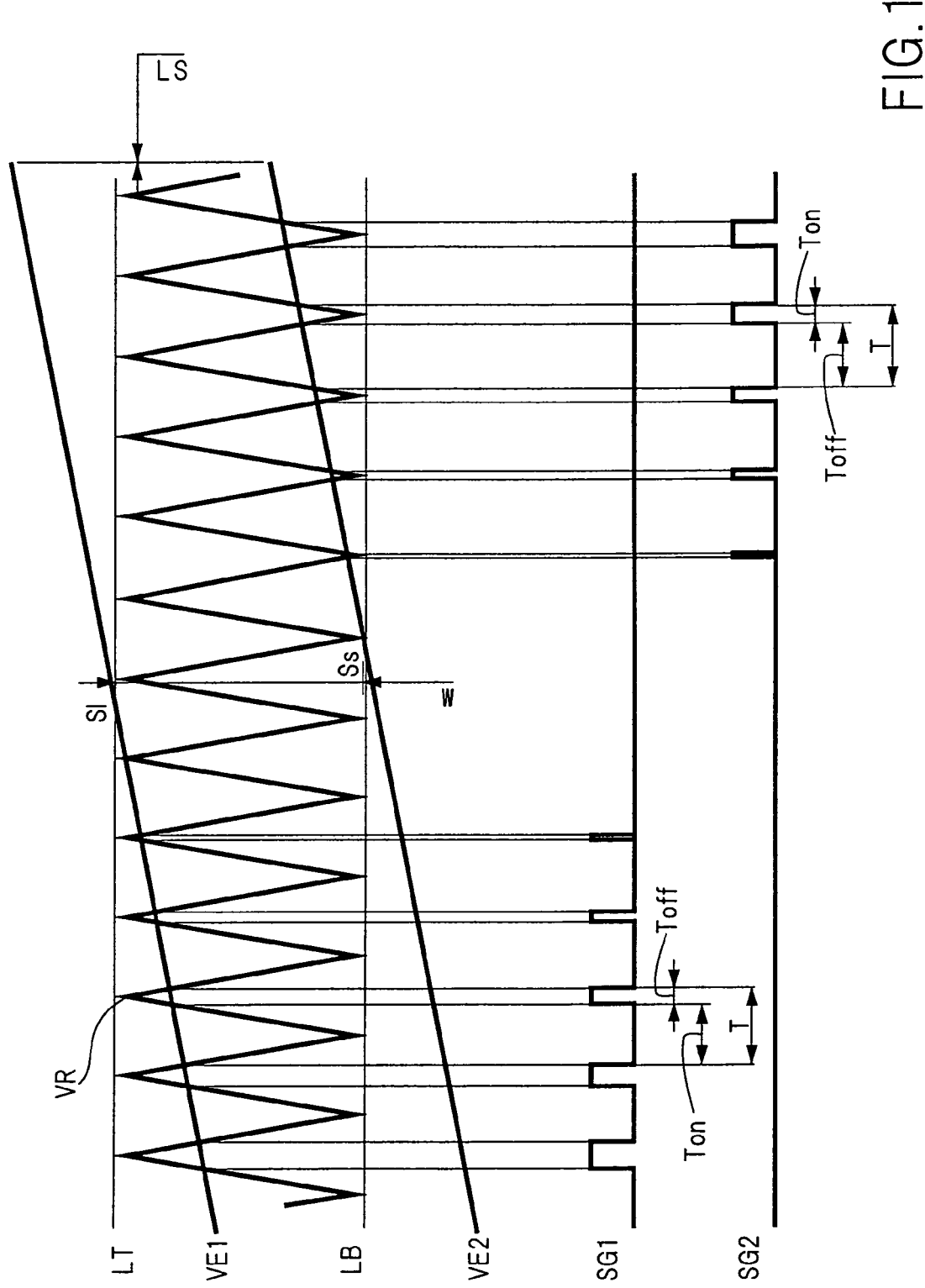
FIG. 11 is a waveform chart of a reference signal VR, a step-down error signal VE1, a step-up error signal VE2, a first switching signal SG1, and a second switching signal SG2 in the direct-current power supply 60 according to Embodiment 6 of the present invention.

As shown in FIG. 11, the shorter the period when the level of the step-down error signal VE1 falls below the level of the reference signal VR, the narrower the pulse width of the first switching signal SG1, and accordingly, the shorter the OFF time Toff of the step-down chopper switch 3S1. Since the period of the reference signal VR is constant, the switching period T (T=Ton+Toff) of the step-down chopper switch 3S1 is constant. Therefore, the shorter the period when the level of the step-down error signal VE1 falls below the level of the reference signal VR, the closer to 1 the duty ratio r=1−Toff/T of the step-down chopper switch 3S1, that is, the voltage conversion ratio Vo/Vi=r of the step-down chopper 31.

The level of the step-down error signal VE1 falls within the range in variation of the reference signal VR: LB≦VE1≦LT, during the operating period of the step-down chopper 31. When the output voltage Vo slightly falls from the desired voltage ET (Vo<ET), the level of the step-down error signal VE1 rises. At that time, the first PWM circuit 4C1 reduces the pulse width of the first switching signal SG1. Thereby, the voltage conversion ratio of the step-down chopper 31 approaches 1, and then, the output voltage Vo rises and returns to the desired voltage ET. Conversely, when the output voltage Vo slightly rises from the desired voltage ET (Vo>ET), the level of the step-down error signal VE1 falls. At that time, the first PWM circuit 4C1 increases the pulse width of the first switching signal SG1. Thereby, the voltage conversion ratio of the step-down chopper 31 decreases, and then, the output voltage Vo falls and returns to the desired voltage ET. Thus, the first PWM circuit 4C1 suppresses the fluctuations in the output voltage Vo of the step-down chopper 31 and accordingly, maintains the output voltage Vo substantially equal to the desired voltage ET, by controlling the pulse width of the first switching signal SG1 based on the reference signal VR and the step-down error signal VE1.

As shown in FIG. 11, the longer the period when the level of the step-up error signal VE2 exceeds the level of the reference signal VR, the wider the pulse width of the second switching signal SG2, and accordingly, the longer the ON time Ton of the step-up chopper switch 3S2. Since the period of the reference signal VR is constant, the switching period T (T=Ton+Toff) of the step-up chopper switch 3S2 is constant. Therefore, the longer the period when the level of the step-up error signal VE2 exceeds the level of the reference signal VR, the higher the duty ratio r=Ton/T of the step-up chopper switch 3S2, and in other words, the higher the step-up ratio Vo/Vi=1/(1−r) of the step-up chopper 32.

The second PWM circuit 4C2 suppresses the fluctuations in the output voltage Vo of the step-up chopper 32 and maintains the output voltage Vo substantially equal to the desired voltage ET, by controlling the pulse width of the second switching signal SG2 based on the reference signal VR and the step-up error signal VE2. The control is similar to that of the PWM circuit 4C according to Embodiment 1, and therefore, for the details, the description about Embodiment 1 is cited.

When the difference in level between the step-down error signal VE1 and the step-up error signal VE2, that is, the level shift LS is larger than the amplitude LT−LB of the reference signal VR, LS>LT−LB, the level of the step-down error signal VE1 may be higher than the top level LT of the reference signal VR and the level of the step-up error signal VE2 may be lower than the bottom level LB of the reference signal VR. See the region W shown in FIG. 11. In the region W, both the levels of the step-down error signal VE1 and the step-up error signal VE2 fall outside the range in variation of the reference signal VR. In that case, the first PWM circuit 4C1 maintains the step-down chopper switch 3S1 in the ON state, and the second PWM circuit 4C2 maintains the step-up chopper switch 3S2 in the OFF state. Thereby, in the DC-DC converter, the series connection of the step-down chopper switch 3S1, the inductor 3L, and the second diode 3D2 maintain the conduction states.

The bypass switch 5 is connected in parallel with the DC-DC converter, between the high side input terminal 1A and the high side output terminal 2A. The bypass switch 5 is preferably a series connection of a first P-channel MOSFET (hereafter, PMOS) 5A and a second PMOS 5B. The source of the first PMOS 5A is connected to the high side input terminal 1A. The drain of the first PMOS 5A is connected to the drain of the second PMOS 5B. The source of the second PMOS 5B is connected to the high side output terminal 2A. The gates of the first PMOS 5A and the second PMOS 5B are both connected to the output terminal of an OR circuit 6R inside the bypass control section 6. Each of the first PMOS 5A and the second PMOS 5B is turned off and on when the logical level of its gate is at the H and L levels, respectively. The path from the high side input terminal 1A through the bypass switch 5 to the high side output terminal 2A acts as the bypass of the path inside the DC-DC converter which includes the series connection of the step-down chopper switch 3S1, the inductor 3L, and the second diode 3D2. The ON resistance of the bypass switch 5 is preferably smaller than the resistance of the series connection.

The bypass control section 6 includes a first comparator 6C, a second comparator 6D, a second reference voltage source 6E, and an OR circuit 6R. The inverting and non-inverting input terminals of the first comparator 6C are connected to the high side input terminal 1A and the high side output terminal 2A, respectively. The output terminal of the first comparator 6C is connected to the OR circuit 6R. Thereby, the potentials of the inverting and non-inverting input terminals are equal to the battery voltage Vi and the output voltage Vo, respectively. Accordingly, the first comparator 6C maintains its output at the L and H levels when the battery voltage Vi is higher and lower than the output voltage Vo, Vi>Vo and Vi<Vo, respectively.

The inverting input terminal of the second comparator 6D is connected to the output terminal of the feedback circuit 4B inside the converter control section 4. The non-inverting input terminal of the second comparator 6D is connected to the second reference voltage source 6E. The output terminal of the second comparator 6D is connected to the OR circuit 6R. Thereby, the potentials of the inverting and non-inverting input terminals are equal to the levels of the step-down error signal VE1 and the voltage of the second reference voltage source 6E, respectively. Here, the voltage of the second reference voltage source 6E is set substantially equal to the top level LT of the reference signal VR. Accordingly, the second comparator 6D maintains its output at the H and L levels when the level of the step-down error signal VE1 is lower and higher than the top level LT of the reference signal VR, VE1<LT and VE1>LT, respectively.

The OR circuit 6R calculates the OR between the outputs of the first comparator 6C and the second comparator 6D. The OR circuit 6R sets the result of the calculation as a logical level of the gates of the first PMOS 5A and the second PMOS 5B. Accordingly, the first PMOS 5A and the second PMOS 5B have the ON/OFF states in common. In other words, the second PMOS 5B is in the ON and OFF states when the first PMOS 5A is in the ON and OFF states, respectively.

The bypass control section 6 controls the turning on and off of the bypass switch 5, based on the difference between the battery voltage Vi and the output voltage Vo and the difference between the level of the step-down error signal VE1 and the top level LT of the reference signal VR, as follows. The output of the OR circuit 6R is maintained at the L level when the battery voltage Vi is higher than the output voltage Vo, Vi>Vo, and the level of the step-down error signal VE1 is higher than the top level LT of the reference signal VR, VE1>LT. Accordingly, in the bypass switch 5, the first PMOS 5A and the second PMOS 5B are both maintained in the ON state. The output of the OR circuit 6R is maintained at the H level when the battery voltage Vi is lower than the output voltage Vo, Vi<Vo, or the level of the step-down error signal VE1 is lower than the top level LT of the reference signal VR, VE1<LT. Accordingly, in the bypass switch 5, the first PMOS 5A and the second PMOS 5B are both maintained in the OFF state.

During the period when the level of the step-down error signal VE1 is higher than the top level LT of the reference signal VR, the first PWM circuit 4C1 maintains the step-down chopper switch 3S1 in the ON state and the step-down chopper 31 stops. On the other hand, during the period when the level of the step-up error signal VE2 is lower than the bottom level LB of the reference signal VR, the second PWM circuit 4C2 maintains the step-up chopper switch 3S2 in the OFF state and the step-up chopper 32 stops. When the bypass switch 5 is maintained in the ON state in the period when both the step-down chopper 31 and the step-up chopper 32 stop, the load current Io is split into two branches between the high side input terminal 1A and the high side output terminal 2A. The one branch Id2 flows through the series connection of the step-down chopper switch 3S1, the inductor 3L, and the second diode 3D2. The other branch (the bypass current) I5 flows through the bypass switch 5. Let R be the resistance between the high side input terminal 1A and the high side output terminal 2A during the ON period of the bypass switch 5, the non-operating voltage drop Von is equal to the product of the resistance R and the load current Io: Von=R×Io. Thus, when the bypass switch 5 is maintained in the ON state in the non-operating period of the step-down chopper 31 and the step-up chopper 32, the output voltage Vo is maintained at the level lower than the battery voltage Vi by the non-operating voltage drop Von.

At power-on, for example, due to the connection to the battery B in the fully charged condition, the direct-current power supply 60 transmits power from the battery B to the external load L using the above-described configuration, as follows. Immediately after the connection of the fully charged battery B to the direct-current power supply 60, the battery voltage Vi is higher than the output voltage Vo and the level of the step-down error signal VE1 is higher than the top level LT of the reference signal VR, and accordingly, the bypass control section 6 turns the bypass switch 5 on. The bypass current I5 flows due to the turning on of the bypass switch 5. At that time, the output voltage Vo promptly rises and exceeds the desired voltage ET.

Immediately after the connection between the direct-current power supply 60 and the fully charged battery B, the battery voltage Vi is equal to the initial voltage. See the point A shown in FIG. 3A. Accordingly, the converter control section 4 starts and the OSC 4A begins to send the reference signal VR. When the output voltage Vo exceeds the desired voltage ET, the level of the step-down error signal VE1 falls below the top level LT of the reference signal VR. Thereby, the bypass control section 6 turns the bypass switch 5 off. On the other hand, the first PWM circuit 4C1 starts the switching control over the step-down chopper switch 3S1, and the step-down chopper 31 starts. Furthermore, the second PWM circuit 4C2 maintains the step-up chopper switch 3S2 in the OFF state since the level of the step-up error signal VE2 is lower than the bottom level LB of the reference signal VR. The rise in the output voltage Vo is promptly suppressed due to the buck operation of the step-down chopper 31, and the output voltage Vo is maintained substantially equal to the step-down desired voltage ET1.

During the operating period of the step-down chopper 31, the ratios ET/Vi of the desired voltage ET to the battery voltage Vi is reduced with the fall of the battery voltage Vi due to the passage of the discharge time. Then, the level of the step-down error signal VE1 rises since the voltage conversion ratio Vo/Vi to be attained by the step-down chopper 31 approaches 1. In other words, the duration of time that the step-down error signal VE1 falls below the reference signal VR is shortened.

In the last stages of the discharge of the battery B, the battery voltage Vi sharply drops and falls to the desired voltage ET. Especially when the battery B is the high energy density lithium ion rechargeable battery, the output voltage Vo falls to the desired voltage ET due to the fall of the battery voltage Vi in the middle stages of the discharge. At that time, the level of the step-down error signal VE1 reaches the level substantially equal to the top level LT of the reference signal VR. See the point S1 shown in FIG. 11. Thereby, the step-down chopper switch 3S1 is maintained in the ON state, and the step-down chopper 31 stops. On the other hand, the bypass control section 6 turns the bypass switch 5 on. At that time, the load current Io is split into the two branches between the high side input terminal 1A and the high side output terminal 2A, and flows through the series connection of the step-down chopper switch 3S1, the inductor 3L, and the second diode 3D2, and the bypass switch 5 in parallel. Accordingly, the output voltage Vo is maintained at the level lower than the battery voltage Vi by the non-operating voltage drop Von, and falls with the fall of the battery voltage Vi.

Both the step-down chopper 31 and the step-up chopper 32 maintain the non-operating state during the period (the region W shown in FIG. 11) from the instant when the level of the step-down error signal VE1 exceeds the top level LT of the reference signal VR (the point S1 shown in FIG. 11) until the instant when the level of the step-up error signal VE2 reaches the bottom level LB of the reference signal VR (the point Ss shown in FIG. 11). Furthermore, the series connection of the step-down chopper switch 3S1, the inductor 3L, and the second diode 3D2 maintain the conduction states. In addition, the bypass switch 5 maintains the ON state. Here, the non-operating voltage drop Von is small since the resistance between the high side input terminal 1A and the high side output terminal 2A is reduced due to the turning on of the bypass switch 5. Accordingly, the conduction loss of the direct-current power supply 60 is-low in the non-operating period of the step-down chopper 31 and the step-up chopper 32. Thereby, the use efficiency of the battery capacity is maintained high.

When the battery voltage Vi further falls, the level of the step-up error signal VE2 reaches the bottom level LB of the reference signal VR. See the point Ss shown in FIG. 11. Accordingly, the second PWM circuit 4C2 starts at once the switching in level of the second switching signal SG2. Thereby, the step-up chopper switch 3S2 starts the switching operation inside the step-up chopper 32. Thus, the step-up chopper 32 promptly starts the boost operation.

At the start of the boost operation by the step-up chopper 32, the output voltage Vo is lower than the battery voltage Vi by the non-operating voltage drop Von, and the level of the step-down error signal VE1 is higher than the top level LT of the reference signal VR. Accordingly, the bypass control section 6 maintains the bypass switch 5 in the ON state after the start of the boost operation by the step-up chopper 32 until the output voltage Vo meets the battery voltage Vi. Thereby, the output voltage Vo is maintained equal to or beyond the level lower than the battery voltage Vi by the non-operating voltage drop Von. In particular, no excessive undershoots occur on the output voltage Vo. Furthermore, no switching losses arise since the bypass switch 5 is turned off under the condition where the bypass current I5 is substantially equal to zero.

Furthermore, the direct-current power supply 60 can maintain the output voltage Vo substantially equal to the desired voltage ET until the instant when the battery B nearly reaches the complete discharge state. As a result, almost all the capacity of the battery B can be provided for the external load L as its power. Especially when the battery-powered electronic appliance with wireless communications capabilities adopts the high energy density lithium ion rechargeable batteries, the output voltage Vo falls below the desired voltage ET in the middle stages of the discharge due to the fall of the battery voltage Vi. In such a case, in particular, the direct-current power supply 60 has advantages in the improvement in use efficiency of battery capacity.

The direct-current power supply 60 according to Embodiment 6 of the present invention maintains the output voltage Vo substantially equal to the desired voltage ET throughout the discharge period of the battery B, as described above. As a result, the use efficiency of the battery capacity is high. At the start of the boost operation by the step-up chopper 32, in particular, no excessive undershoots occur on the output voltage Vo. Thus, the stability of the output voltage Vo has high reliability.

Embodiment 7

Figure 12:
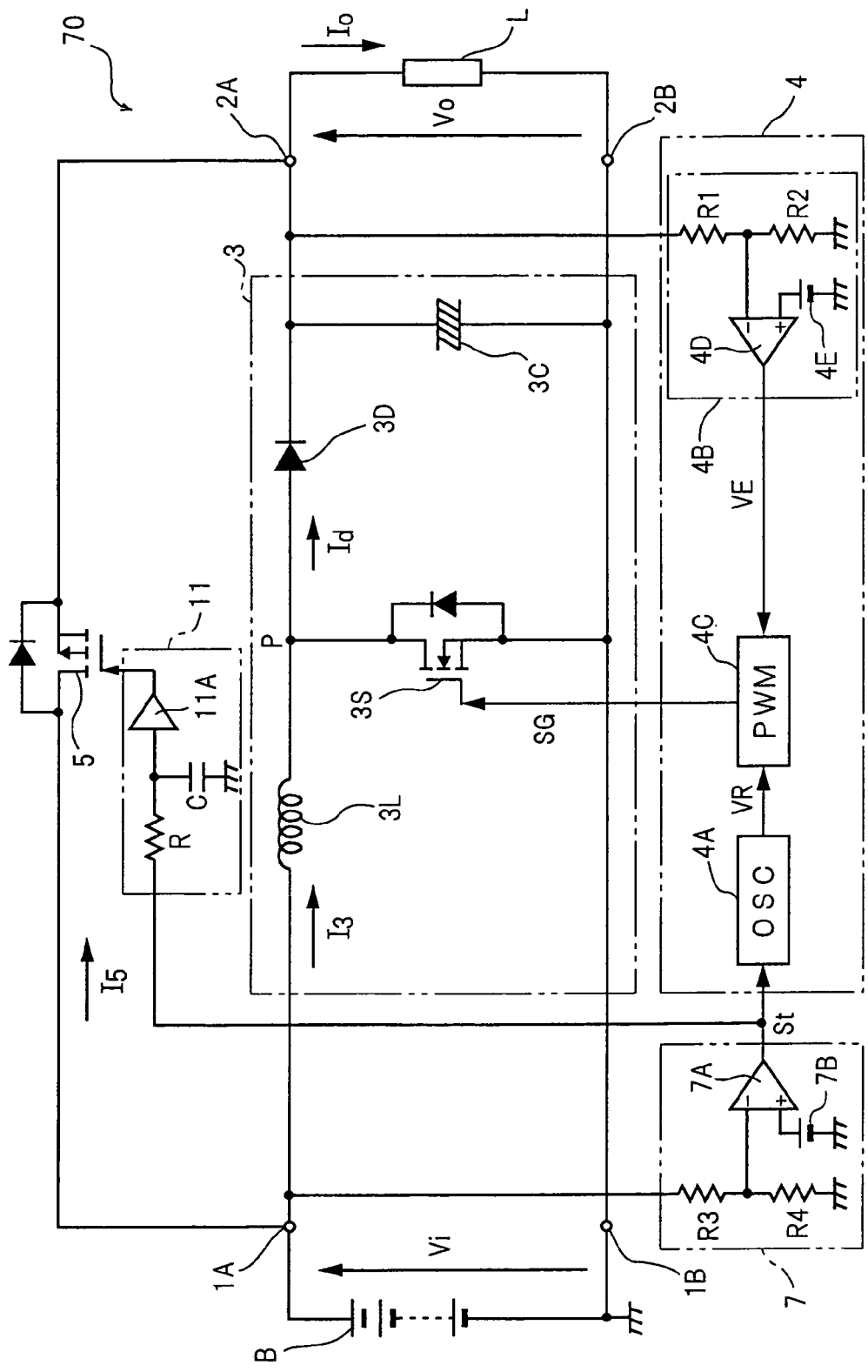
FIG. 12 is a circuit diagram of a direct-current power supply 70 according to Embodiment 7 of the present invention.

FIG. 12 is the circuit diagram of the direct-current power supply 70 according to Embodiment 7 of the present invention. The direct-current power supply 70 according to Embodiment 7 has circuitry similar to that of the direct-current power supply 20 according to Embodiment 2. Accordingly, in FIG. 12, those similar components are marked with the same reference symbols as the reference symbols shown in FIG. 4. Furthermore, for the details of those similar components, the description about Embodiment 2 is cited.

The direct-current power supply 70 according to Embodiment 7 of the present invention comprises a bypass control section 11 instead of the bypass control section 6 according to Embodiment 2. The bypass control section 11 includes a delay circuit and a switch driving section 11A. The delay circuit is a low pass filter composed of a resistor (of the resistance value R) and a capacitor (of the capacitance C), delaying the start signal St by a fixed delay time $\Delta TD$ on the order of the damping time constant R×C, and transmitting the signal to a switch driving section 11A. Here, the delay time $\Delta TD$ is set, at the shortest, substantially equal to the starting-time of the converter control section 4. The delay time $\Delta TD$ is preferably set substantially equal to a fixed length estimated as a time from the start of the converter control section 4 until the meeting of the battery voltage Vi and the output voltage Vo. The switch driving section 11A amplifies the start signal St and sends it to the gate of the bypass switch 5. Thereby, the bypass switch 5 is turned off when the start signal St is at the H level. Conversely, the bypass switch 5 is turned on when the start signal St is at the L level.

Figure 13:
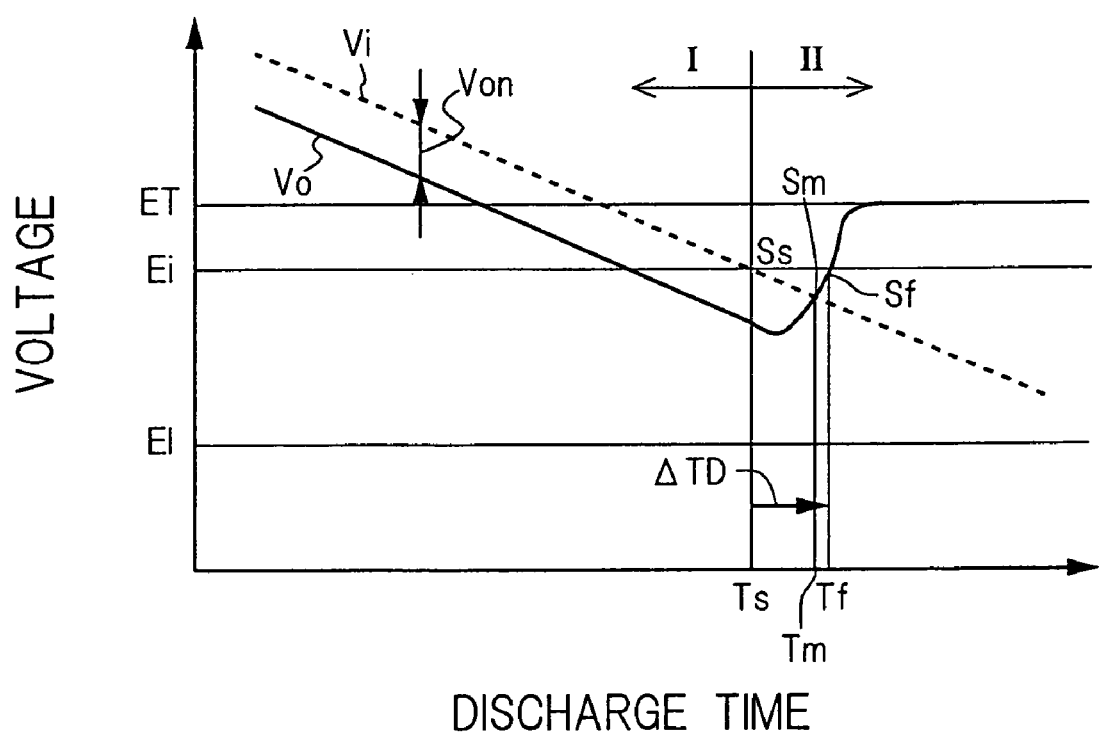
FIG. 13 is a graph showing temporal variations in the battery voltage Vi and the output voltage Vo in the discharge period of a battery B in the direct-current power supply 70 according to Embodiment 7 of the present invention, and in particular, an enlarged view of the vicinity of a meeting point Ss of a battery voltage Vi and a start input voltage Ei.

During the discharge period of the battery B, the battery voltage Vi and the output voltage Vo of the direct-current power supply 70 exhibit temporal variations shown in FIG. 13. Here, broken and solid lines indicate the temporal variations of the battery voltage Vi and the output voltage Vo, respectively.

During the period when the battery voltage Vi is higher than the start input voltage Ei (the region I shown in FIG. 13), the input voltage detecting section 7 maintains the start signal St at the L level, and thereby, the converter control section 4 maintains the non-operating state. Accordingly, the converter control section 4 maintains the switching signal SG at the L level, and then, the chopper switch 3S is maintained in the OFF state. In other words, the step-up chopper 3 maintains the non-operating state. On the other hand, in the region I, the bypass control section 11 maintains the bypass switch 5 in the ON state since the start signal St is maintained at the L level. During the ON period of the bypass switch 5, the load current Io is split into two branches between the high side input terminal 1A and the high side output terminal 2A. Accordingly, the conduction losses of the direct-current power supply 70 are reduced during the non-operating period of the step-up chopper 3, in a manner similar to that of Embodiment 2.

When the battery voltage Vi falls below the desired voltage ET and further falls to the start input voltage Ei (cf. the point Ss shown in FIG. 13), the input voltage detecting section 7 activate the start signal St. Thereby, the converter control section 4 starts. After the time Ts, the OSC 4A sends the reference signal VR and the initialization process is performed. On the other hand, at the time Ts, the gate potential of the bypass switch 5 does not rise due to the delaying effect of the bypass control section 11, and accordingly, the bypass switch 5 is maintained in the ON state.

At the time Ts, the output voltage Vo is lower than the desired voltage ET: Vo<ET. Accordingly, when the starting-time of the converter control section 4 has elapsed from the time Ts, the PWM circuit 4C starts at once the switching in level of the switching signal SG. Thereby, the chopper switch 3S starts the switching operation inside the step-up chopper 3. In other words, the step-up chopper 3 starts its boost operation.

At the start of the boost operation by the step-up chopper 3, the battery voltage Vi is equal to or lower than the start input voltage Ei: Vi≦Ei. On the other hand, the desired voltage ET is equal to or beyond the lowest step-up ratio 1/(1−rmin) times as high as the start input voltage Ei : ET≧Ei/(1−rmin). Accordingly, the ratio ET/Vi of the desired voltage ET to the battery voltage Vi is equal to or higher than the lowest step-up ratio 1/(1−rmin): ET/Vi≧ET/Ei≧1/(1−rmin). Therefore, the converter control section 4 can control the step-up chopper 3 with stability so that the output voltage Vo does not substantially exceed the desired voltage ET. Thus, the step-up chopper 3 operates with stability.

The output voltage Vo promptly rises due to the boost operation of the step-up chopper 3, and exceeds the battery voltage Vi at the time Tm. See the point Sm shown in FIG. 13. At that time, the direction of the bypass current I5 is reversed.

The bypass control section 11 turns the bypass switch 5 off at the time Tf, or after the delay time ΔTD from the time Ts. See the point Sf shown in FIG. 13. The delay time ΔTD is close enough to-the actual starting-time of the converter control section 4. Accordingly, the output voltage Vo is maintained equal to or beyond the level lower than the battery voltage Vi by the non-operating voltage drop Von, from the time Ts, at the earliest, until an instant when the actual starting-time of the converter control section 4 has nearly elapsed. See the point Ss shown in FIG. 13. Here, the start input voltage Ei is equal to or higher than the sum of the non-operating output lower limit Ec and the maximum voltage drop Vonmax: Ei≧Ec+Vonmax. Therefore, at the time Ts, the output voltage Vo is equal to or beyond the non-operating output lower limit Ec: Vo≧Ei−Vonmax≧Ec=El+α. Thus, the output voltage Vo is maintained higher enough than the allowable lower limit El of the operating voltage of the external load L from the time Ts until the actual starting-time of the converter control section 4 has nearly elapsed.

Furthermore, the time Tf when the bypass switch 5 is turned off is close enough to the time Tm when the battery voltage Vi meets the output voltage Vo, by the above-described setting for the delay time ΔTD. Accordingly, the bypass switch 5 is turned off under the condition where the bypass current I5 is small enough, and therefore, the switching loss is suppressed.

After the time Tf, the output voltage Vo promptly reaches the desired voltage ET and then, is maintained substantially equal to the desired voltage ET. The stable boost operation by the step-up chopper 3 maintains with stability the output voltage Vo substantially equal to the desired voltage ET. Here, the desired voltage ET is equal to or beyond the operating output lower limit Eo: ET≧Eo=El+β. Accordingly, the output voltage Vo is maintained higher enough than the allowable lower limit El of the operating voltage of the external load L after the time Tf. Thus, the stability of the output voltage Vo of the direct-current power supply 70 has high reliability.

The direct-current power supply 70 can further maintain the output voltage Vo to be equal to the desired voltage VT, until the instant when the battery B nearly reaches the complete discharge state. As a result, almost all the capacity of the battery B can be provided for the external load L as its power. Especially when the battery-powered electronic appliance with-wireless communications capabilities adopts the high energy density lithium ion rechargeable batteries, the output voltage Vo falls below the desired voltage ET in the middle stages of the discharge due to the fall of the battery voltage Vi. In such a case, in-particular, the direct-current power supply 70 has advantages in the improvement in use efficiency of battery capacity.

Embodiment 8

Figure 14:
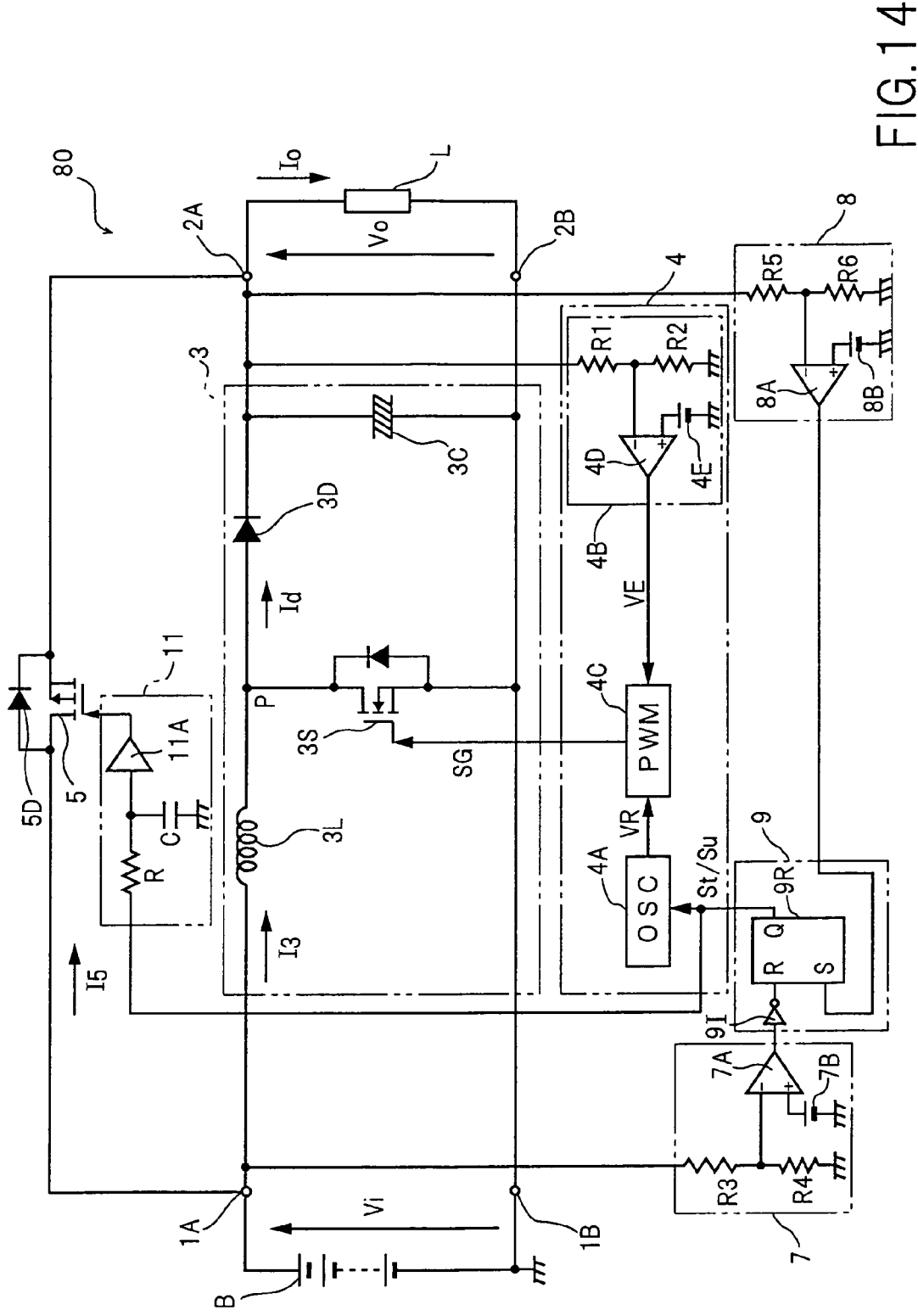
FIG. 14 is a circuit diagram of a direct-current power supply 80 according to Embodiment 8 of the present invention.

FIG. 14 is the circuit diagram of the direct-current power supply 80 according to Embodiment 8 of the present invention. The direct-current power supply 80 according to Embodiment 8 has circuitry similar to those of the direct-current power supply 40 according to Embodiment 4 and the direct-current power supply 70 according to Embodiment 7. Accordingly, in FIG. 14, those similar components are marked with the same reference symbols as the reference symbols shown in FIGS. 6 and 12. Furthermore, for the details of those similar components, the description about Embodiments 4 and 7 is cited.

The direct-current power supply 80 according to Embodiment 8 of the present invention comprises an output voltage detecting section 8 and a starting control section 9 similar to those of the direct-current power supply 40 according to Embodiment 4, in addition to the configuration of the direct-current power supply 70 according to Embodiment 7. The direct-current power supply 80 is different from the direct-current power supply 70 according to Embodiment 7 in the following ways. First, the output voltage detecting section 8 monitors the output voltage Vo and, when detecting a fall of the output voltage Vo to the start output voltage Eu, informs the starting control section 9 of the detection. The starting control section 9 then sends the start signal St to the converter control section 4. Thereby, the converter control section 4 starts. Here, the start output voltage Eu is set at the lowest equal to the non-operating output lower limit Ec: Eu≧Ec.

Next, the PWM circuit 4C sets a minimum ON width Tonmin of the chopper switch 3S. At that time, the lowest step-up ratio 1/(1−Tonmin/T)=1/(1−rmin)>1 is provided for the step-up ratio of the step-up chopper 3, Vo/Vi=1/(1−Ton/T)=1/(1−r). The feedback circuit 4B then sets the desired voltage ET to be, at the lowest, equal to either the lowest step-up ratio of the step-up chopper 3, 1/(1−rmin), times as high as the sum of the start output voltage Eu and the maximum voltage drop Vonmax, (Eu+Vonmax)/(1−rmin), or the operating output lower limits Eo, whichever is higher: ET≧max((Eu+Vonmax)/(1−rmin), Eo). The desired voltage ET is, in particular, higher than the start output voltage Eu: ET>Eu.

Furthermore, the input voltage detecting section 7 monitors the battery voltage Vi and, when detecting a rise of the battery voltage Vi from a level lower than a stop input voltage Es to the stop input voltage Es, informs the starting control section 9 of the detection. The starting control section 9 then sends the stop signal Su to the converter control section 4. Thereby, the converter control section 4 stops. Here, the stop input voltage Es is set to fall within the range from a lower limit substantially equal to the sum of the start output voltage Eu and the maximum voltage drop Vonmax, to an upper limit substantially equal to the desired voltage ET divided by the lowest step-up ratio 1/(1−rmin): Eu+Vonmax≦Es≦ET×(1−rmin).

The converter control section 4 interprets, for the output of the starting control section 9, a transition from the L level to the H level as the start signal St and a transition from the H level to the L level as the stop signal Su, in the direct-current power supply 80 according to Embodiment 8. In the bypass control section 11, the delay circuit delays the stop signal Su by the fixed delay time ΔTD on the order of the damping time constant R×C in a manner similar to that for the start signal St, and transmits the stop signal Su to the switch driving section 11A. On the other hand, the switch driving section 11A amplifies the stop signal Su in a manner similar to that for the start signal St, and sends the stop signal Su to the gate of the bypass switch 5. Thereby, the bypass switch 5 is turned off and on at the receipts of the start signal St and the stop signal Su, respectively.

In the early to middle stages of the discharge of the battery B, the battery voltage Vi is higher than a stop input voltage Es: Vi>Es. Here, the stop input voltage Es is equal to or higher than the sum of the start output voltage Eu and the maximum voltage drop Vonmax: Es≧Eu+Vonmax. Accordingly, during the period when the battery voltage Vi is maintained higher than the stop input voltage Es (Vi>Es), the output voltage Vo is higher than the start output voltage Eu: Vo≧Vi−Vonmax>Es−Vonmax≧Eu. Therefore, the starting control section 9 maintains its output Q at the L level with stability. Accordingly, the bypass control section 11 maintains the bypass switch 5 in the ON state with stability. Thereby, the output voltage Vo is maintained with stability at the level lower than the battery voltage Vi by the non-operating voltage drop Von. On the other hand, the converter control section 4 maintains the non-operating state with stability, and then, the chopper switch 3S maintains the OFF state with stability. In other words, the step-up chopper 3 maintains the non-operating state with stability.

Figure 15:
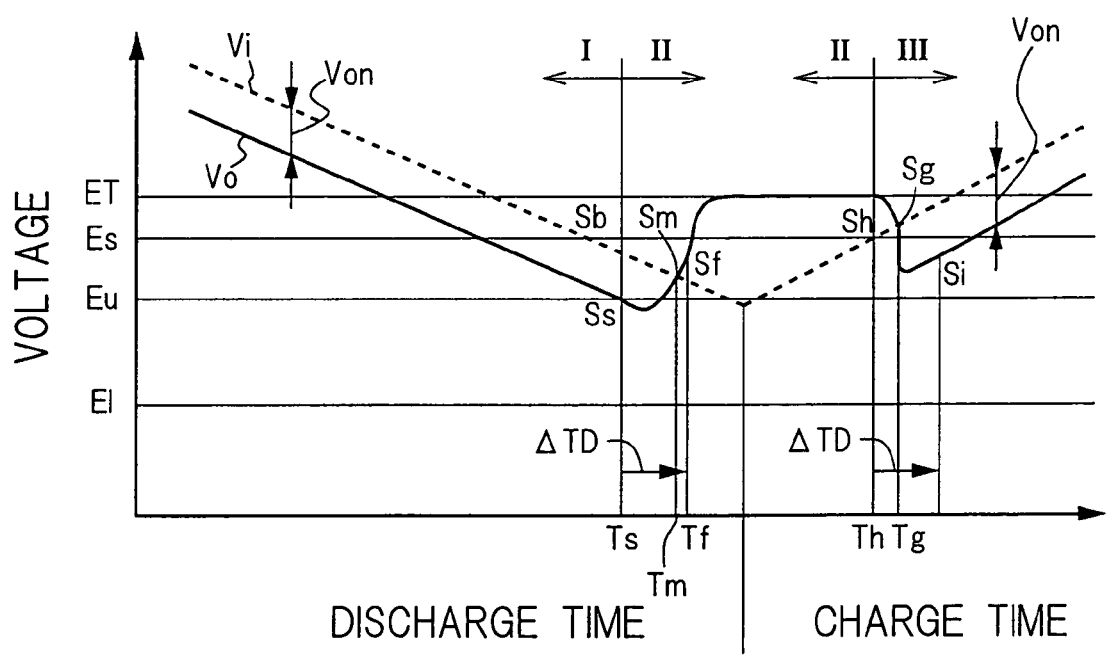
FIG. 15 is a graph showing temporal variations in a battery voltage Vi and an output voltage Vo in the last stages of a discharge and the early stages of the following charge of a battery B in the direct-current power supply 80 due to Embodiment 8 of the present invention.

In the middle through last stages of the discharge and the early stages of the following charge of the battery B, the battery voltage Vi and the output voltage Vo of the direct-current power supply 80 exhibit temporal variations shown in FIG. 15. Here, broken and solid lines show the temporal variations of the battery voltage Vi and the output voltage Vo, respectively.

During the period when the output voltage Vo is higher than the start output voltage Eu (the region I shown in FIG. 15), the starting control section 9 maintains its output Q at the L level, and accordingly, the step-up chopper 3 maintains the non-operating state. Here, the difference between the stop input voltage Es and the start output voltage Eu is equal to or beyond the maximum voltage drop Vonmax: Es−Eu≧Vonmax. Accordingly, the fall of the battery voltage Vi to the stop input voltage Es (cf. the point Sb shown in FIG. 15) is earlier than the fall of the output voltage Vo to the start output voltage Eu (cf. the point Ss shown in FIG. 15.) Therefore, in the end of the region I, the step-up chopper 3 maintains the non-operating state with stability, since the output Q of the starting control section 9 is maintained at the L level with stability.

The battery voltage Vi falls to the stop input voltage Es. See the point Sb shown in FIG. 15. Then, the input voltage detecting section 7 changes its output into the H level, and accordingly, the reset R of the latch circuit 9R changes into the L level. Next, the output voltage Vo falls to the start output voltage Eu. See the point Ss shown in FIG. 15. Then, the output voltage detecting section 8 changes the set S of the latch circuit 9R into the H level, and accordingly, the latch circuit 9R changes its output Q into the H level, and in other words, sends the start signal St. Thereby, the converter control section 4 starts. After the time Ts, the OSC 4A starts the sending of the reference signal VR, and an initialization process similar to that of Embodiment 2 is performed. On the other hand, at the time Ts, the gate potential of the bypass switch 5 does not rise due to the delaying effect of the bypass control section 11, and then, the bypass switch 5 is maintained in the ON state.

The start output voltage Eu is lower than the desired voltage ET: Eu<ET. Accordingly, at the time Ts, the output voltage Vo is lower than desired voltage ET: Vo≈Eu<ET. Therefore, when the starting-time of the converter control section 4 has elapsed from the time Ts, the PWM circuit 4C starts at once the switching in level of the switching signal SG. Thereby, the chopper switch 3S promptly starts the switching operation inside the step-up chopper 3. In other words, the step-up chopper 3 promptly starts the boost operation.

During the ON period of the bypass switch 5, the battery voltage Vi is equal to or lower than the sum of the output voltage Vo and the maximum voltage drop Vonmax: Vi=Vo+Von≦Vo+Vonmax. In particular, at the time Ts, the battery voltage Vi is equal to or lower than the stop input voltage Es, or the desired voltage ET divided by the lowest step-up ratio 1/(1−rmin), ET×(1−rmin): Vi≦Es≦ET×(1−rmin) See the point Ss shown in FIG. 15. Accordingly, the ratio ET/Vi of the desired voltage ET to the battery voltage Vi is equal to or beyond the lowest step-up ratio 1/(1−rmin): ET/Vi≧1/(1−rmin). Therefore, the converter control section 4 can control the step-up chopper 3 with stability so that the output voltage Vo does not substantially exceed the desired voltage ET. Thus, the step-up chopper 3 operates with stability.

The output voltage Vo, after the time Ts, promptly rises due to the boost operation of the step-up chopper 3, and at the time Tm, exceeds the battery voltage Vi. See the point Sm shown in FIG. 15. At that time, the direction of the bypass current I5 is reversed.

The bypass control section 11 turns the bypass switch 5 off at the time Tf, or after the delay time ΔTD from the time Ts. See the point Sf shown in FIG. 15. The delay time ΔTD is close enough to the actual starting-time of the converter control section 4. Accordingly, the output voltage Vo is maintained equal to or beyond the level lower than the battery voltage Vi by the non-operating voltage drop Von, from the time Ts, at the earliest, until the actual starting-time of the converter control section 4 has nearly elapsed. See the point Ss shown in FIG. 15. On the other hand, the start output voltage Eu is equal to or beyond the non-operating output lower limit Ec: Eu≧Ec. Therefore, at the time Ts, the output voltage Vo is substantially equal to or beyond the non-operating output lower limit Ec: Vo≈Eu≧Ec=El+α. As a result, the output voltage Vo is maintained higher enough than the allowable lower limit El of the operating voltage of the external load L from the time Ts until the actual starting-time of the converter control section 4 has nearly elapsed.

Furthermore, the time Tf when the bypass switch 5 is turned off is close enough to the time Tm when the battery voltage Vi meets the output voltage Vo, by the above-described setting for the delay time ΔTD. Accordingly, the switching loss is suppressed since the bypass switch 5 is turned off under the condition where the bypass current I5 is small enough.

After the meeting of the output voltage Vo with the desired voltage ET, the stable boost operation by the step-up chopper 3 maintains with stability the output voltage Vo substantially equal to the desired voltage ET. Here, the desired voltage ET is equal to or beyond the operating output lower limit Eo: ET≧Eo=El+β. Accordingly, the output voltage Vo is maintained higher enough than the allowable lower limit El of the operating voltage of the external load L. Thus, the stability of the output voltage Vo of the direct-current power supply 80 has high reliability.

Until the instant when the battery B nearly reaches the complete discharge state, the direct-current power supply 80 can further maintain the output voltage Vo substantially equal to the desired voltage VT. See the region II shown in FIG. 15. As a result, almost all the capacity of the battery B can be provided for the external load L as its power. Especially when the battery-powered electronic appliance with wireless communications capabilities adopts the high energy density lithium ion rechargeable batteries, the output voltage Vo falls below the desired voltage ET in the middle stages of the discharge due to the fall of the battery voltage Vi. In such a case, the direct-current power supply 80 in particular has advantages in the improvement in use efficiency of battery capacity.

Assume that after the time Tf, the battery-powered electronic appliance is connected to an external power supply and continues operations under the DC power received through the direct-current power supply 80 in addition to the charge of the battery B. In the direct-current power supply 80, the step-up chopper 3 then continues operation and maintains the output voltage Vo to be equal to the desired voltage ET. On the other hand, the battery voltage Vi rises due to the charge of the battery B. Thereby, the ratio ET/Vi of the desired voltage ET to the battery voltage Vi falls.

When the battery voltage Vi rises to the stop input voltage Es (cf. the point Sh shown in FIG. 15), the input voltage detecting section 7 changes the reset R of the latch circuit 9R into the H level through the inverter 9I. At that time, the latch circuit 9R changes its output Q into the L level, and accordingly, the converter control section 4 stops, and then, the step-up chopper 3 stops. Here, the ratio ET/Es of the desired voltage ET to the stop input voltage Es is equal to or beyond the lowest step-up ratio 1/(1−rmin): ET/Es≧1/(1−rmin). Accordingly, the step-up chopper 3 stops with stability at the time Th when the battery voltage Vi rises to the stop input voltage Es. On the other hand, the gate potential of the bypass switch 5 is not pulled down due to the delaying effect of the bypass control section 11, and therefore, the bypass switch 5 is maintained in the OFF state at the time Th.

After the time Th, the output voltage Vo falls from the desired voltage ET, and at the time Tg, meets the battery voltage Vi. See the point Sg shown in FIG. 15. At that time, the body diode 5D is turned on in the bypass switch 5. Furthermore, the bypass control section 11 turns the bypass switch 5 on after the lapse of the delay time ΔTD from the time Th. See the point Si shown in FIG. 15. Thereby, after the time Tg, the output voltage Vo is maintained at the level lower than the battery voltage Vi by the non-operating voltage drop Von: Vo=Vi−Von. Furthermore, the stop input voltage Es is equal to or higher than the sum of the start output voltage Eu and the maximum voltage drop Vonmax, and after the time Th, the battery voltage Vi is equal to or beyond the stop input voltage Es: Es≧Eu+Vonmax and Vi≧Es. Accordingly, after the time Th, the output voltage Vo is maintained equal to or beyond the start output voltage Eu: Vo≧Vi−Vonmax≧Es−Vonmax≧Eu≧Ec=El+α. Thus, the output voltage Vo is maintained higher enough than the allowable lower limit El for the operating voltage of the external load L after the time Th. The output voltage Vo further rises with the rise of the battery voltage Vi due to the charge of the battery B, while maintaining the difference from the battery voltage Vi substantially equal to the non-operating voltage drop Von. See the region III shown in FIG. 15.

The direct-current power supply 80 according to Embodiment 8 of the present invention maintains the output voltage Vo higher enough than the allowable lower limit El of the operating voltage of the external load L, when the charge and discharge of the battery B are repeated, as described above. Therefore, the stability of the output voltage Vo has high reliability.

Embodiment 9

Figure 16:
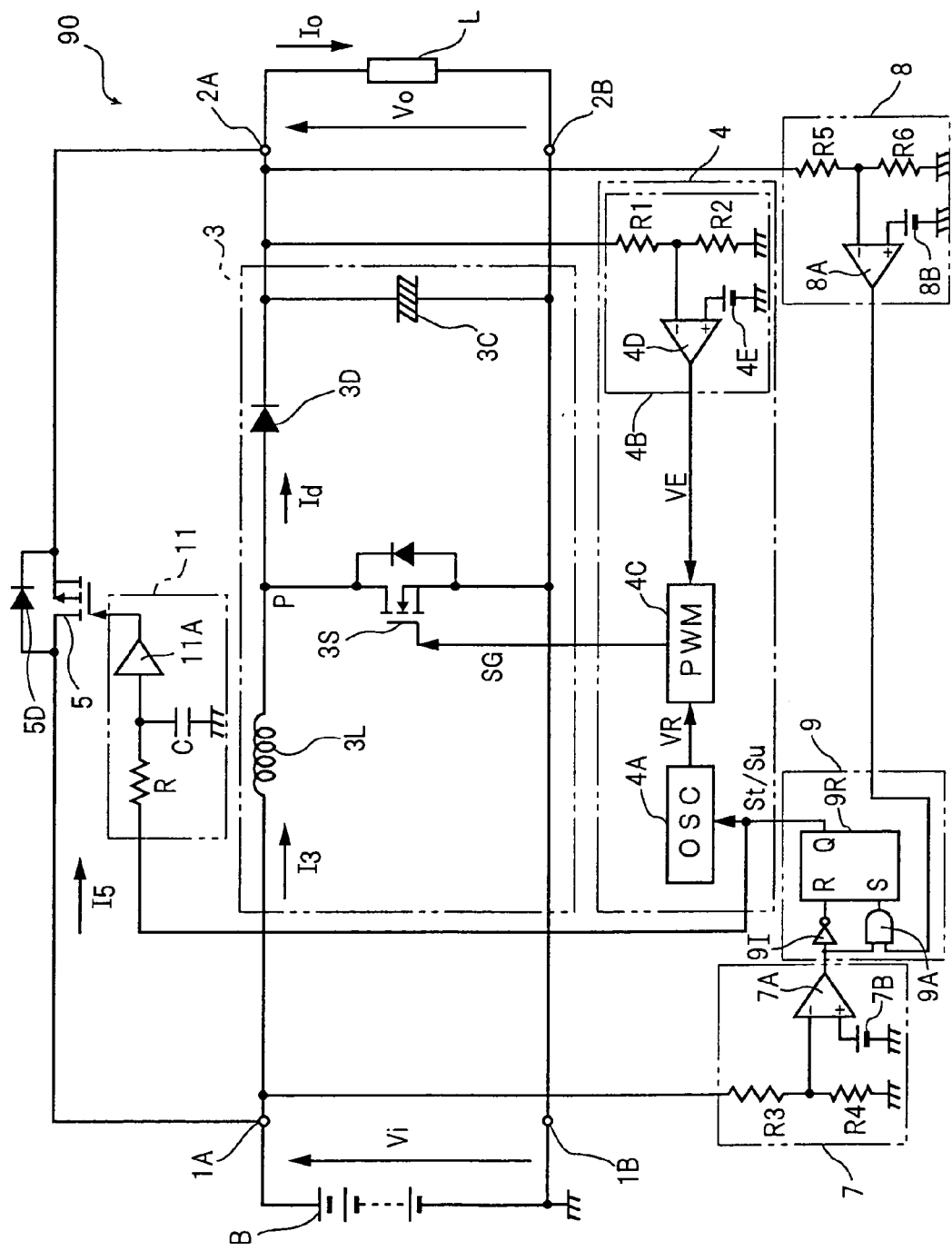
FIG. 16 is a circuit diagram of a direct-current power supply 90 according to Embodiment 9 of the present invention.

FIG. 16 is the circuit diagram of the direct-current power supply 90 according to Embodiment 9 of the present invention. The direct-current power supply 90 according to Embodiment 9 has circuitry similar to that of the direct-current power supply 50 according to Embodiment 5 and the direct-current power supply 80 according to Embodiment 8. Accordingly, in FIG. 16, those similar components are marked with the same reference symbols as the reference symbols shown in FIGS. 8 and 14. Furthermore, for the details of those similar components, the description about Embodiments 5 and 8 is further cited.

The direct-current power supply 90 according to Embodiment 9 of the present invention further comprises an AND circuit 9A inside the starting control section 9, similar to that of the direct-current power supply 50 according to Embodiment 5, in contrast to the direct-current power supply 80 according to Embodiment 8. Furthermore, the input voltage Vi and the output voltage Vo of the direct-current power supply 90 according to Embodiment 9 exhibit temporal variations similar to those of the direct-current power supply 50 according to Embodiment 5. Accordingly, for those temporal variations immediately after the connection with the fully charged battery B, in particular, FIG. 9 is cited.

Immediately after the fully charged battery B is connected to the direct-current power supply 90, the battery voltage Vi is substantially equal to the battery voltage VA in the fully charged condition, and in particular, higher than the stop input voltage Es. On the other hand, the output voltage Vo is, in general, substantially equal to zero, and in particular, lower than the start output voltage Eu. Accordingly, the outputs of the input voltage detecting section 7 and the output voltage detecting section 8 are at the L and H levels, respectively. Therefore, the inverter 9I maintains its output at the H level, and the AND circuit 9A maintains its output at the L level. Thus, the latch circuit 9R maintains its output Q at the L level. Thereby, the converter control section 4 maintains the non-operating state, and accordingly, the step-up chopper 3 maintains the non-operating state. On the other hand, the bypass control section 11 maintains the bypass switch 5 in the ON state.

The output voltage Vo, upon the start of the discharge of the battery B, promptly rises (cf. the solid line shown in FIG. 9), and at the time Ta, exceeds the start output voltage Eu. See the point Sa shown in FIG. 9. At that time, the output voltage detecting section 8 changes its output into the L level. However, the latch circuit 9R maintains its output Q at the L level with stability, since neither the inverter 9I nor the AND circuit 9A changes its output. The output voltage Vo (cf. the solid line) continues to rise after the time Ta and is maintained with stability at the level lower than the battery voltage Vi (cf. the broken line) by the non-operating voltage drop Von. Thus, the starting control section 9 sends the stop signal Su with stability upon the connection of the direct-current power supply 90 and the battery B. Thereby, the misoperation of the step-up chopper 3 upon the start of the discharge of the battery B is securely prevented.

Embodiment 10

Figure 17:
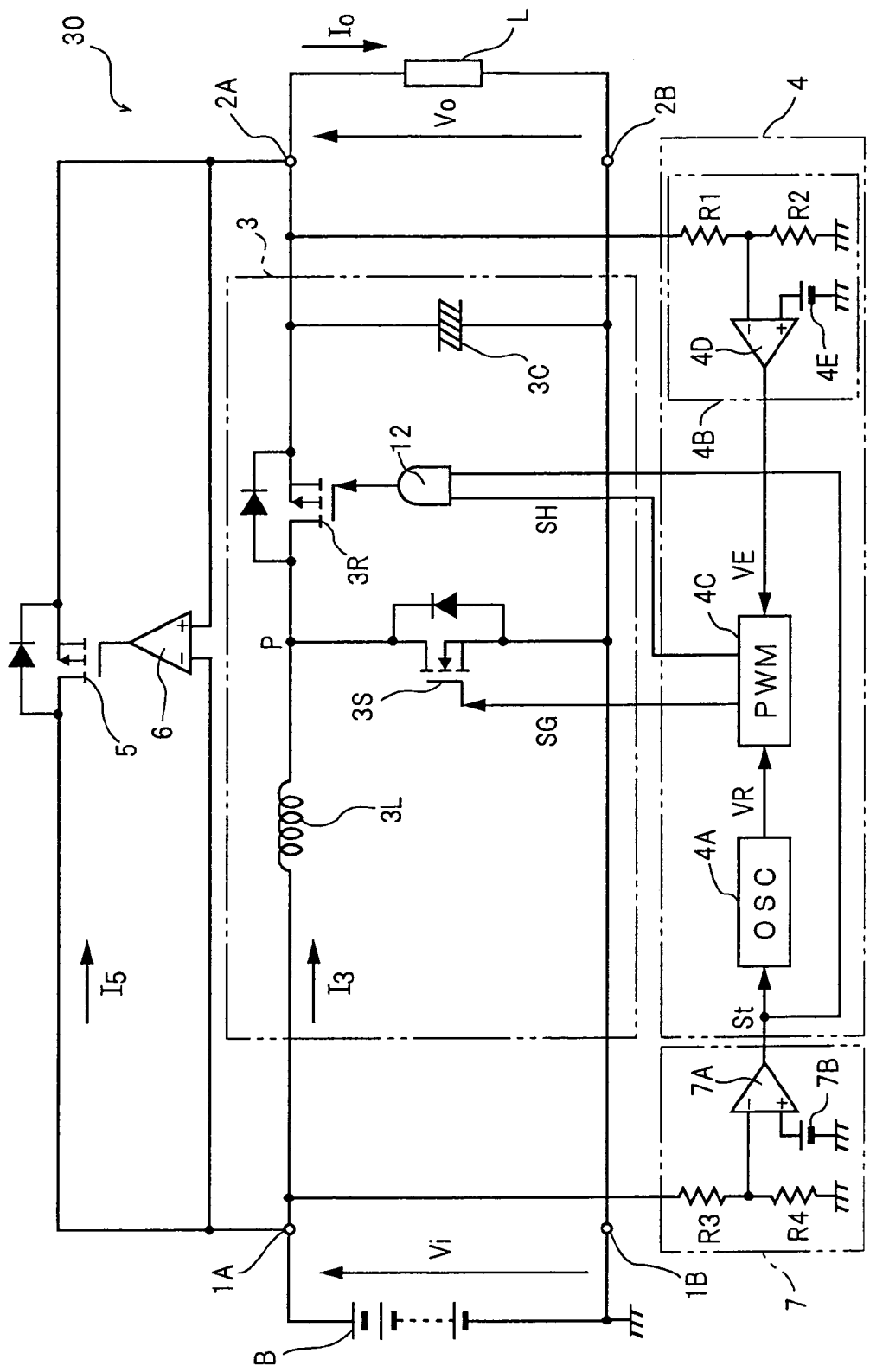
FIG. 17 is a circuit diagram of a direct-current power supply 30 according to Embodiment 10 of the present invention.

FIG. 17 is the circuit diagram of the direct-current power supply 30 according to Embodiment 10 of the present invention. This direct-current power supply 30 comprises circuitry similar to that of direct-current power supply 20 according to Embodiment 2. Accordingly, in FIG. 17, those similar components are marked with the same reference symbols as the reference symbols shown in FIG. 4. Furthermore, for the details of those similar components, the description about Embodiment 2 is cited.

The direct-current power supply 30 according to Embodiment 10, in contrast to the direct-current power supply 20 according to Embodiment 2, comprises a synchronous rectification switch 3R instead of the diode 3D, and in addition, a synchronous rectification control section 12.

The synchronous rectification switch 3R is preferably a P-channel MOSFET, whose drain is connected to the node P between the inductor 3L and the chopper switch 3S, whose source is connected to the high side output terminal 2A, and whose gate is connected to the output terminal of the synchronous rectification control section 12.

For the synchronous rectification switch 3R, the reverse correspondences between the logical level of its gate and its ON/OFF states are established with respect to the chopper switch 3S. In other words, the synchronous rectification switch 3R is in the OFF and ON states when the logical level of its gate is at the H and L levels, respectively. The PWM circuit 4C sends a synchronizing signal SH to the gate of the synchronous rectification switch 3R. The synchronizing signal SH is a rectangle voltage pulse with a fixed amplitude. The synchronous rectification switch 3R is turned on and off at the falling and rising edges of the synchronizing signal SH, respectively. The PWM circuit 4C maintains the synchronizing signal SH at the L level during the non-operating period, and on the other hand, sets the logical level of the synchronizing signal SH in common with the logical level of the switching signal SG during the operating period. In other words, the synchronizing signal SH is at the H and L levels when the switching signal SG is at the H and L levels, respectively.

The synchronous rectification control section 12 comprises an AND circuit calculating the AND of the synchronizing signal SH sent from the input voltage detecting section 7 and the start signal St sent from the PWM circuit 4C, further making the logical level of the gate of the synchronous rectification switch 3R agree with the result of the calculation. The synchronous rectification control section 12 controls the logical level of the gate of the synchronous rectification switch 3R as follows. When the level of the start signal St is at the L level, the synchronous rectification control section 12 maintains the logical level of the gate of the synchronous rectification switch 3R at the L level. When the level of the start signal St is at the H level, the synchronous rectification control section 12 makes the logical level of the gate of the synchronous rectification switch 3R agree with the logical level of the synchronizing signal SH.

The direct-current power supply 30 realizes the following on-off control over the synchronous rectification switch 3R, using the synchronous rectification control section 12. The input voltage detecting section 7 maintains the start signal St at the L level during the period when the battery voltage Vi is higher than the start input voltage Ei. See the region I shown in FIG. 5. Accordingly, the synchronous rectification switch 3R maintains the ON state. Here, the converter control section 4, that is, the PWM circuit 4C maintains the non-operating state in that period.

At the time Ts when the battery voltage Vi falls to the start input voltage Ei, the input voltage detecting section 7 changes the start signal St into the H level. See the point Ss shown in FIG. 5. Thereby, the converter control section 4 starts. Furthermore, after the lapse of the starting-time of the converter control section 4, the PWM circuit 4C starts the switching in level of the switching signal SG and the synchronizing signal SH. After the time Ts, the logical level of the gate of the synchronous rectification switch 3R agrees with the logical level of the synchronizing signal SH. The synchronizing signal SH is maintained at the L level during the period from the time Ts until the starting-time of the converter control section 4 elapses. Accordingly, the synchronous rectification switch 3R is maintained in the ON state. After the lapse of the starting-time of the converter control section 4, the synchronizing signal SH starts the switching in level. At that time, the synchronous rectification switch 3R starts the switching operation in accordance with the synchronizing signal SH. In particular, the synchronous rectification switch 3R is in the OFF and ON states when the chopper switch 3S is in the ON and OFF states, respectively.

As clear from the above-described on-off control, the timing of the turning on and off of the synchronous rectification switch 3R is similar to the timing of the turning on and off of the diode 3D (cf. FIG. 4) inside the direct-current power supply 20 according to Embodiment 2. More specifically, the synchronous rectification switch 3S maintains the ON state during the non-operating period of the PWM circuit 4C, and on the other hand, is turned on and off in the reverse of the turning on and off of the chopper switch 3S during the operating period of the PWM circuit 4C. In other words, the synchronous rectification switch 3R is in the OFF and ON states when the chopper switch 3S is in the ON and OFF states, respectively. Thus, the direct-current power supply 30 according to Embodiment 10 operates in a manner similar to that of the direct-current power supply 20 according to Embodiment 2. In particular, the stability of the output voltage Vo has high reliability.

Generally, conduction loss of a switch element is lower than that of a diode. Accordingly, the direct-current power supply 30 according to Embodiment 10 has advantages in the lower conduction loss of the step-up chopper 3 over the direct-current power supply 20 according to Embodiment 2.

The step-up chopper 3 includes the diode 3D in the above-described direct-current power supply according to Embodiments 1-9. In the direct-current power supplies, the step-up chopper 3 may include a synchronous rectification switch and a synchronous rectification control section instead of the diode 3D, for example, in a manner similar to the direct-current power supply 30 according to Embodiment 10. In that case, the turning on and off of the synchronous rectification switch inside each direct-current power supply is controlled, in particular, to be synchronized to the turning on and off of the diode 3D. More specifically, the synchronous rectification switch, as well as the bypass switch 5, maintains the ON state during the non-operating period of the PWM circuit 4C, and is turned on and off in the reverse of the turning on and off of the chopper switch 3S during the operating period of the PWM circuit 4C. Such an on-off control will be easily understood for one of ordinary skill in the art, based on the on-off control of the synchronous rectification control section 12 in Embodiment 10. Accordingly, the substitution of the synchronous rectification switch for the diode 3D does not impair the operation of each direct-current power supply according to Embodiments. In particular, the stability of the output voltage Vo maintains high reliability. Furthermore, the above-described substitution has advantages in the low conduction loss of the DC-DC converter, since the conduction loss of a switch element is, in general, lower than a diode.

Embodiment 11

Figure 18:
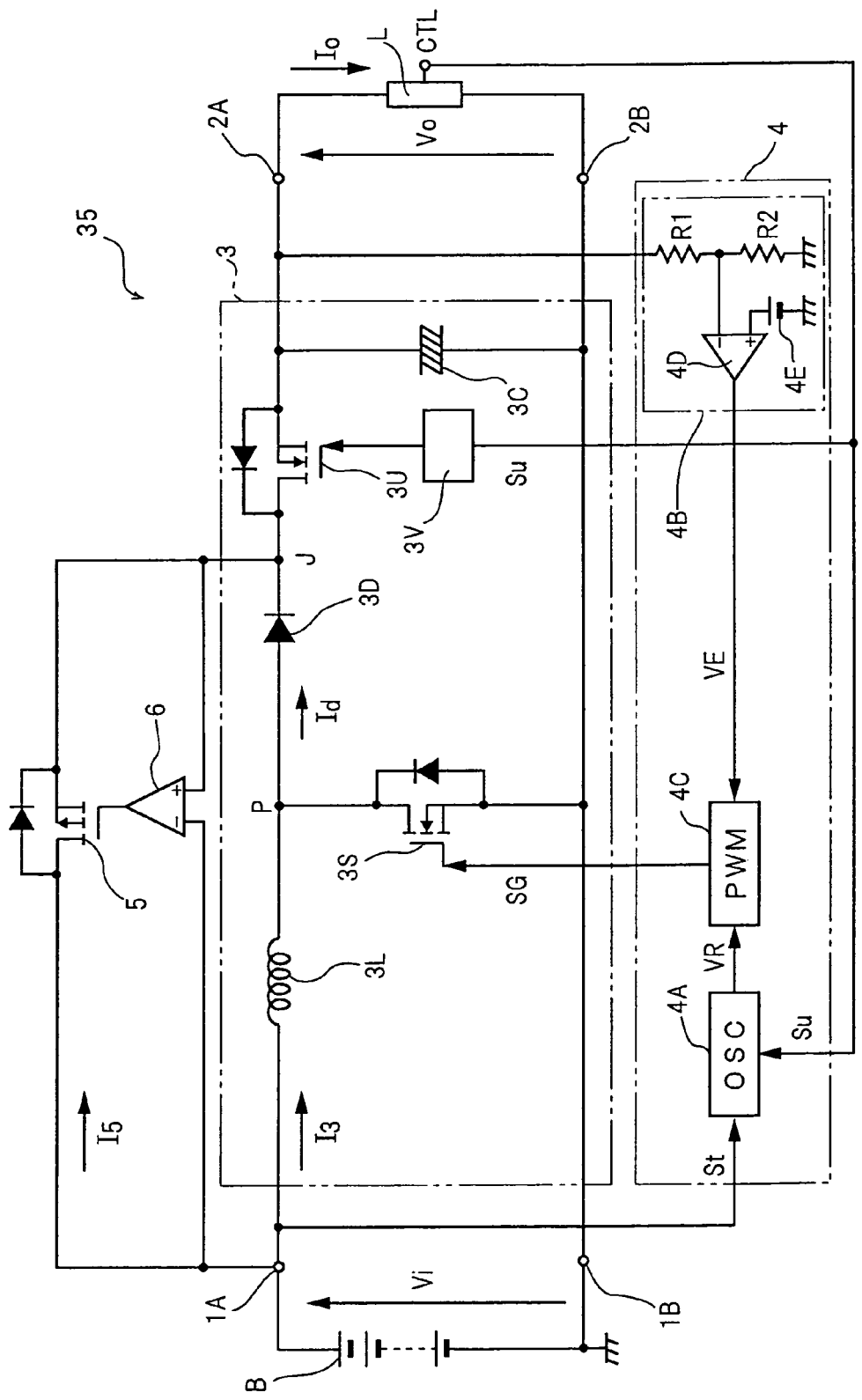
FIG. 18 is a circuit diagram of a direct-current power supply 35 according to Embodiment 11 of the present invention.
Figure 19:
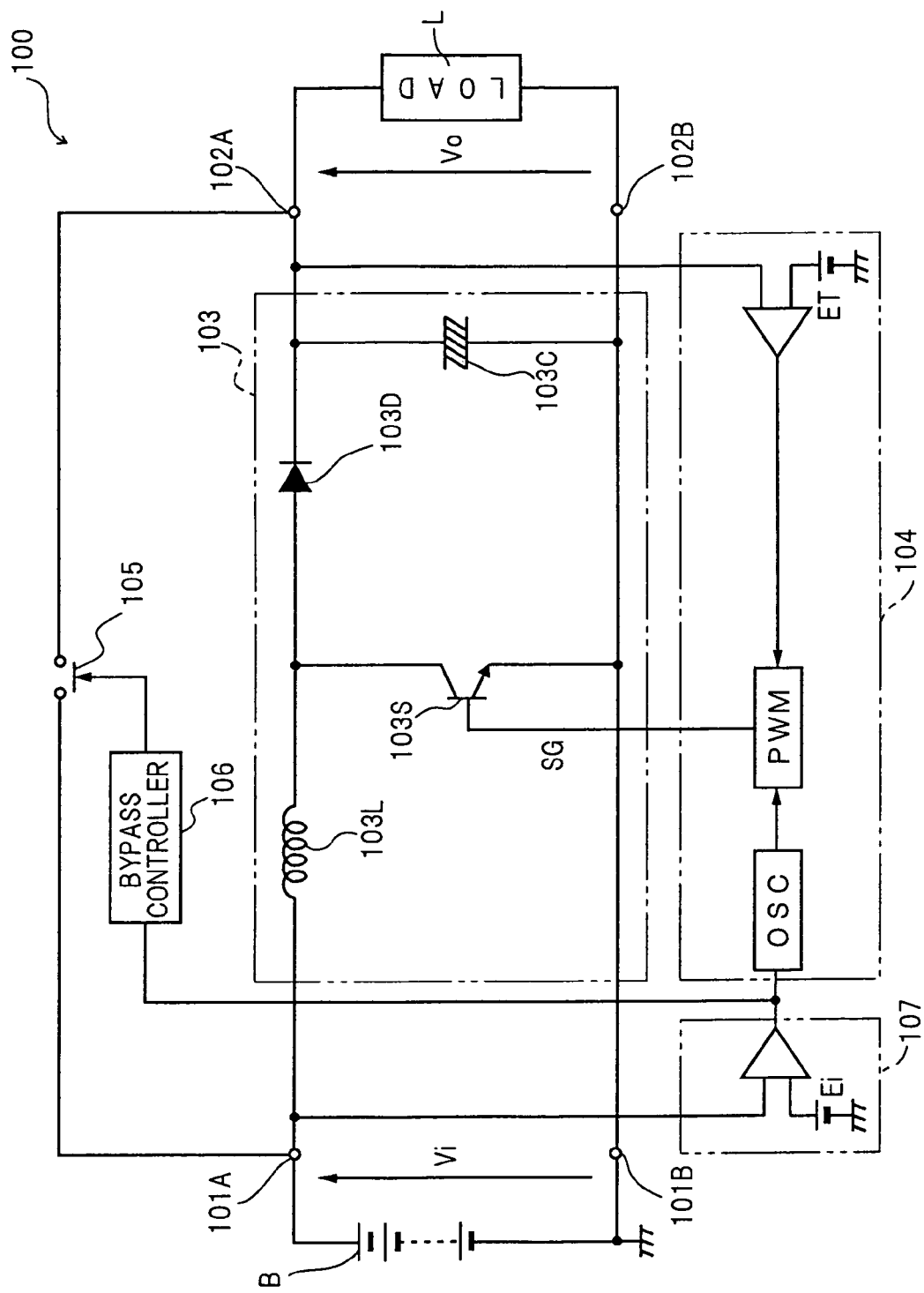
FIG. 19 is a circuit diagram of a conventional direct-current power supply 100 included in a battery-powered electronic appliance.
Figure 20A:
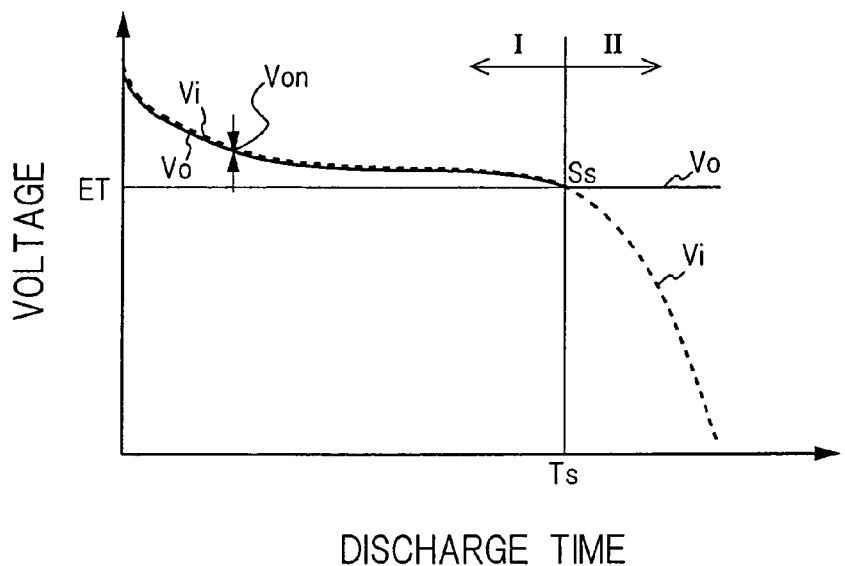
FIG. 20A is a graph showing temporal variations in a battery voltage Vi and an output voltage Vo throughout the discharge period of a battery B in the conventional direct-current power supply 100.
Figure 20B:
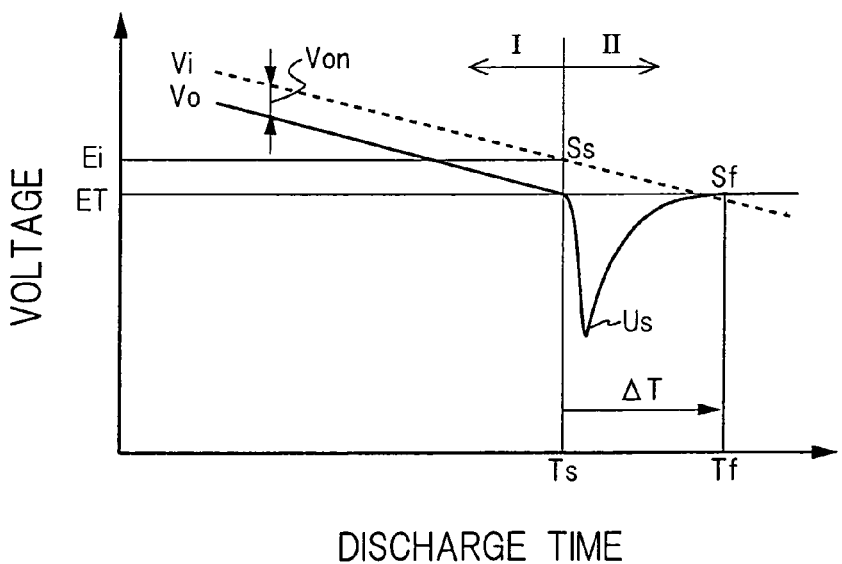
FIG. 20B is an enlarged view of the vicinity of a point Ss shown in FIG. 20A, at which the output voltage Vo meets a desired voltage ET.
Figure 21:
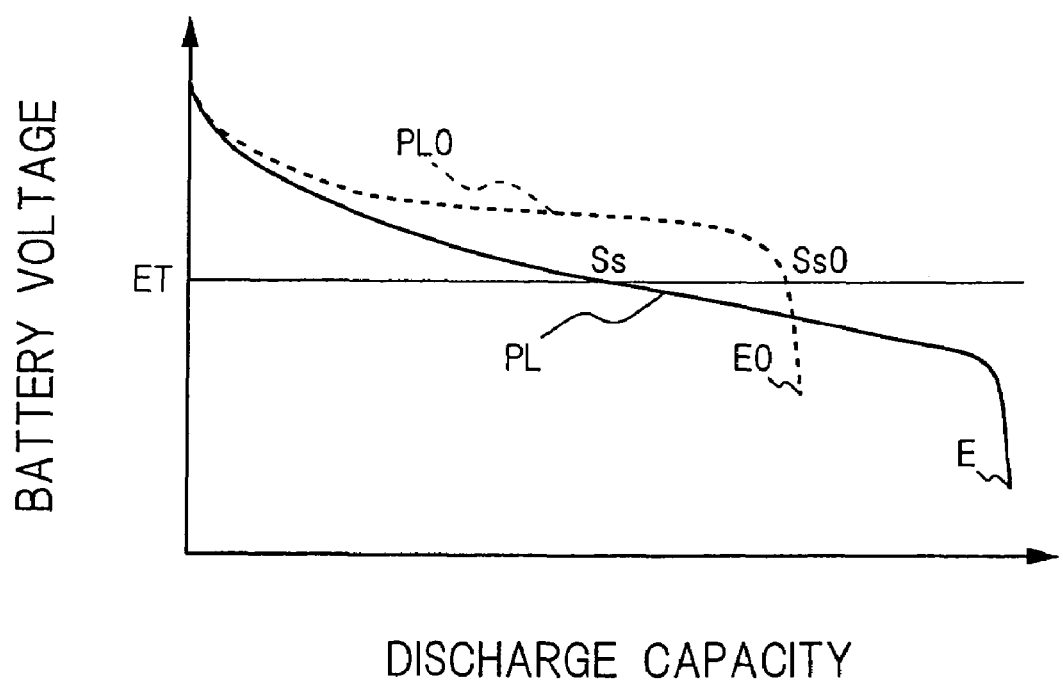
FIG. 21 is a graph showing each discharge curve of new-model and current lithium ion rechargeable batteries.

FIG. 18 is the circuit diagram of the direct-current power supply 35 according to Embodiment 11 of the present invention. This direct-current power supply 35 comprises circuitry similar to that of the direct-current power supply 10 according to Embodiment 1. Accordingly, in FIG. 18, those similar components are marked with the same reference symbols as the reference symbols shown in FIG. 1. Furthermore, for the details of those similar components, the description about Embodiment 1 is cited.

The direct-current power supply 35 according to Embodiment 11 comprises a stop switch 3U and its driver 3V, in addition to the configuration of the direct-current power supply 10 according to Embodiment 1. The stop switch 3U is preferably a N-channel MOSFET, whose drain is connected to the node J between the cathode of the diode 3D and the source of the bypass switch 5. Here, the non-inverting input terminal of the bypass control section 6 is connected to the node J. The source of the stop switch 3U is connected to the high side output terminal 2A. The stop switch 3U locates, in particular, nearer the battery B than the output smoothing capacitor 3C. The gate of the stop switch 3U is connected to the driver 3V. The stop switch 3U is in the ON and OFF states when the logical level of the gate is at the H and L levels, respectively. The load current Io is cut off when the stop switch 3U is turned off.

The driver 3V is connected to the control terminal CTL of the external load L. The driver 3V determines the logical level of the gate of the stop switch 3U in accordance with the stop signal Su received from the external load L through the control terminal CTL. The external load L is, for example, the control section of a notebook PC, and controls the turning on and off of the stop switch 3U. In other words, the external load L sends the stop signal Su from its control terminal CTL to the driver 3V, and informs the driver 3V of the logical level of the gate of the stop switch 3U, using the level of the stop signal Su. The stop signal Su is a rectangle voltage pulse with a fixed amplitude. The driver 3V turns the stop switch 3U on and off at the rising and falling edges of the stop signal Su, respectively.

The converter control section 4 monitors the stop signal Su. When the stop signal Su is at the L level, the converter control section 4 maintains the non-operating state, regardless of the level of the start signal St. When the stop signal Su is at the H level, the converter control section 4 starts in response to the level of the start signal St.

When the notebook PC goes into hibernation, for example, the external load L changes the level of the stop signal Su from the H level to the L level. Thereby, the stop switch 3U is turned off, and then, cuts off both the current Id flowing through the diode 3D included in the step-up chopper 3 and the bypass current I5. On the other hand, the converter control section 4 maintains the non-operating state, and accordingly, the step-up chopper 3 maintains the non-operating state. Thus, the external load L cuts off the power from the direct-current power supply 35. As a result, power is not supplied to the external load L, and therefore, power consumption in the external load L is suppressed, and thereby, the use efficiency of the battery B improves.

The stop switch may be located at the position where it can cut off the load current Io. For example, the stop switch may be connected to a position nearer the battery B than the node between the inductor 3L and the drain of the bypass switch 5. In particular, when the DC-DC converter includes an input smoothing capacitor between the two input terminals 1A and 1B, the stop switch may be connected between the input smoothing capacitor and the high side input terminal 1A. However, during operation of the step-up chopper 3, in particular, the output current of the direct-current power supply 35, or the load current Io is, in general, smaller than the input current I3+I5 of the direct-current power supply 35. Accordingly, when the stop switch is located at the above-described position of the stop switch 3U, that is, the position adjacent to the output smoothing capacitor 3C and near the battery B, its switching loss is reduced.

The above-described direct-current power supply according to Embodiments 1-10 may include a stop switch similar to that of the direct-current power supply 35 according to Embodiment 11. In that case, the bypass control section may further detect the output current of the step-up chopper and the ON voltage of the stop switch, and based on the detected values, may determine the ON/OFF state of the bypass switch. The bypass control section, for example, detects the load current Io from the ON voltage of the stop switch, and may turns the bypass switch off at the actual meeting of the load current Io with the output current of the step-up chopper.

The above-described direct-current power supply according to Embodiments 1-11 comprises the step-up chopper 3, or the boost converter using the inductor 3I, as its DC-DC converter. The direct-current power supply 60 according to Embodiment 6 further comprises the step-down chopper 31, or the buck converter using the inductor 3I. The DC-DC converter may be a buck/boost converter such as a Cuk, Zeta, and Sepic converter, in Embodiments of the present invention. The DC-DC converter may, in addition, adopt a charge pump using a capacitor and a switch, instead of the converter using an inductor.

Any of the direct-current power supplies according to Embodiments of the present invention as described above is installed in a battery-powered electronic appliance, and operates on batteries. Power provided for the direct-current power supplies may be, alternatively, power rectified from an AC power received from the commercial AC power supply, for example. In other words, the above-described direct-current power supply may be, for example, cascaded between a full-wave rectification circuit and another DC-DC converter, and in collaboration with them, convert an AC power into a fixed DC power. The above-described direct-current power supply maintains its output voltage equal to or beyond a fixed level except the close vicinity of the zero of the source voltage, and improves its power factor about the supply of power from the AC power source to the external load. The above-described direct-current power supply suppresses occurrences of excessive undershoot on the output voltage, in particular, due to the turning off of the bypass switch, and thereby, can prevent sudden drops of the output voltage.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

INDUSTRIAL APPLICABILITY

The present invention relates to a direct-current power supply including a parallel connection of a DC-DC converter and a bypass switch, and maintains the bypass switch in the ON state at the start of the switching operation of the DC-DC converter, thereby preventing sudden drops of the output voltage as described above. Thus, the present invention obviously has industrial applicability.

The invention claimed is:

1. A direct-current power supply comprising:
   a DC-DC converter, by its switching operation, converting an input voltage applied from an external direct-current power supply into an output voltage equal to or higher than the input voltage, and applying the output voltage to an external load;
   a converter control section comparing said output voltage with a desired voltage, and, based on their difference, controlling said switching operation of said DC-DC converter;
   a bypass switch shorting between the input and output of said DC-DC converter; and
   a bypass control section maintaining said bypass switch in the ON state during non-operation of said DC-DC converter, and at the start of said switching operation of said DC-DC converter, further maintaining said bypass switch in the ON state for a time period after the start of said switching operation,
   wherein the time period is set to prevent or suppress undershoot.

2. The direct-current power supply according to claim 1 wherein:
   said bypass control section compares said input voltage with said output voltage, and turns on and off said bypass switch when said input voltage is higher and lower than said output voltage, respectively.

3. The direct-current power supply according to claim 1 wherein:
   said direct-current power supply comprises a start control section sending a predetermined start signal to said converter control section based on one or both of said input and output voltages;
   said converter control section in non-operation starts upon receipt of said start signal; and
   said bypass control section includes:
      a signal delay section holding said start signal for a predetermined delay time from the instant of the receipt, and
      a switch driving section maintaining said bypass switch in the ON state until the receipt of said start signal from said signal delay section, and turning off said bypass switch at the receipt of said start signal.

4. The direct-current power supply according to claim 3 wherein:
   said start control section sends a predetermined stop signal to said converter control section, based on said input voltage;
   said converter control section in operation stops upon the receipt of said stop signal; and
   in said bypass control section,
      said signal delay section holds said stop signal for a predetermined delay time from the instant of the receipt, and
      said switch driving section maintains said bypass switch in the OFF state until the receipt of said stop signal from said signal delay section, and turning on said bypass switch at the receipt of said stop signal.

5. The direct-current power supply according to claim 1 wherein:
   said direct-current power supply comprises an input voltage detecting section comparing said input voltage with a start input voltage;
   said converter control section, based on the output of said input voltage detecting section,
      maintains said DC-DC converter in non-operation during the period when said input voltage is higher than said start input voltage, and
      causes said DC-DC converter to start said switching operation at the detection of the fall of said input voltage to said start input voltage.

6. The direct-current power supply according to claim 1 comprises:
   an input voltage detecting section comparing said input voltage with a stop input voltage;
   an output voltage detecting section comparing said output voltage with a start output voltage; and
   a start control section,
      based on the output of said output voltage detecting section, maintaining said converter control section in non-operation during the period when said output voltage is higher than said start output voltage, and causing said converter control section to start at the detection of the fall of said output voltage to said start output voltage, and
      based on the output of said input voltage detecting section, maintaining said converter control section in operation during the period when said input voltage is lower than said stop input voltage, and causing said converter control section to stop at the detection of the rise of said input voltage to said stop input voltage.

7. The direct-current power supply according to claim 6 wherein:
   said start control section, based on the outputs of said input voltage detecting section and said output voltage detecting section,
      maintains said converter control section in non-operation during the period when said input voltage is higher than said stop input voltage and said output voltage is higher than said start output voltage, and
      causes said converter control section to start when said input voltage falls below said stop input voltage and the fall of said output voltage to said start output voltage is detected.

8. The direct-current power supply according to claim 1 wherein:
   said DC-DC converter has the ability of buck operation converting said input voltage into said output voltage equal to or lower than the input voltage, in addition to the ability of boost operation converting said input voltage into said output voltage equal to or higher than the input voltage;
   said converter control section, based on the difference between said output voltage and said desired voltage, causes said DC-DC converter to perform either one of said buck operation and said boost operation or be maintained in non-operation; and
   at the start of the boost operation of said DC-DC converter, said bypass control section further maintains said bypass switch in the ON state for a predetermined time from the instant of the start.

9. The direct-current power supply according to claim 8 comprising a synchronous rectifier section performing rectification during boost operation of said DC-DC converter in synchronization with its switching operation, and maintaining the ON state during non-operation of said DC-DC converter.

10. The direct-current power supply according to claim 8 comprising a stop switch operated under an on-off control of said external load and cutting off one of an input current provided from said external direct-current power supply and an output current provided for said external load.

11. The direct-current power supply according to claim 10 wherein:
    said DC-DC converter includes an output smoothing capacitor connected in parallel with said external load;
    a node near said external load between said DC-DC converter and said bypass switch locates a position nearer said external direct-current power supply than said output smoothing capacitor; and
    said stop switch is connected between said node and said output smoothing capacitor.

12. The direct-current power supply according to claim 10 wherein said stop switch is connected at a position nearer said external direct-current power supply than a node near said external direct-current power supply between said DC-DC converter and said bypass switch.

13. A battery-powered electronic apparatus comprising:
    a battery supplying a predetermined battery voltage; and
    a direct-current power supply comprising:
        a DC-DC converter, by its switching operation, converting said battery voltage into an output voltage equal to or higher than the battery voltage;
        a converter control section comparing said output voltage with a desired voltage, and, based on their difference, controlling said switching operation of said DC-DC converter;
        a bypass switch shorting between the input and output of said DC-DC converter; and
        a bypass control section maintaining said bypass switch in the ON state during non-operation of said DC-DC converter, and at the start of said switching operation of said DC-DC converter, further maintaining said bypass switch in the ON state for a predetermined time period after the start of said switching operations,
    wherein the time period is set to prevent or suppress undershoot.

14. The battery-powered electronic apparatus according to claim 13 wherein said battery voltage falls below said desired voltage in the middle of discharge of said battery.

15. The battery-powered electronic apparatus according to claim 13 comprising a wireless transmitter section sending a signal by radio waves to the outside.

16. The battery-powered electronic apparatus according to claim 15 wherein said wireless transmitter section includes a power amplifier section amplifying a signal to be sent under the application of said output voltage of said DC-DC converter.

17. The direct-current power supply according to claim 1 comprising a synchronous rectifier section performing rectification during operation of said DC-DC converter in synchronization with its switching operation, and maintaining the ON state during non-operation of said DC-DC converter.

* * * * *

UNITED STATES PATENT AND TRADEMARK OFFICE
CERTIFICATE OF CORRECTION

PATENT NO. : 7,274,116 B2  
APPLICATION NO. : 10/528174  
DATED : September 25, 2007  
INVENTOR(S) : Manabu Inoue et al.

Page 1 of 1

It is certified that error appears in the above-identified patent and that said Letters Patent is hereby corrected as shown below:

Column 56

Line 11: "predetermined" should be deleted;  
Lines 12-13: "operations" should read -- operation --.

Signed and Sealed this

Third Day of June, 2008

JON W. DUDAS  
*Director of the United States Patent and Trademark Office*